US007760400B2

(12) United States Patent
Ishii et al.

(10) Patent No.: US 7,760,400 B2
(45) Date of Patent: Jul. 20, 2010

(54) CREATING MULTIPLE THRESHOLD MATRICES TO BE USED IN ERROR DIFFUSED MULTILEVEL HALFTONING

(75) Inventors: Hiroshi Ishii, Kanagawa (JP); Etsuo Morimoto, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 656 days.

(21) Appl. No.: 11/223,942

(22) Filed: Sep. 13, 2005

(65) Prior Publication Data

US 2006/0077466 A1 Apr. 13, 2006

(30) Foreign Application Priority Data

Oct. 7, 2004 (JP) ............................ 2004-295189
Oct. 25, 2004 (JP) ............................ 2004-309717

(51) Int. Cl.
*H04N 1/40* (2006.01)

(52) U.S. Cl. ...................... 358/3.22; 358/1.9; 358/3.01; 358/3.03; 358/3.06; 358/3.09; 358/3.1; 358/3.13; 358/3.21; 358/3.23; 358/534; 382/270; 382/272

(58) Field of Classification Search ................ 358/534, 358/1.9, 3.03–3.05, 3.21–3.23; 382/237, 382/270–273, 199, 251, 252; 345/616
See application file for complete search history.

(56) References Cited

U.S. PATENT DOCUMENTS 5,353,052 A * 10/1994 Suzuki et al. ................ 347/19
5,553,166 A * 9/1996 Kakutani .................... 382/252
6,000,776 A * 12/1999 Suzuki et al. ................ 347/19
6,556,707 B1 4/2003 Yagishita et al.
6,934,057 B1 * 8/2005 Namizuka .................. 358/2.1
7,023,585 B1 * 4/2006 Borg ......................... 358/1.9
2002/0021455 A1 2/2002 Ishii et al.
2002/0030832 A1 * 3/2002 Shibuya et al. ............... 358/1.9
2002/0054396 A1 * 5/2002 Tanaka et al. ............... 358/519
2002/0080377 A1 * 6/2002 Tonami et al. ............... 358/1.9
2002/0089680 A1 * 7/2002 Ishikawa .................... 358/1.9
2002/0140950 A1 10/2002 Ohta et al.
2003/0076518 A1 * 4/2003 Miyake et al. ............... 358/1.9
2003/0169455 A1 * 9/2003 Takahashi et al. .......... 358/3.03
2004/0130737 A1 * 7/2004 Kamimura et al. ........... 358/1.9
2004/0257622 A1 12/2004 Shibaki et al.
2005/0062753 A1 * 3/2005 Kitazawa .................... 345/589
2005/0248786 A1 * 11/2005 Tobie et al. .................. 358/1.9

FOREIGN PATENT DOCUMENTS

JP 9-107472 4/1997
JP 9-277590 10/1997

(Continued)

*Primary Examiner*—Mark K Zimmerman
*Assistant Examiner*—Javier J Ramos
(74) *Attorney, Agent, or Firm*—Oblon, Spivak, McClelland, Maier & Neustadt, L.L.P.

(57) ABSTRACT

In an image processor, a data corrector corrects input image data, a determining unit determines an output tone value of a target pixel from the corrected image data and threshold, and a calculator calculates a difference between the output tone value and the corrected image data as an error value. The threshold is set in such manner that a rate of change of the mean error of the error values with respect to a change in the input tone value is within a predetermined range.

30 Claims, 38 Drawing Sheets

FOREIGN PATENT DOCUMENTS

| | | |
|---|---|---|
| JP | 9-294208 | 11/1997 |
| JP | 9-312767 | 12/1997 |
| JP | 10-210295 | 8/1998 |
| JP | 11-41464 | 2/1999 |
| JP | 11-196268 | 7/1999 |
| JP | 2000-22944 | 1/2000 |
| JP | 2001-352448 | 12/2001 |
| JP | 2002-101307 | 4/2002 |
| JP | 2002-374412 | 12/2002 |
| JP | 2003-8893 | 1/2003 |
| JP | 2003-69819 | 3/2003 |
| JP | 2003-110851 | 4/2003 |
| JP | 2003-189099 | 7/2003 |
| JP | 2004-48194 | 2/2004 |

* cited by examiner

A201

| y \ x | 0 | 1 | 2 | 3 |
|---|---|---|---|---|
| 0 | 129 | 100 | 217 | 176 |
| 1 | 40 | 8 | 180 | 144 |
| 2 | 217 | 176 | 129 | 100 |
| 3 | 180 | 144 | 40 | 8 |

B202

| y \ x | 0 | 1 | 2 | 3 |
|---|---|---|---|---|
| 0 | 144 | 116 | 232 | 192 |
| 1 | 55 | 23 | 195 | 159 |
| 2 | 232 | 192 | 144 | 116 |
| 3 | 195 | 159 | 55 | 23 |

C203

| y \ x | 0 | 1 | 2 | 3 |
|---|---|---|---|---|
| 0 | 159 | 129 | 247 | 207 |
| 1 | 71 | 36 | 211 | 174 |
| 2 | 247 | 207 | 159 | 129 |
| 3 | 211 | 174 | 71 | 36 |

| | | | | | | |
|---|---|---|---|---|---|---|
| 0/32 | 1/32 | 1/32 | 2/32 | 1/32 | 0/32 | 0/32 |
| 1/32 | 1/32 | 2/32 | 4/32 | 2/32 | 1/32 | 1/32 |
| 1/32 | 4/32 | 8/32 | × | | | |

| | | | | | | |
|---|---|---|---|---|---|---|
| 0 | 1 | 1 | 2 | 1 | 1 | 0 |
| 1 | 1 | 2 | 4 | 2 | 1 | 1 |
| 2 | 4 | 8 | × | | | |

| | | | | |
|---|---|---|---|---|
| −1 | −1 | 0 | 1 | 1 |
| −1 | −1 | 0 | 1 | 1 |
| −1 | −1 | 0 | 1 | 1 |
| −1 | −1 | 0 | 1 | 1 |
| −1 | −1 | 0 | 1 | 1 |

702

| | | | | |
|---|---|---|---|---|
| −1 | −1 | −1 | −1 | −1 |
| −1 | −1 | −1 | −1 | −1 |
| 0 | 0 | 0 | 0 | 0 |
| 1 | 1 | 1 | 1 | 1 |
| 1 | 1 | 1 | 1 | 1 |

703

| | | | | |
|---|---|---|---|---|
| −1 | −1 | −1 | −1 | 0 |
| −1 | −1 | −1 | 0 | 1 |
| −1 | −1 | 0 | 1 | 1 |
| −1 | 0 | 1 | 1 | 1 |
| 0 | 1 | 1 | 1 | 1 |

704

| | | | | |
|---|---|---|---|---|
| 0 | 1 | 1 | 1 | 1 |
| −1 | 0 | 1 | 1 | 1 |
| −1 | −1 | 0 | 1 | 1 |
| −1 | −1 | −1 | 0 | 1 |
| −1 | −1 | −1 | −1 | 0 |

| | | | | |
|---|---|---|---|---|
| 0 | 0 | 0 | 0 | 0 |
| 0 | −1 | 1 | −1 | 0 |
| −1 | −2 | 8 | −2 | −1 |
| 0 | −1 | 1 | −1 | 0 |
| 0 | 0 | 0 | 0 | 0 |

802

| | | | | |
|---|---|---|---|---|
| 0 | 0 | −1 | 0 | 0 |
| 0 | −1 | −2 | −1 | 0 |
| 0 | 1 | 8 | 1 | 0 |
| 0 | −1 | −2 | −1 | 0 |
| 0 | 0 | −1 | 0 | 0 |

803

| | | | | |
|---|---|---|---|---|
| −1 | 0 | 0 | 0 | 0 |
| 0 | −2 | −1 | 1 | 0 |
| 0 | −1 | 8 | −1 | 0 |
| 0 | 1 | −1 | −2 | 0 |
| 0 | 0 | 0 | 0 | −1 |

804

| | | | | |
|---|---|---|---|---|
| 0 | 0 | 0 | 0 | −1 |
| 0 | 1 | −1 | −2 | 0 |
| 0 | −1 | 8 | −1 | 0 |
| 0 | −2 | −1 | 1 | 0 |
| −1 | 0 | 0 | 0 | 0 |

INPUT IMAGE
INPUT TONE VALUE
HIGH-DENSITY DETERMINATION AREA 908
DENSITY THRESHOLD 905

PRIMARY DIFFERENTIATION ABSOLUTE VALUE CALCULATION RESULT
PRIMARY DIFFERENTIATION ABSOLUTE VALUE
PRIMARY DIFFERENTIATION DETERMINATION AREA 909
PRIMARY DIFFEREN-TIATION THRESHOLD 906

| y \ x | 0 | 1 | 2 | 3 |
|---|---|---|---|---|
| 0 | 0 | 0 | 0 | 0 |
| 1 | 0 | 0 | 0 | 0 |
| 2 | 0 | 0 | 0 | 0 |
| 3 | 0 | 0 | 0 | 0 |

1102

| y \ x | 0 | 1 | 2 | 3 |
|---|---|---|---|---|
| 0 | 0 | 0 | 0 | 0 |
| 1 | 0 | 85 | 0 | 0 |
| 2 | 0 | 0 | 0 | 0 |
| 3 | 0 | 0 | 0 | 85 |

1103

| y \ x | 0 | 1 | 2 | 3 |
|---|---|---|---|---|
| 0 | 0 | 0 | 0 | 0 |
| 1 | 0 | 170 | 0 | 0 |
| 2 | 0 | 0 | 0 | 0 |
| 3 | 0 | 0 | 0 | 170 |

1104

| y \ x | 0 | 1 | 2 | 3 |
|---|---|---|---|---|
| 0 | 0 | 0 | 0 | 0 |
| 1 | 0 | 255 | 0 | 0 |
| 2 | 0 | 0 | 0 | 0 |
| 3 | 0 | 0 | 0 | 255 |

1108

| y \ x | 0 | 1 | 2 | 3 |
|---|---|---|---|---|
| 0 | 0 | 85 | 0 | 0 |
| 1 | 255 | 255 | 0 | 0 |
| 2 | 0 | 0 | 0 | 85 |
| 3 | 0 | 0 | 255 | 255 |

1109

| y \ x | 0 | 1 | 2 | 3 |
|---|---|---|---|---|
| 0 | 0 | 170 | 0 | 0 |
| 1 | 255 | 255 | 0 | 0 |
| 2 | 0 | 0 | 0 | 170 |
| 3 | 0 | 0 | 255 | 255 |

1110

| y \ x | 0 | 1 | 2 | 3 |
|---|---|---|---|---|
| 0 | 0 | 255 | 0 | 0 |
| 1 | 255 | 255 | 0 | 0 |
| 2 | 0 | 0 | 0 | 255 |
| 3 | 0 | 0 | 255 | 255 |

1111

| y \ x | 0 | 1 | 2 | 3 |
|---|---|---|---|---|
| 0 | 85 | 255 | 0 | 0 |
| 1 | 255 | 255 | 0 | 0 |
| 2 | 0 | 0 | 85 | 255 |
| 3 | 0 | 0 | 255 | 255 |

1115

| y \ x | 0 | 1 | 2 | 3 |
|---|---|---|---|---|
| 0 | 255 | 255 | 0 | 0 |
| 1 | 255 | 255 | 0 | 170 |
| 2 | 0 | 0 | 255 | 255 |
| 3 | 0 | 170 | 255 | 255 |

1116

| y \ x | 0 | 1 | 2 | 3 |
|---|---|---|---|---|
| 0 | 255 | 255 | 0 | 0 |
| 1 | 255 | 255 | 0 | 255 |
| 2 | 0 | 0 | 255 | 255 |
| 3 | 0 | 255 | 255 | 255 |

1117

| y \ x | 0 | 1 | 2 | 3 |
|---|---|---|---|---|
| 0 | 255 | 255 | 0 | 85 |
| 1 | 255 | 255 | 0 | 255 |
| 2 | 0 | 85 | 255 | 255 |
| 3 | 0 | 255 | 255 | 255 |

1118

| y \ x | 0 | 1 | 2 | 3 |
|---|---|---|---|---|
| 0 | 255 | 255 | 0 | 170 |
| 1 | 255 | 255 | 0 | 255 |
| 2 | 0 | 170 | 255 | 255 |
| 3 | 0 | 255 | 255 | 255 |

1122

| y \ x | 0 | 1 | 2 | 3 |
|---|---|---|---|---|
| 0 | 255 | 255 | 0 | 255 |
| 1 | 255 | 255 | 255 | 255 |
| 2 | 0 | 255 | 255 | 255 |
| 3 | 255 | 255 | 255 | 255 |

1123

| y \ x | 0 | 1 | 2 | 3 |
|---|---|---|---|---|
| 0 | 255 | 255 | 85 | 255 |
| 1 | 255 | 255 | 255 | 255 |
| 2 | 85 | 255 | 255 | 255 |
| 3 | 255 | 255 | 255 | 255 |

1124

| y \ x | 0 | 1 | 2 | 3 |
|---|---|---|---|---|
| 0 | 255 | 255 | 170 | 255 |
| 1 | 255 | 255 | 255 | 255 |
| 2 | 170 | 255 | 255 | 255 |
| 3 | 255 | 255 | 255 | 255 |

1125

| y \ x | 0 | 1 | 2 | 3 |
|---|---|---|---|---|
| 0 | 255 | 255 | 255 | 255 |
| 1 | 255 | 255 | 255 | 255 |
| 2 | 255 | 255 | 255 | 255 |
| 3 | 255 | 255 | 255 | 255 |

| y \ x | 0 | 1 | 2 | 3 |
|---|---|---|---|---|
| 0 | 0 | 0 | 0 | 0 |
| 1 | 85 | 255 | 0 | 0 |
| 2 | 0 | 0 | 0 | 0 |
| 3 | 0 | 0 | 85 | 255 |

1112

| y \ x | 0 | 1 | 2 | 3 |
|---|---|---|---|---|
| 0 | 170 | 255 | 0 | 0 |
| 1 | 255 | 255 | 0 | 0 |
| 2 | 0 | 0 | 170 | 85 |
| 3 | 0 | 0 | 255 | 255 |

1119

| y \ x | 0 | 1 | 2 | 3 |
|---|---|---|---|---|
| 0 | 255 | 255 | 0 | 255 |
| 1 | 255 | 255 | 0 | 255 |
| 2 | 0 | 255 | 255 | 255 |
| 3 | 0 | 255 | 255 | 255 |

1106

| y \ x | 0 | 1 | 2 | 3 |
|---|---|---|---|---|
| 0 | 0 | 0 | 0 | 0 |
| 1 | 170 | 255 | 0 | 0 |
| 2 | 0 | 0 | 0 | 0 |
| 3 | 0 | 0 | 170 | 255 |

1113

| y \ x | 0 | 1 | 2 | 3 |
|---|---|---|---|---|
| 0 | 255 | 255 | 0 | 0 |
| 1 | 255 | 255 | 0 | 0 |
| 2 | 0 | 0 | 255 | 255 |
| 3 | 0 | 0 | 255 | 255 |

1120

| y \ x | 0 | 1 | 2 | 3 |
|---|---|---|---|---|
| 0 | 255 | 255 | 0 | 255 |
| 1 | 255 | 255 | 85 | 255 |
| 2 | 0 | 255 | 255 | 255 |
| 3 | 85 | 255 | 255 | 255 |

1107

| y \ x | 0 | 1 | 2 | 3 |
|---|---|---|---|---|
| 0 | 0 | 0 | 0 | 0 |
| 1 | 255 | 255 | 0 | 0 |
| 2 | 0 | 0 | 0 | 0 |
| 3 | 0 | 0 | 255 | 255 |

1114

| y \ x | 0 | 1 | 2 | 3 |
|---|---|---|---|---|
| 0 | 255 | 255 | 0 | 0 |
| 1 | 255 | 255 | 0 | 85 |
| 2 | 0 | 0 | 255 | 255 |
| 3 | 0 | 85 | 255 | 255 |

1121

| y \ x | 0 | 1 | 2 | 3 |
|---|---|---|---|---|
| 0 | 255 | 255 | 0 | 255 |
| 1 | 255 | 255 | 170 | 255 |
| 2 | 0 | 255 | 255 | 255 |
| 3 | 170 | 255 | 255 | 255 |

FIG. 14

| y \ x | 0 | 1 | 2 | 3 |
|---|---|---|---|---|
| 0 | p0 | p1 | p2 | p3 |
| 1 | p4 | p5 | p6 | p7 |
| 2 | p2 | p3 | p0 | p1 |
| 3 | p6 | p7 | p4 | p5 |

FIG. 15

| p0 | p1 | p2 | p3 | p0 | p1 | p2 | p3 |
|---|---|---|---|---|---|---|---|
| p4 | p5 | p6 | p7 | p4 | p5 | p6 | p7 |
| p2 | p3 | p0 | p1 | p |  | p0 | p1 |
| p6 | p7 | p4 | p5 | p6 | p7 | p4 | p5 |
| p0 | p1 | p2 | p3 | p0 | p1 | p2 | p3 |
| p4 | p5 | p6 | p7 | p4 | p5 | p6 | p7 |
| p2 | p3 | p0 | p1 | p2 | p3 | p0 | p1 |
| p6 | p7 | p4 | p5 | p6 | p7 | p4 | p5 |

| FIG. 16A |
|---|
| FIG. 16B |
| FIG. 16C |

1701

| y \ x | 0 | 1 | 2 | 3 |
|---|---|---|---|---|
| 0 | 0.0 | 0.0 | 0.0 | 0.0 |
| 1 | 0.0 | 0.0 | 0.0 | 0.0 |
| 2 | 0.0 | 0.0 | 0.0 | 0.0 |
| 3 | 0.0 | 0.0 | 0.0 | 0.0 |

1702

| y \ x | 0 | 1 | 2 | 3 |
|---|---|---|---|---|
| 0 | 13.5 | 16.1 | 14.8 | 12.2 |
| 1 | 10.8 | 15.3 | −1.4 | 3.6 |
| 2 | 14.8 | 12.2 | 13.5 | 16.1 |
| 3 | −1.4 | 3.6 | 10.8 | 15.3 |

1703

| y \ x | 0 | 1 | 2 | 3 |
|---|---|---|---|---|
| 0 | 27.0 | 32.2 | 29.7 | 24.5 |
| 1 | 21.6 | 30.6 | −2.7 | 7.2 |
| 2 | 29.7 | 24.5 | 27.0 | 32.2 |
| 3 | −2.7 | 7.2 | 21.6 | 30.6 |

1710

| y \ x | 0 | 1 | 2 | 3 |
|---|---|---|---|---|
| 0 | 121.2 | 138.6 | 77.1 | 88.1 |
| 1 | 122.7 | 78.5 | 47.3 | 91.5 |
| 2 | 77.1 | 88.1 | 121.2 | 138.6 |
| 3 | 47.3 | 91.5 | 122.7 | 78.5 |

1711

| y \ x | 0 | 1 | 2 | 3 |
|---|---|---|---|---|
| 0 | 136.5 | 137.3 | 80.7 | 98.8 |
| 1 | 135.0 | 92.0 | 63.4 | 106.3 |
| 2 | 80.7 | 98.8 | 136.5 | 137.3 |
| 3 | 63.4 | 106.3 | 135.0 | 92.0 |

1712

| y \ x | 0 | 1 | 2 | 3 |
|---|---|---|---|---|
| 0 | 151.8 | 135.9 | 84.3 | 109.6 |
| 1 | 147.2 | 105.5 | 79.5 | 121.1 |
| 2 | 84.3 | 109.6 | 151.8 | 135.9 |
| 3 | 79.5 | 121.1 | 147.2 | 105.5 |

1719

| y \ x | 0 | 1 | 2 | 3 |
|---|---|---|---|---|
| 0 | 207.5 | 182.1 | 160.9 | 214.6 |
| 1 | 195.9 | 178.1 | 172.4 | 218.5 |
| 2 | 160.9 | 214.6 | 207.5 | 182.1 |
| 3 | 172.4 | 218.5 | 195.9 | 178.1 |

1720

| y \ x | 0 | 1 | 2 | 3 |
|---|---|---|---|---|
| 0 | 219.7 | 195.6 | 177.0 | 229.4 |
| 1 | 199.5 | 188.9 | 187.7 | 217.2 |
| 2 | 177.0 | 229.4 | 219.7 | 195.6 |
| 3 | 187.7 | 217.2 | 199.5 | 188.9 |

1721

| y \ x | 0 | 1 | 2 | 3 |
|---|---|---|---|---|
| 0 | 232.0 | 209.1 | 193.0 | 244.2 |
| 1 | 203.1 | 199.7 | 203.0 | 215.8 |
| 2 | 193.0 | 244.2 | 232.0 | 209.1 |
| 3 | 203.0 | 215.8 | 203.1 | 199.7 |

| y \ x | 0 | 1 | 2 | 3 |
|---|---|---|---|---|
| 0 | 40.5 | 48.3 | 44.5 | 36.7 |
| 1 | 32.4 | 45.9 | −4.1 | 10.8 |
| 2 | 44.5 | 36.7 | 40.5 | 48.3 |
| 3 | −4.1 | 10.8 | 32.4 | 45.9 |

1705

| y \ x | 0 | 1 | 2 | 3 |
|---|---|---|---|---|
| 0 | 56.6 | 63.1 | 56.7 | 50.2 |
| 1 | 47.7 | 44.5 | −0.4 | 21.6 |
| 2 | 56.7 | 50.2 | 56.6 | 63.1 |
| 3 | −0.4 | 21.6 | 47.7 | 44.5 |

1706

| y \ x | 0 | 1 | 2 | 3 |
|---|---|---|---|---|
| 0 | 72.7 | 77.9 | 69.0 | 63.7 |
| 1 | 63.0 | 43.2 | 3.2 | 32.4 |
| 2 | 69.0 | 63.7 | 72.7 | 77.9 |
| 3 | 3.2 | 32.4 | 63.0 | 43.2 |

1713

| y \ x | 0 | 1 | 2 | 3 |
|---|---|---|---|---|
| 0 | 167.0 | 134.6 | 88.0 | 120.4 |
| 1 | 159.4 | 119.0 | 95.6 | 136.0 |
| 2 | 88.0 | 120.4 | 167.0 | 134.6 |
| 3 | 95.6 | 136.0 | 159.4 | 119.0 |

1714

| y \ x | 0 | 1 | 2 | 3 |
|---|---|---|---|---|
| 0 | 181.9 | 146.8 | 101.5 | 136.5 |
| 1 | 158.1 | 122.7 | 106.4 | 151.2 |
| 2 | 101.5 | 136.5 | 181.9 | 146.8 |
| 3 | 106.4 | 151.2 | 158.1 | 122.7 |

1715

| y \ x | 0 | 1 | 2 | 3 |
|---|---|---|---|---|
| 0 | 196.7 | 159.0 | 115.0 | 152.6 |
| 1 | 156.7 | 126.3 | 117.2 | 166.5 |
| 2 | 115.0 | 152.6 | 196.7 | 159.0 |
| 3 | 117.2 | 166.5 | 156.7 | 126.3 |

1722

| y \ x | 0 | 1 | 2 | 3 |
|---|---|---|---|---|
| 0 | 244.2 | 222.6 | 209.1 | 259.1 |
| 1 | 206.7 | 210.5 | 218.3 | 214.5 |
| 2 | 209.1 | 259.1 | 244.2 | 222.6 |
| 3 | 218.3 | 214.5 | 206.7 | 210.5 |

1723

| y \ x | 0 | 1 | 2 | 3 |
|---|---|---|---|---|
| 0 | 247.8 | 233.4 | 224.4 | 257.7 |
| 1 | 222.8 | 225.3 | 230.5 | 228.0 |
| 2 | 224.4 | 257.7 | 247.8 | 233.4 |
| 3 | 230.5 | 228.0 | 222.8 | 225.3 |

1724

| y \ x | 0 | 1 | 2 | 3 |
|---|---|---|---|---|
| 0 | 251.4 | 244.2 | 239.7 | 256.4 |
| 1 | 238.9 | 240.2 | 242.8 | 241.5 |
| 2 | 239.7 | 256.4 | 251.4 | 244.2 |
| 3 | 242.8 | 241.5 | 238.9 | 240.2 |

| y \ x | 0 | 1 | 2 | 3 |
|---|---|---|---|---|
| 0 | 88.8 | 92.8 | 81.2 | 77.2 |
| 1 | 78.2 | 41.8 | 6.8 | 43.2 |
| 2 | 81.2 | 77.2 | 88.8 | 92.8 |
| 3 | 6.8 | 43.2 | 78.2 | 41.8 |

1708

| y \ x | 0 | 1 | 2 | 3 |
|---|---|---|---|---|
| 0 | 99.6 | 108.0 | 79.8 | 80.8 |
| 1 | 93.1 | 54.0 | 20.3 | 59.3 |
| 2 | 79.8 | 80.8 | 99.6 | 108.0 |
| 3 | 20.3 | 59.3 | 93.1 | 54.0 |

1709

| y \ x | 0 | 1 | 2 | 3 |
|---|---|---|---|---|
| 0 | 110.4 | 123.3 | 78.5 | 84.4 |
| 1 | 107.9 | 66.3 | 33.8 | 75.4 |
| 2 | 78.5 | 84.4 | 110.4 | 123.3 |
| 3 | 33.8 | 75.4 | 107.9 | 66.3 |

1716

| y \ x | 0 | 1 | 2 | 3 |
|---|---|---|---|---|
| 0 | 211.5 | 171.3 | 128.5 | 168.7 |
| 1 | 155.4 | 129.9 | 127.9 | 181.8 |
| 2 | 128.5 | 168.7 | 211.5 | 171.3 |
| 3 | 127.9 | 181.8 | 155.4 | 129.9 |

1717

| y \ x | 0 | 1 | 2 | 3 |
|---|---|---|---|---|
| 0 | 210.2 | 174.9 | 139.3 | 184.0 |
| 1 | 168.9 | 146.0 | 142.8 | 194.0 |
| 2 | 139.3 | 184.0 | 210.2 | 174.9 |
| 3 | 142.8 | 194.0 | 168.9 | 146.0 |

1718

| y \ x | 0 | 1 | 2 | 3 |
|---|---|---|---|---|
| 0 | 208.8 | 178.5 | 150.1 | 199.3 |
| 1 | 182.4 | 162.0 | 157.6 | 206.3 |
| 2 | 150.1 | 199.3 | 208.8 | 178.5 |
| 3 | 157.6 | 206.3 | 182.4 | 162.0 |

1725

| y \ x | 0 | 1 | 2 | 3 |
|---|---|---|---|---|
| 0 | 255.0 | 255.0 | 255.0 | 255.0 |
| 1 | 255.0 | 255.0 | 255.0 | 255.0 |
| 2 | 255.0 | 255.0 | 255.0 | 255.0 |
| 3 | 255.0 | 255.0 | 255.0 | 255.0 |

FIG. 17

THRESHOLD MATRIX A

1801

| y \ x | 0 | 1 | 2 | 3 |
|---|---|---|---|---|
| 0 | 104 | 72 | 232 | 168 |
| 1 | 40 | 8 | 200 | 136 |
| 2 | 232 | 168 | 104 | 72 |
| 3 | 200 | 136 | 40 | 8 |

THRESHOLD MATRIX B

1802

| y \ x | 0 | 1 | 2 | 3 |
|---|---|---|---|---|
| 0 | 112 | 80 | 240 | 176 |
| 1 | 48 | 16 | 208 | 144 |
| 2 | 240 | 176 | 112 | 80 |
| 3 | 208 | 144 | 48 | 16 |

THRESHOLD MATRIX C

1803

| y \ x | 0 | 1 | 2 | 3 |
|---|---|---|---|---|
| 0 | 120 | 88 | 248 | 184 |
| 1 | 56 | 24 | 216 | 152 |
| 2 | 248 | 184 | 120 | 88 |
| 3 | 216 | 152 | 56 | 24 |

FIG. 22

THRESHOLD MATRIX A

2301

| y \ x | 0 | 1 | 2 | 3 |
|---|---|---|---|---|
| 0 | 131 | 104 | 210 | 174 |
| 1 | 46 | 11 | 176 | 143 |
| 2 | 210 | 174 | 131 | 104 |
| 3 | 176 | 143 | 46 | 11 |

THRESHOLD MATRIX B

2302

| y \ x | 0 | 1 | 2 | 3 |
|---|---|---|---|---|
| 0 | 145 | 119 | 225 | 189 |
| 1 | 60 | 30 | 190 | 158 |
| 2 | 225 | 189 | 145 | 119 |
| 3 | 190 | 158 | 60 | 30 |

THRESHOLD MATRIX C

2303

| y \ x | 0 | 1 | 2 | 3 |
|---|---|---|---|---|
| 0 | 160 | 130 | 244 | 203 |
| 1 | 75 | 42 | 205 | 172 |
| 2 | 244 | 203 | 160 | 130 |
| 3 | 205 | 172 | 75 | 42 |

FIG. 24
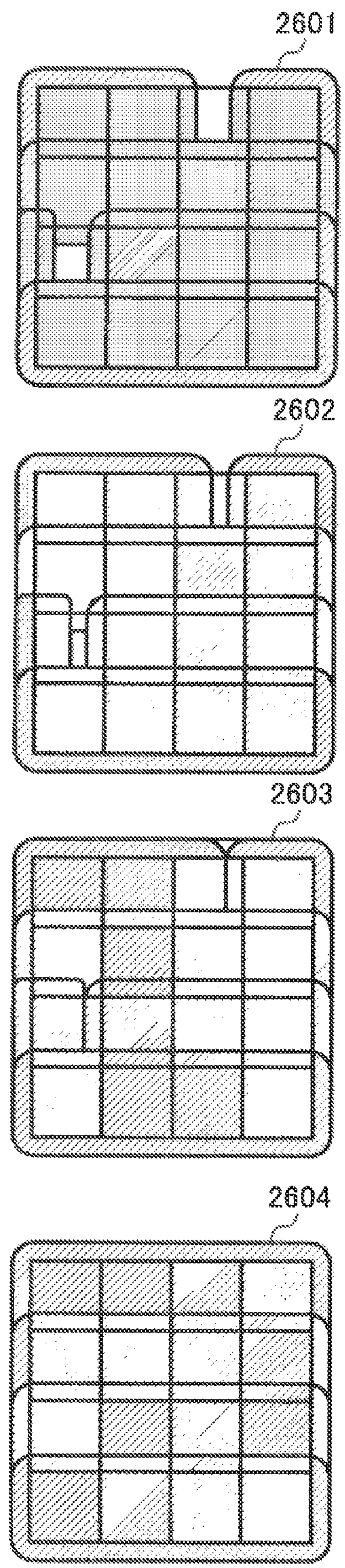
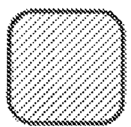
AREA ORIGINALLY OCCUPIED BY RESPECTIVE PIXELS
AREA IN WHICH COLORING MATERIAL IS DISTRIBUTED

| y \ x | 0 | 1 | 2 | 3 |
|---|---|---|---|---|
| 0 | 0.0 | 0.0 | 0.0 | 0.0 |
| 1 | 0.0 | 0.0 | 0.0 | 0.0 |
| 2 | 0.0 | 0.0 | 0.0 | 0.0 |
| 3 | 0.0 | 0.0 | 0.0 | 0.0 |

2704

| y \ x | 0 | 1 | 2 | 3 |
|---|---|---|---|---|
| 0 | 40.5 | 48.3 | 44.5 | 36.7 |
| 1 | 32.4 | 45.9 | −4.1 | 10.8 |
| 2 | 44.5 | 36.7 | 40.5 | 48.3 |
| 3 | −4.1 | 10.8 | 32.4 | 45.9 |

2705

| y \ x | 0 | 1 | 2 | 3 |
|---|---|---|---|---|
| 0 | 56.6 | 63.1 | 56.7 | 50.2 |
| 1 | 47.7 | 44.5 | −0.4 | 21.6 |
| 2 | 56.7 | 50.2 | 56.6 | 63.1 |
| 3 | −0.4 | 21.6 | 47.7 | 44.5 |

2712

| y \ x | 0 | 1 | 2 | 3 |
|---|---|---|---|---|
| 0 | 151.8 | 135.9 | 84.3 | 109.6 |
| 1 | 147.2 | 105.5 | 79.5 | 121.1 |
| 2 | 84.3 | 109.6 | 151.8 | 135.9 |
| 3 | 79.5 | 121.1 | 147.2 | 105.5 |

2713

| y \ x | 0 | 1 | 2 | 3 |
|---|---|---|---|---|
| 0 | 167.0 | 134.6 | 88.0 | 120.4 |
| 1 | 159.4 | 119.0 | 95.6 | 136.0 |
| 2 | 88.0 | 120.4 | 167.0 | 134.6 |
| 3 | 95.6 | 136.0 | 159.4 | 119.0 |

2714

| y \ x | 0 | 1 | 2 | 3 |
|---|---|---|---|---|
| 0 | 181.9 | 146.8 | 101.5 | 136.5 |
| 1 | 158.1 | 122.7 | 106.4 | 151.2 |
| 2 | 101.5 | 136.5 | 181.9 | 146.8 |
| 3 | 106.4 | 151.2 | 158.1 | 122.7 |

2720

| y \ x | 0 | 1 | 2 | 3 |
|---|---|---|---|---|
| 0 | 219.7 | 195.6 | 177.0 | 229.4 |
| 1 | 199.5 | 188.9 | 187.7 | 217.2 |
| 2 | 177.0 | 229.4 | 219.7 | 195.6 |
| 3 | 187.7 | 217.2 | 199.5 | 188.9 |

2722

| y \ x | 0 | 1 | 2 | 3 |
|---|---|---|---|---|
| 0 | 244.2 | 222.6 | 209.1 | 259.1 |
| 1 | 206.7 | 210.5 | 218.3 | 214.5 |
| 2 | 209.1 | 259.1 | 244.2 | 222.6 |
| 3 | 218.3 | 214.5 | 206.7 | 210.5 |

2725

| y \ x | 0 | 1 | 2 | 3 |
|---|---|---|---|---|
| 0 | 255.0 | 255.0 | 255.0 | 255.0 |
| 1 | 255.0 | 255.0 | 255.0 | 255.0 |
| 2 | 255.0 | 255.0 | 255.0 | 255.0 |
| 3 | 255.0 | 255.0 | 255.0 | 255.0 |

| y \ x | 0 | 1 | 2 | 3 |
|---|---|---|---|---|
| 0 | 72.7 | 77.9 | 69.0 | 63.7 |
| 1 | 63.0 | 43.2 | 3.2 | 32.4 |
| 2 | 69.0 | 63.7 | 72.7 | 77.9 |
| 3 | 3.2 | 32.4 | 63.0 | 43.2 |

2715

| y \ x | 0 | 1 | 2 | 3 |
|---|---|---|---|---|
| 0 | 196.7 | 159.0 | 115.0 | 152.6 |
| 1 | 156.7 | 126.3 | 117.2 | 166.5 |
| 2 | 115.0 | 152.6 | 196.7 | 159.0 |
| 3 | 117.2 | 166.5 | 156.7 | 126.3 |

2707

| y \ x | 0 | 1 | 2 | 3 |
|---|---|---|---|---|
| 0 | 88.8 | 92.8 | 81.2 | 77.2 |
| 1 | 78.2 | 41.8 | 6.8 | 43.2 |
| 2 | 81.2 | 77.2 | 88.8 | 92.8 |
| 3 | 6.8 | 43.2 | 78.2 | 41.8 |

2716

| y \ x | 0 | 1 | 2 | 3 |
|---|---|---|---|---|
| 0 | 211.5 | 171.3 | 128.5 | 168.7 |
| 1 | 155.4 | 129.9 | 127.9 | 181.8 |
| 2 | 128.5 | 168.7 | 211.5 | 171.3 |
| 3 | 127.9 | 181.8 | 155.4 | 129.9 |

2709

| y \ x | 0 | 1 | 2 | 3 |
|---|---|---|---|---|
| 0 | 110.4 | 123.3 | 78.5 | 84.4 |
| 1 | 107.9 | 66.3 | 33.8 | 75.4 |
| 2 | 78.5 | 84.4 | 110.4 | 123.3 |
| 3 | 33.8 | 75.4 | 107.9 | 66.3 |

2717

| y \ x | 0 | 1 | 2 | 3 |
|---|---|---|---|---|
| 0 | 210.2 | 174.9 | 139.3 | 184.0 |
| 1 | 168.9 | 146.0 | 142.8 | 194.0 |
| 2 | 139.3 | 184.0 | 210.2 | 174.9 |
| 3 | 142.8 | 194.0 | 168.9 | 146.0 |

| y \ x | 0 | 1 | 2 | 3 |
|---|---|---|---|---|
| 0 | 121.2 | 138.6 | 77.1 | 88.1 |
| 1 | 122.7 | 78.5 | 47.3 | 91.5 |
| 2 | 77.1 | 88.1 | 121.2 | 138.6 |
| 3 | 47.3 | 91.5 | 122.7 | 78.5 |

2718

| y \ x | 0 | 1 | 2 | 3 |
|---|---|---|---|---|
| 0 | 208.8 | 178.5 | 150.1 | 199.3 |
| 1 | 182.4 | 162.0 | 157.6 | 206.3 |
| 2 | 150.1 | 199.3 | 208.8 | 178.5 |
| 3 | 157.6 | 206.3 | 182.4 | 162.0 |

2711

| y \ x | 0 | 1 | 2 | 3 |
|---|---|---|---|---|
| 0 | 136.5 | 137.3 | 80.7 | 98.8 |
| 1 | 135.0 | 92.0 | 63.4 | 106.3 |
| 2 | 80.7 | 98.8 | 136.5 | 137.3 |
| 3 | 63.4 | 106.3 | 135.0 | 92.0 |

2719

| y \ x | 0 | 1 | 2 | 3 |
|---|---|---|---|---|
| 0 | 207.5 | 182.1 | 160.9 | 214.6 |
| 1 | 195.9 | 178.1 | 172.4 | 218.5 |
| 2 | 160.9 | 214.6 | 207.5 | 182.1 |
| 3 | 172.4 | 218.5 | 195.9 | 178.1 |

FIG. 26

THRESHOLD MATRIX A (201)

| y \ x | 0 | 1 | 2 | 3 |
|---|---|---|---|---|
| 0 | 129 | 109 | 232 | 176 |
| 1 | 40 | 21 | 180 | 144 |
| 2 | 232 | 176 | 129 | 109 |
| 3 | 180 | 144 | 40 | 21 |

THRESHOLD MATRIX B (202)

| y \ x | 0 | 1 | 2 | 3 |
|---|---|---|---|---|
| 0 | 144 | 109 | 232 | 192 |
| 1 | 55 | 21 | 203 | 159 |
| 2 | 232 | 192 | 144 | 109 |
| 3 | 203 | 159 | 55 | 21 |

THRESHOLD MATRIX C (203)

| y \ x | 0 | 1 | 2 | 3 |
|---|---|---|---|---|
| 0 | 159 | 129 | 232 | 207 |
| 1 | 71 | 21 | 203 | 174 |
| 2 | 232 | 207 | 159 | 129 |
| 3 | 203 | 174 | 71 | 21 |

FIG. 30

THRESHOLD MATRIX A

| y \ x | a | b | c | d |
|---|---|---|---|---|
| a | 104 | 72 | 232 | 168 |
| b | 40 | 8 | 200 | 136 |
| c | 232 | 168 | 104 | 72 |
| d | 200 | 136 | 40 | 8 |

THRESHOLD MATRIX B

| y \ x | a | b | c | d |
|---|---|---|---|---|
| a | 112 | 80 | 240 | 176 |
| b | 48 | 16 | 208 | 144 |
| c | 240 | 176 | 112 | 80 |
| d | 208 | 144 | 48 | 16 |

THRESHOLD MATRIX C

| y \ x | a | b | c | d |
|---|---|---|---|---|
| a | 120 | 88 | 248 | 184 |
| b | 56 | 24 | 216 | 152 |
| c | 248 | 184 | 120 | 88 |
| d | 216 | 152 | 56 | 24 |

FIG. 31

| y \ x | a | b | c | d |
|---|---|---|---|---|
| a | 4 | 3 | 8 | 6 |
| b | 2 | 1 | 7 | 5 |
| c | 8 | 6 | 4 | 3 |
| d | 7 | 5 | 2 | 1 |

THRESHOLD MATRIX A

| y \ x | a | b | c | d |
|---|---|---|---|---|
| a | 104 | 255 | 232 | 168 |
| b | 40 | 255 | 200 | 136 |
| c | 232 | 168 | 104 | 255 |
| d | 200 | 136 | 40 | 255 |

THRESHOLD MATRIX B

| y \ x | a | b | c | d |
|---|---|---|---|---|
| a | 112 | 80 | 240 | 176 |
| b | 48 | 254 | 208 | 144 |
| c | 240 | 176 | 112 | 80 |
| d | 208 | 144 | 48 | 254 |

THRESHOLD MATRIX C

| y \ x | a | b | c | d |
|---|---|---|---|---|
| a | 120 | 88 | 248 | 184 |
| b | 56 | 24 | 216 | 152 |
| c | 248 | 184 | 120 | 88 |
| d | 216 | 152 | 56 | 24 |

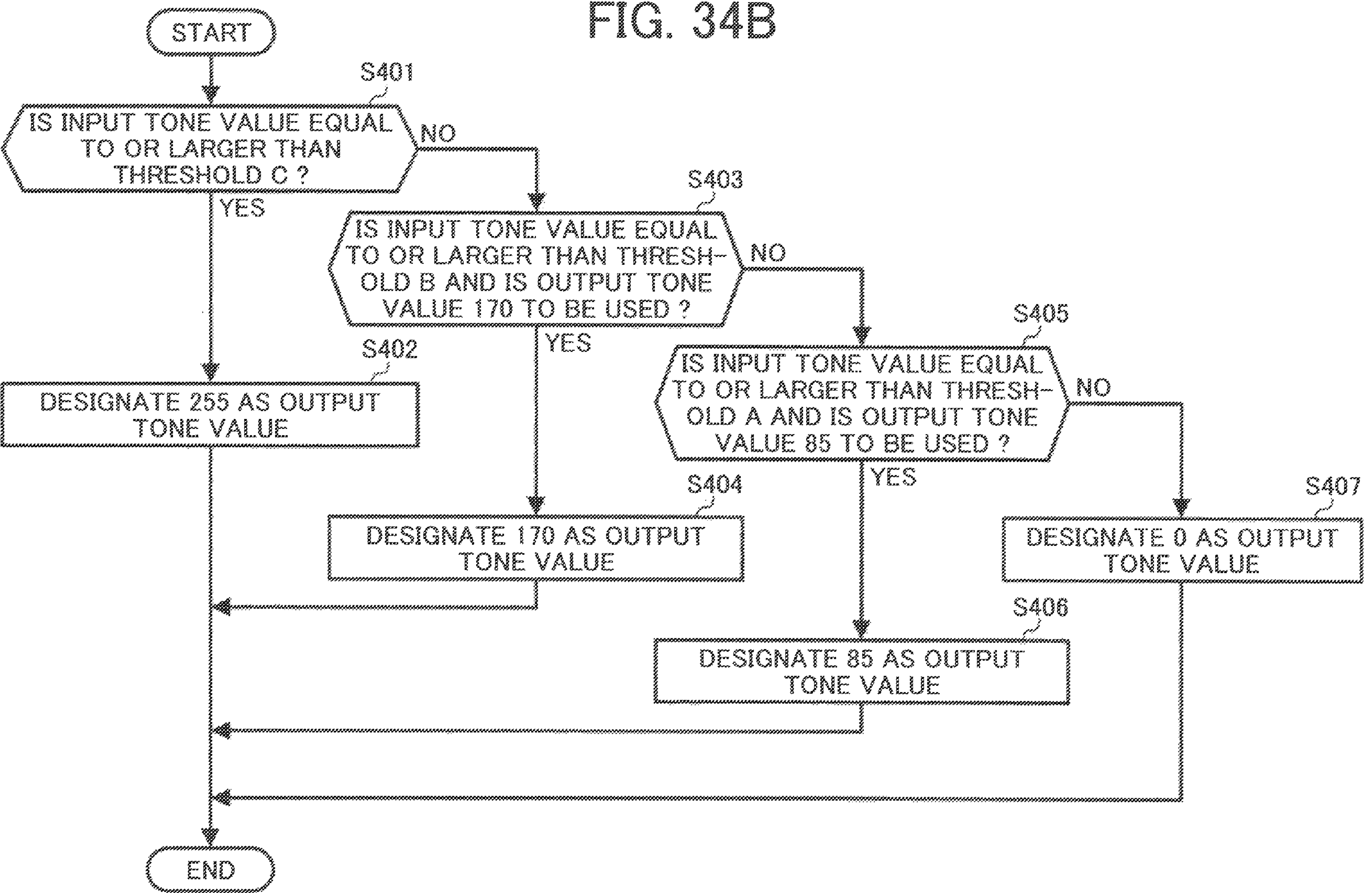
FIG. 34B
START
S401
IS INPUT TONE VALUE EQUAL TO OR LARGER THAN THRESHOLD C ?
NO
YES
S403
IS INPUT TONE VALUE EQUAL TO OR LARGER THAN THRESH-OLD B AND IS OUTPUT TONE VALUE 170 TO BE USED ?
NO
YES
S402
DESIGNATE 255 AS OUTPUT TONE VALUE
S405
IS INPUT TONE VALUE EQUAL TO OR LARGER THAN THRESH-OLD A AND IS OUTPUT TONE VALUE 85 TO BE USED ?
NO
YES
S404
DESIGNATE 170 AS OUTPUT TONE VALUE
S407
DESIGNATE 0 AS OUTPUT TONE VALUE
S406
DESIGNATE 85 AS OUTPUT TONE VALUE
END

THRESHOLD MATRIX A

| y \ x | a | b | c | d |
|---|---|---|---|---|
| a | 104 | 72 | 301 | 168 |
| b | 40 | 8 | 299 | 136 |
| c | 301 | 168 | 104 | 72 |
| d | 299 | 136 | 40 | 8 |

THRESHOLD MATRIX B

| y \ x | a | b | c | d |
|---|---|---|---|---|
| a | 112 | 80 | 300 | 176 |
| b | 48 | 16 | 298 | 144 |
| c | 300 | 176 | 112 | 80 |
| d | 298 | 144 | 48 | 16 |

THRESHOLD MATRIX C

| y \ x | a | b | c | d |
|---|---|---|---|---|
| a | 120 | 88 | 245 | 184 |
| b | 56 | 24 | 240 | 152 |
| c | 245 | 184 | 120 | 88 |
| d | 240 | 152 | 56 | 24 |

IMAGE PROCESSOR 5130
5011
IMAGE INPUT UNIT
5014
INPUT DATA CORRECTOR
5013
THRESHOLD MATRIX MEMORY
5052
OUTPUT TONE VALUE DETERMINING UNIT
5014
PHASE CONTROLLER
5101
ERROR CALCULATOR
5102
ERROR BUFFER
5103
ERROR ADDER

START
S501
IS CORRECTED INPUT VALUE EQUAL TO OR LARGER THAN THRESHOLD C ?
NO
YES
S503
IS CORRECTED INPUT VALUE EQUAL TO OR LARGER THAN THRESHOLD B ?
NO
YES
S502
DESIGNATE 255 AS OUTPUT TONE VALUE
S505
IS CORRECTED INPUT VALUE EQUAL TO OR LARGER THAN THRESHOLD A ?
NO
YES
S504
DESIGNATE 170 AS OUTPUT TONE VALUE
S507
DESIGNATE 0 AS OUTPUT TONE VALUE
S506
DESIGNATE 85 AS OUTPUT TONE VALUE
END

| 0/32 | 1/32 | 1/32 | 2/32 | 1/32 | 1/32 | 1/32 |
|---|---|---|---|---|---|---|
| 1/32 | 2/32 | 2/32 | 4/32 | 2/32 | 1/32 | 1/32 |
| 2/32 | 4/32 | 8/32 | × | | | |

| 0 | 1 | 1 | 2 | 1 | 1 | 0 |
|---|---|---|---|---|---|---|
| 1 | 1 | 2 | 4 | 2 | 1 | 1 |
| 2 | 4 | 8 | × | | | |

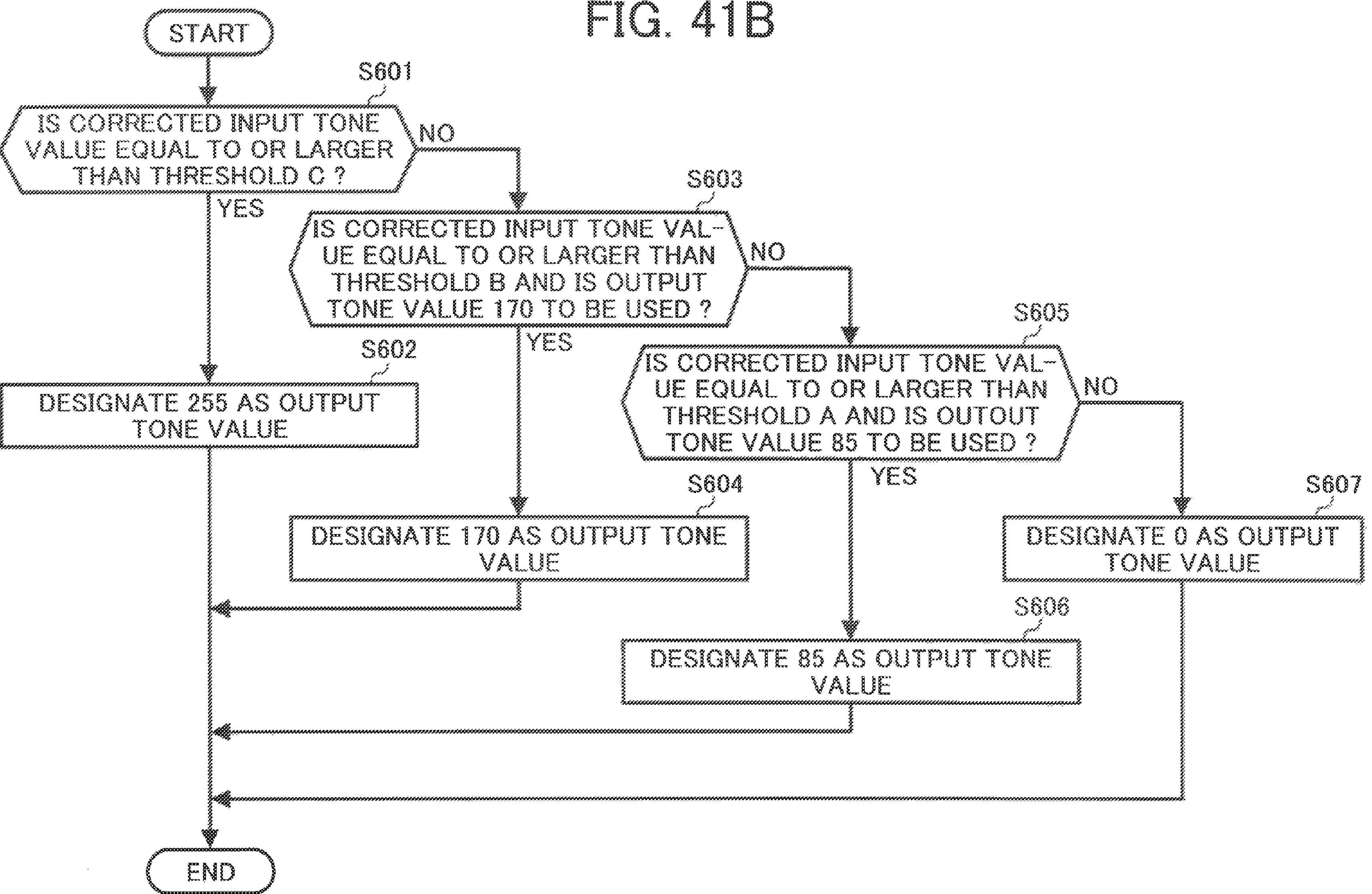
FIG. 41B
START
S601
IS CORRECTED INPUT TONE VALUE EQUAL TO OR LARGER THAN THRESHOLD C ?
NO
YES
S603
IS CORRECTED INPUT TONE VAL-UE EQUAL TO OR LARGER THAN THRESHOLD B AND IS OUTPUT TONE VALUE 170 TO BE USED ?
NO
YES
S602
DESIGNATE 255 AS OUTPUT TONE VALUE
S605
IS CORRECTED INPUT TONE VAL-UE EQUAL TO OR LARGER THAN THRESHOLD A AND IS OUTOUT TONE VALUE 85 TO BE USED ?
NO
YES
S604
DESIGNATE 170 AS OUTPUT TONE VALUE
S607
DESIGNATE 0 AS OUTPUT TONE VALUE
S606
DESIGNATE 85 AS OUTPUT TONE VALUE
END

CREATING MULTIPLE THRESHOLD MATRICES TO BE USED IN ERROR DIFFUSED MULTILEVEL HALFTONING

CROSS-REFERENCE TO RELATED APPLICATIONS

The present document incorporates by reference the entire contents of Japanese priority documents, 2004-295189 filed in Japan on Oct. 7, 2004 and 2004-309717 filed in Japan on Oct. 25, 2004.

BACKGROUND OF THE INVENTION

1. Field of the Invention

The present invention relates to an image processor, an image processing method, and an image forming apparatus.

2. Description of the Related Art

When performing image processing, some image forming apparatuses employ a technique called tone processing. In the tone processing, multilevel input image data are converted to image data having less levels, such as a binary value. The tone processing allows reduction in the amount of data.

The tone processing includes a dither method, an error distribution method, or a combination of these two methods. The dither method is excellent in graininess, while the error distribution method is excellent in sharpness.

In the error distribution method, multilevel data is quantized by a quantization processing. The quantization processing uses a quantization threshold. As in a dither processing, a value corresponding to the pixel position is used in the quantization processing. Several techniques have already been proposed to improve deterioration in the texture due to irregular dot connection in the error distribution method. Japanese Patent Application Laid-open No. 2001-352448 discloses a conventional technique in which a quantization threshold is periodically fluctuated.

In the tone processing, stable dot formation can be achieved by suppressing occurrence of isolated dots. As a result, various techniques that can suppress the occurrence of isolated dots have been studied and disclosed by various people. Japanese Patent Application Laid-Open No. H11-041464 and 2000-022944 discloses such techniques.

SUMMARY OF THE INVENTION

It is an object of the present invention to at least solve the problems in the conventional technology.

According to one aspect of the present invention, an image processor includes a input data corrector that corrects image data of a target pixel by giving a weight to error values in the neighborhood of the target pixel and adding weighted error values to a tone value of the target pixel; an output tone value determining unit that determines an output tone data of the target pixel based on corrected image data, and a threshold corresponding to a position of the target pixel; and an error value calculator that calculates a difference between the output tone data and the corrected image data as an error value. The output tone value determining unit sets the threshold in such a manner that a rate of change of a mean error value obtained from error values calculated by the error value calculator with respect to a change in the input tone value falls within a predetermined range.

According to another aspect of the present invention, an image processor includes an input data corrector that corrects image data of a target pixel by giving a weight to error values in the neighborhood of the target pixel and adding weighted error values to a tone value of the target pixel; an output tone value determining unit that determines an output tone data of the target pixel based on corrected image data, and a threshold corresponding to a position of the target pixel; and an error value calculator that calculates a difference between the output tone data and the corrected image data as an error value. The output tone value determining unit sets the threshold in such a manner that a mean error value obtained from error values calculated by the error value calculator falls within a predetermined range regardless of the input tone value.

According to still another aspect of the present invention, an image processor includes an input data corrector that corrects image data of a target pixel by giving a weight to error values in the neighborhood of the target pixel and adding weighted error values to a tone value of the target pixel; an output tone value determining unit that determines an output tone data of the target pixel based on corrected image data, and a threshold corresponding to a position of the target pixel; and an error value calculator that calculates a difference between the output tone data and the corrected image data as an error value. The output tone value determining unit sets the threshold in such a manner that a mean error value obtained from error values calculated by the error value calculator with respect to a change in the input tone value is substantially any one of a monotonous decrease and a monotonous increase with respect to the input tone value.

According to still another aspect of the present invention, an image processor includes an input data corrector that corrects image data of a target pixel by giving a weight to error values in the neighborhood of the target pixel and adding weighted error values to a tone value of the target pixel; an output tone value determining unit that determines an output tone data of the target pixel based on corrected image data, and a threshold corresponding to a position of the target pixel; and an error value calculator that calculates a difference between the output tone data and the corrected image data as an error value. The output tone value determining unit sets the threshold from a threshold range determined by obtaining respective corrected image data corresponding to a plurality of output dot patterns output as output tone values in a steady state, to determine the threshold range for defining the obtained respective corrected image data.

According to still another aspect of the present invention, an image processor includes an output tone value determining unit that outputs any one of N ($N>2$) output tone values based on comparison of an input tone value of a target pixel and a threshold corresponding to the target pixel position. The output tone value determining unit determines the output tone value set so as to exclude a tone value in a predetermined range, with respect to a predetermined pixel position.

According to still another aspect of the present invention, an image processor includes an input data corrector that corrects image data of a target pixel by giving a weight to error values in the neighborhood of the target pixel and adding weighted error values to a tone value of the target pixel; an output tone value determining unit that outputs any one of N ($N>2$) output tone values based on comparison of corrected image data of the target pixel and a threshold corresponding to the target pixel; and an error value calculator that calculates a difference between the output tone value and the corrected image data as an error value. The output tone value determining unit determines the output tone value set so as to exclude a tone value in a predetermined range, with respect to a predetermined pixel position.

According to still another aspect of the present invention, an image forming apparatus includes a data converter configured to receive image data and to convert image data of each of a plurality of pixels to a tone value; an image processor that processes the tone values thereby obtaining output image data; and an image output device that outputs an image based on the output image data. The image processor includes an input data corrector that corrects image data of a target pixel by giving a weight to error values in the neighborhood of the target pixel and adding weighted error values to a tone value of the target pixel; an output tone value determining unit that determines an output tone data of the target pixel based on corrected image data, and a threshold corresponding to a position of the target pixel; and an error value calculator that calculates a difference between the output tone data and the corrected image data as an error value. The output tone value determining unit sets the threshold in such a manner that a rate of change of a mean error value obtained from error values calculated by the error value calculator with respect to a change in the input tone value falls within a predetermined range.

According to still another aspect of the present invention, an image forming apparatus includes a data converter configured to receive image data and to convert image data of each of a plurality of pixels to a tone value; an image processor that processes the tone values thereby obtaining output image data; and an image output device that outputs an image based on the output image data. The image processor comprises includes an input data corrector that corrects image data of a target pixel by giving a weight to error values in the neighborhood of the target pixel and adding weighted error values to a tone value of the target pixel; an output tone value determining unit that determines an output tone data of the target pixel based on corrected image data, and a threshold corresponding to a position of the target pixel; and an error value calculator that calculates a difference between the output tone data and the corrected image data as an error value. The output tone value determining unit sets the threshold in such a manner that a mean error value obtained from error values calculated by the error value calculator falls within a predetermined range regardless of the input tone value.

According to still another aspect of the present invention, an image forming apparatus includes a data converter configured to receive image data and to convert image data of each of a plurality of pixels to a tone value; an image processor that processes the tone values thereby obtaining output image data; and an image output device that outputs an image based on the output image data. The image processor comprises includes an input data corrector that corrects image data of a target pixel by giving a weight to error values in the neighborhood of the target pixel and adding weighted error values to a tone value of the target pixel; an output tone value determining unit that determines an output tone data of the target pixel based on corrected image data, and a threshold corresponding to a position of the target pixel; and an error value calculator that calculates a difference between the output tone data and the corrected image data as an error value. The output tone value determining unit sets the threshold in such a manner that a mean error value obtained from error values calculated by the error value calculator with respect to a change in the input tone value is substantially any one of a monotonous decrease and a monotonous increase with respect to the input tone value.

According to still another aspect of the present invention, an image forming apparatus includes a data converter configured to receive image data and to convert image data of each of a plurality of pixels to a tone value; an image processor that processes the tone values thereby obtaining output image data; and an image output device that outputs an image based on the output image data. The image processor comprises an output tone value determining unit that outputs any one of N (N>2) output tone values based on comparison of an input tone value of a target pixel and a threshold corresponding to the target pixel position. The output tone value determining unit determines the output tone value set so as to exclude a tone value in a predetermined range, with respect to a predetermined pixel position.

According to still another aspect of the present invention, a method of image processing includes correcting image data of a target pixel by giving a weight to error values in the neighborhood of the target pixel and adding weighted error values to a tone value of the target pixel; determining an output tone data of the target pixel based on corrected image data, and a threshold corresponding to a position of the target pixel; and calculating a difference between the output tone data and the corrected image data as an error value. The determining includes setting the threshold in such a manner that a rate of change of a mean error value obtained from error values calculated at the calculating with respect to a change in the input tone value falls within a predetermined range.

According to still another aspect of the present invention, a method of image processing includes correcting image data of a target pixel by giving a weight to error values in the neighborhood of the target pixel and adding weighted error values to a tone value of the target pixel; determining an output tone data of the target pixel based on corrected image data, and a threshold corresponding to a position of the target pixel; and calculating a difference between the output tone data and the corrected image data as an error value. The determining includes setting the threshold in such a manner that a mean error value obtained from error values calculated at the calculating falls within a predetermined range regardless of the input tone value.

According to still another aspect of the present invention, a method of image processing includes correcting image data of a target pixel by giving a weight to error values in the neighborhood of the target pixel and adding weighted error values to a tone value of the target pixel; determining an output tone data of the target pixel based on corrected image data, and a threshold corresponding to a position of the target pixel; and calculating a difference between the output tone data and the corrected image data as an error value. The determining includes setting the threshold in such a manner that a mean error value obtained from error values calculated at the calculating with respect to a change in the input tone value is substantially any one of a monotonous decrease and a monotonous increase with respect to the input tone value.

According to still another aspect of the present invention, a method of image processing includes correcting image data of a target pixel by giving a weight to error values in the neighborhood of the target pixel and adding weighted error values to a tone value of the target pixel; determining an output tone data of the target pixel based on corrected image data, and a threshold corresponding to a position of the target pixel; and calculating a difference between the output tone data and the corrected image data as an error value. The determining includes setting the threshold from a threshold range determined by obtaining respective corrected image data corresponding to a plurality of output dot patterns output as output tone values in a steady state, to determine the threshold range for defining the obtained respective corrected image data.

According to still another aspect of the present invention, a method of image processing includes outputting any one of N (N>2) output tone values based on comparison of an input tone value of a target pixel and a threshold corresponding to the target pixel position. The outputting includes determining the output tone value set so as to exclude a tone value in a predetermined range, with respect to a predetermined pixel position.

According to still another aspect of the present invention, a method of image processing includes correcting image data of a target pixel by giving a weight to error values in the neighborhood of the target pixel and adding weighted error values to a tone value of the target pixel; outputting any one of N (N>2) output tone values based on comparison of corrected image data of the target pixel and a threshold corresponding to the target pixel; and calculating a difference between the output tone value and the corrected image data as an error value. The outputting includes determining the output tone value set so as to exclude a tone value in a predetermined range, with respect to a predetermined pixel position.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a detailed block diagram of an edge detector shown in FIG. 3;

FIG. 9 is a schematic diagram of an example of a primary differentiation filter;

FIG. 10 is a schematic diagram of an example of a secondary differentiation filter;

FIG. 13 is a schematic of an example of a set of output dot patterns;

FIG. 14 is a schematic diagram to explain how to write a pixel position in the output dot pattern;

FIG. 15 is a schematic in which the output dot patterns are arranged;

FIG. 16 is a schematic of a set of corrected image data corresponding to the set of output dot patterns in FIG. 13;

FIG. 17 is a schematic of an example of the threshold matrix, the value of which is increased equivalently in order of dot growth in FIG. 13;

FIG. 22 is a schematic of an example of a threshold matrix set in the second embodiment;

FIG. 24 is an explanatory diagram of an area in which a coloring material is distributed when the dot pattern is output;

FIG. 25 is a schematic diagram of an example of the set of output dot patterns used by a tone processor according to a third embodiment of the present invention;

FIG. 26 is a schematic of an example of a threshold matrix set in the third embodiment;

FIG. 30 is a schematic of an example of a threshold matrix set in the fifth embodiment;

FIG. 31 is an explanatory diagram of the sequence, in which dots are formed on the pixel position according to the threshold matrix shown in FIG. 30;

FIG. 34A is a block diagram of an image processor according to a sixth embodiment of the present invention;

FIG. 34B is a flowchart of a process procedure performed by an output tone value determining unit shown in FIG. 34A;

FIG. 41B is a flowchart of a process procedure performed by an output tone value determining unit shown in FIG. 41A.

DETAILED DESCRIPTION OF THE PREFERRED EMBODIMENTS

Exemplary embodiments of the present invention will be explained below with reference to the accompanying drawings.

Figure 1:
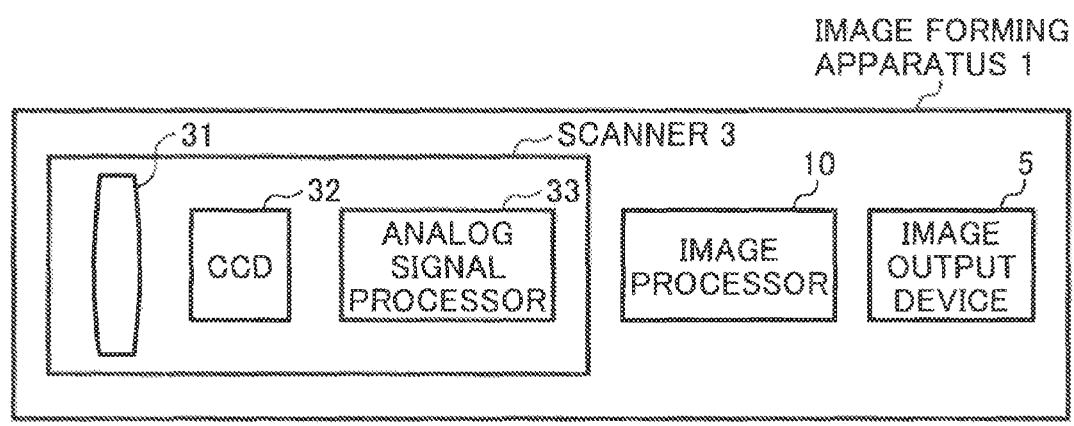
FIG. 1 is a block diagram of an image forming apparatus having an image processor according to a first embodiment of the present invention.

FIG. 1 is a block diagram of an image forming apparatus having an image processor according to a first embodiment of the present invention. An image forming apparatus 1 according to the first embodiment includes a scanner 3, an image processor 10, and an image output device 5.

The scanner 3 is configured to read an image of a document (hereinafter, "document image)". The scanner 3 includes an optical imaging lens 31, a photoelectric transducer (CCD: charge coupled device censor) 32, and an analog signal processor 33. The optical imaging lens 31 irradiates light onto the document and converges light reflected from the document to the photoelectric transducer 32. The photoelectric transducer 32 converts light into an electric signal that is indicative of image data relating to the document, and the analog signal processor 33 processes the image data.

Specifically, the photoelectric transducer 32 converts the light into RGB analog electric signals. The analog signal processor 33 performs sampling, analog/digital (A/D) conversion, and dark level correction with respect to the RGB analog electric signals to thereby obtain a full-color digital image data. The full-color digital image data is input into the image processor 10.

Instead of scanning the document with the scanner 3, a communication unit can be provided that receives the full-color digital image data via a network. In other words, it is sufficient that a full-color digital image data is available, so that how the full-color digital image data is acquired is out of the scope of the present embodiment.

Figure 2:
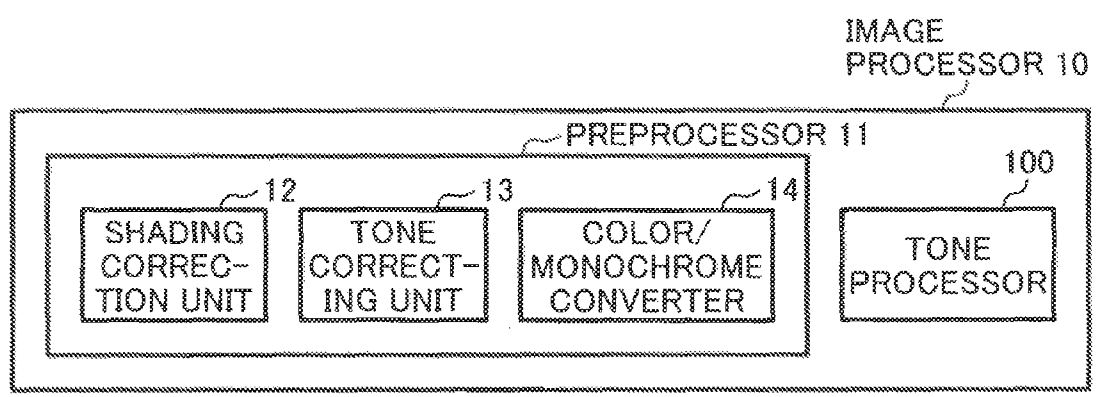
FIG. 2 is a detailed block diagram of the image processor shown in FIG. 1.

FIG. 2 is a detailed block diagram of the image processor 10. The image processor 10 includes a preprocessor 11 and a tone processor 100. The preprocessor 11 includes a shading correction unit 12, a tone correcting unit 13, and a color/monochrome converter 14.

The image data output from the scanner 3 is input to the shading correction unit 12. The shading correction unit 12 corrects a difference in the characteristics of the photoelectric transducer that reads a document or in the light distribution characteristic of a lamp for illuminating the document. The shading corrected data is input to the tone correcting unit 13.

The tone correcting unit 13 converts the shading corrected data from a luminance signal (RGB) to density data (CMY). That is, the tone correcting unit 13 generates image data of cyan (C), magenta (M), and yellow (Y). The density data is input to the color/monochrome converter 14.

The color/monochrome converter 14 converts the density data into monochrome (black and white) image data. The monochrome image data is input to the tone processor 100.

The tone processor 100 subjects the monochrome image data to halftone conversion processing. The halftone converted image data is output to the image output device 5. The input image data and the output image data have a value of from 0 to 255, wherein 0 indicates the highest density and 255 indicates the lowest density. The image output device 5 forms an image based on the halftone converted image data by controlling recording time in one pixel or the intensity of the record of one pixel, and outputs the image. The formation of the image may involve recording an image on a paper or projecting an image on a screen using a projector. The scanner 3, the image processor 10, and the image output device 5 are controlled by a control program executed by a central processing unit (CPU) (not shown).

Figures 3, 4:
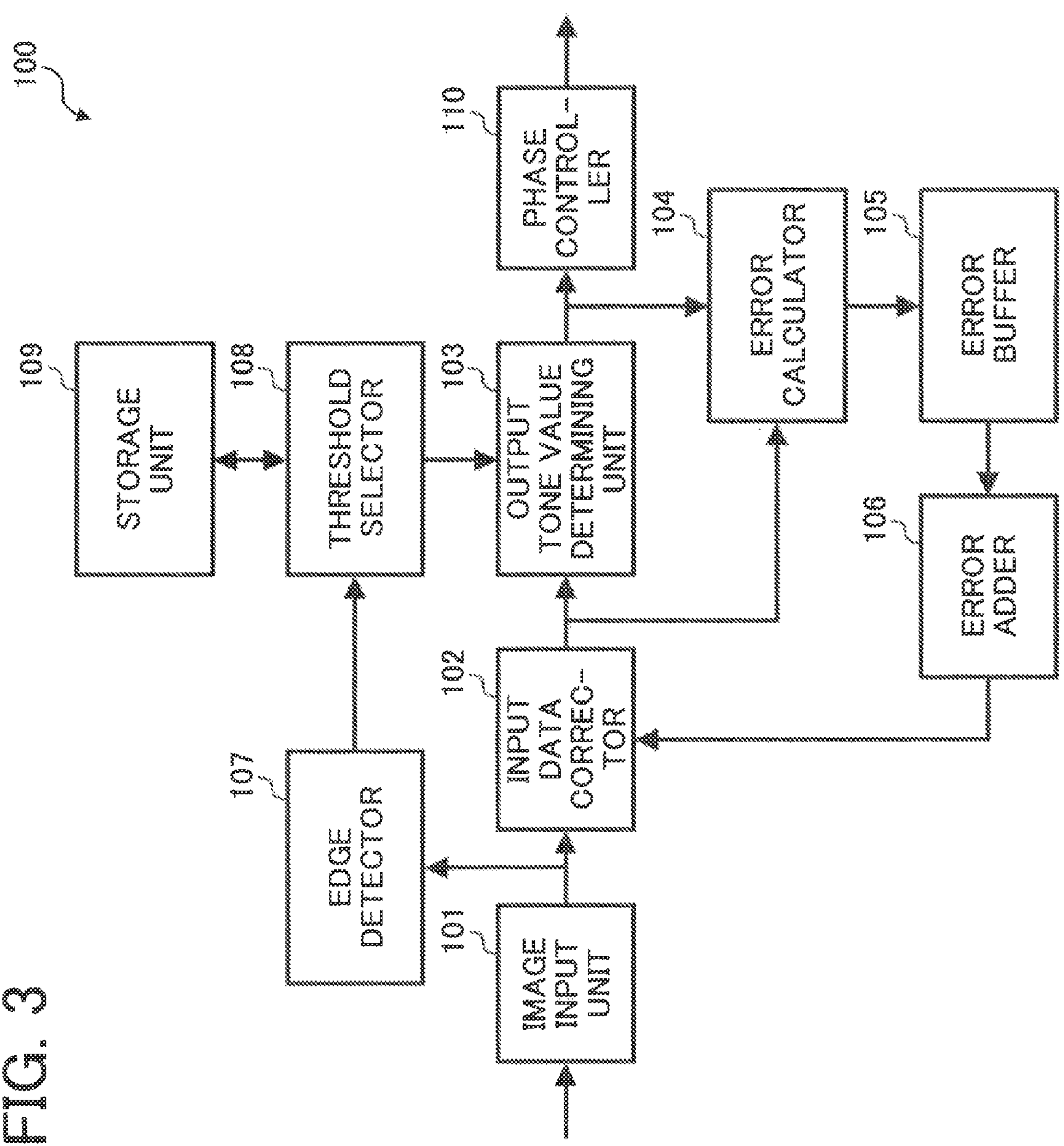
FIG. 3 is a detailed block diagram of a tone processor shown in FIG. 2.
FIG. 4 is a schematic diagram of an example of a threshold matrix set in the first embodiment.

FIG. 3 is a detailed block diagram of the tone processor 100. FIG. 4 is a schematic diagram of an example of a threshold matrix set used in the first embodiment. The tone processor 100 includes an image input unit 101, an input data corrector 102, an output tone value determining unit 103, an error calculator 104, an error buffer 105, an error adder 106, an edge detector 107, a threshold selector 108, a storage unit 109, and a phase controller 110.

The image input unit 101 receives the density data from the color/monochrome converter 14.

The edge detector 107 subjects the input image data to edge detection, and outputs the edge detection result to the threshold selector 108. The threshold selector 108 determines a threshold to perform quantization of pixels in the image data based on whether a target pixel in on or not on the edge. When the target pixel is on the edge, the threshold selector 108 selects a fixed threshold if the target pixel is the edge. On the other hand, the threshold selector 108 selects the threshold matrix set shown in FIG. 4 if the target pixel is not the edge. The threshold selector 108 outputs the selected threshold matrix to the output tone value determining unit 103. The fixed threshold and the threshold matrix are stored in the storage unit 109 beforehand. The threshold selector 108 reads the selected threshold from the storage unit 109.

The error adder 106 calculates a sum of errors in peripheral pixels of a target pixel. The input data corrector 102 corrects the image data and outputs the corrected image data to the output tone value determining unit 103. Specifically, the input data corrector 102 corrects the input image data by adding the sum of the errors calculated by the error adder 106 to the input image data of the target pixel.

The output tone value determining unit 103 performs threshold processing. In other words, the output tone value determining unit 103 compares the threshold selected by the threshold selector 108 and the corrected image data calculated by the input data corrector 102, and calculates an output tone value based on the comparison. The output tone value is output to the image output device 5 as output image data via the phase controller 110.

The error calculator 104 calculates the difference between the corrected image data and the output tone value as an error value. The error buffer 105 stores therein the error value.

The error adder 106 calculates the sum of errors in the peripheral pixels of the target pixel by using the error matrix. Specifically, the error adder 106 reads the error value from the error buffer 105, and calculates the sum of errors by performing product sum calculation of the error value and the error matrix. The sum of errors is input to the input data corrector 102.

Figure 5:
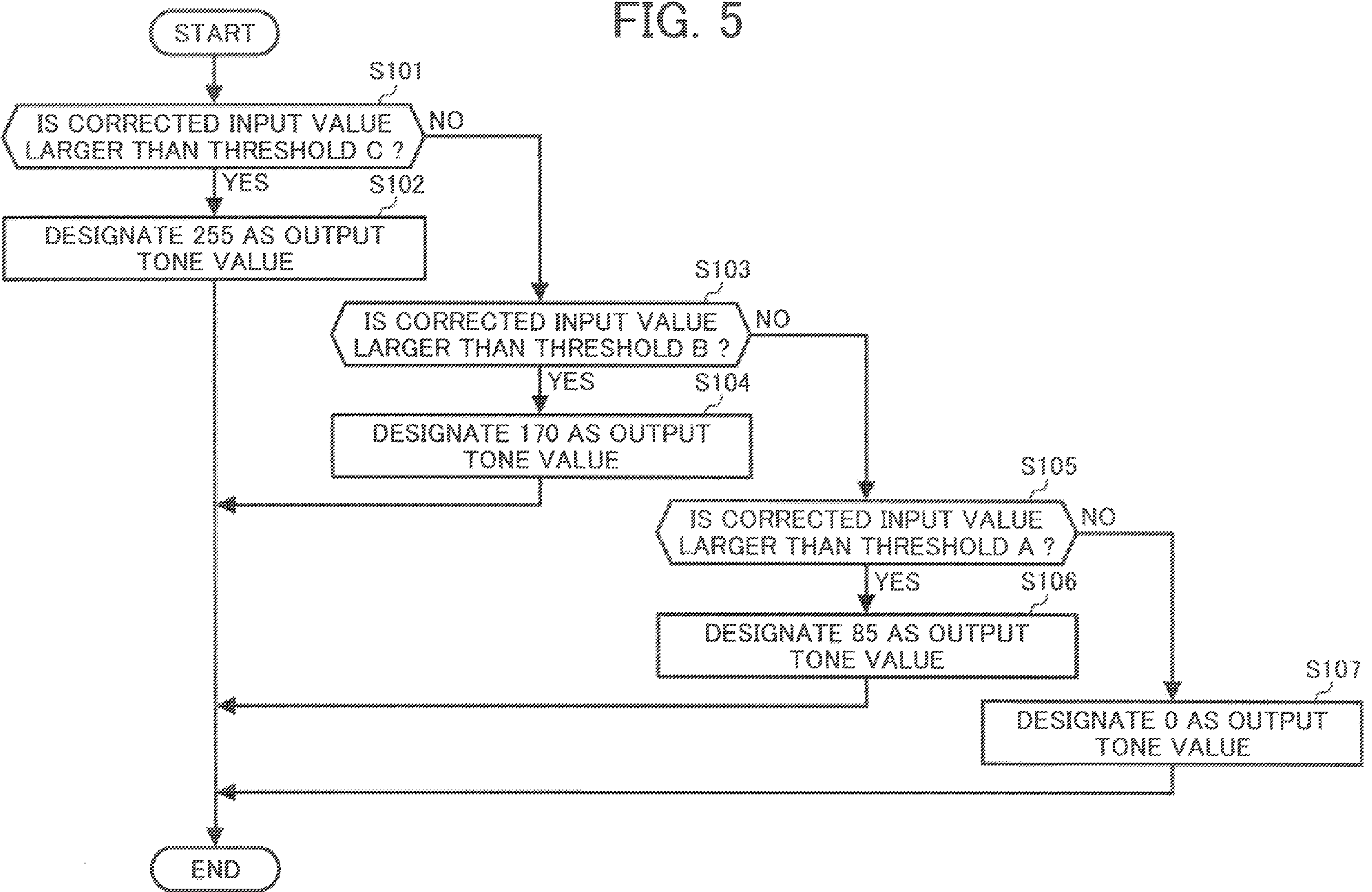
FIG. 5 is a flowchart of a process procedure performed by an output tone value determining unit shown in FIG. 3.

FIG. 5 is a flowchart of a process procedure performed by the output tone value determining unit 103 when determining the output tone value based on the threshold. How the threshold selector 108 determines the fixed threshold when the target pixel is on the edge will be explained here. A threshold A, a threshold B, and a threshold C for determining whether to output dots corresponding to the output tone value 85, 170, or 255 are prepared beforehand.

The output tone value determining unit 103 determines whether the corrected image data of the target value is larger than 184, i.e., threshold C, (step S101), and when it is larger, the output tone value determining unit 103 determines 255 as the output tone value (step S102). Otherwise, the output tone value determining unit 103 determines whether the corrected image data is larger than 104 (step S103), and when it is larger, the output tone value determining unit 103 determines 170 as the output tone value (step S104). Otherwise, the output tone value determining unit 103 determines whether the corrected image data is larger than 24 (step S105), and when it is larger, the output tone value determining unit 103 determines 85 as the output tone value (step S106). When the corrected image data does not correspond to these values (step S105, No), the output tone value determining unit 103 determines 0 as the output tone value (step S107).

It is assumed here that the output tone value output by the output tone value determining unit 103 is 0, 85, 170, or 255, and a threshold for generating these output tone values is respectively 24, 104, and 184; however, the output tone value can be any other value. It is preferable that output tone value is large; because, the density corresponding to the output tone value can be stably expressed when the output tone value is large. Moreover, the output tone value need not be even. In other words, odd output tone value, for example, 0, 128, 192, and 255, can be used. It is sufficient that the threshold does not change with the pixel position.

How the threshold selector 108 threshold matrix set when the target pixel is not on the edge will be explained. FIG. 4 depicts an example of the threshold matrix set. The threshold matrix set includes a threshold matrix A201, a threshold matrix B202, and a threshold matrix C203. The threshold matrix A201 is a threshold for determining whether to output dots corresponding to output tone value 85, the threshold matrix B202 for output tone value 170, and the threshold matrix C203 for output tone value 255.

The threshold matrices shown in FIG. 4 are threshold matrices for outputting four values expressing a halftone dot screen of about 212 lines and 45 degrees in the output resolution of 600 dots per inch (dpi). The pixel position corresponding to the target pixel on the threshold matrix is determined based on the position of the target pixel in the threshold matrix, when the pixels are repetitively laid in a tiled shape in the size of the output image. The screen is an expression of the output image by halftone cells, wherein the number of halftone cells per inch is referred to as a screen line number, and the unit is lpi (line per inch).

In other words, when the size of the threshold matrix is horizontal w pixels and vertical h pixels, a threshold of horizontal (X mod w) and vertical (Y mod h) is used in the threshold matrix coordinate with respect to a target pixel positioned in a coordinate of horizontal X and vertical Y in the coordinate of the output image data. The mod stands for a module, and (X mod w) means a surplus when X is divided by w, that is, the module calculation result. In FIG. 4, w=h=4, and for example, with respect to a pixel of (X, Y)=(9, 6) in the coordinate of the output image data, the output tone value is determined by the procedure shown in FIG. 5, by using the threshold at the position of (x, y)=(1, 2) in the threshold matrix coordinate.

That is, the thresholds A, B, and C for determining whether to output the dots corresponding to the output tone value 85, 170, or 255 determined by the output tone value determining unit 103 are equivalent to (1, 2) in the coordinate position (9, 6), that is, 176, 192, and 207, respectively. When the corrected image data of the target pixel is larger than 207, the output tone value (the value of the output image data) is 255. When the corrected image data is larger than 192 but not larger than 255, the output tone value (the value of the output image data) is 170. When the corrected image data is larger than 176 but not larger than 192, the output tone value (the value of the output image data) is 85. When the corrected image data is not any of these values, the output tone value (the value of the output image data) becomes 0.

The error calculator 104 calculates a difference between the output tone value determined by the output tone value determining unit 103 from the corrected image data calculated by the input data corrector 102 as an error value. The error buffer 105 stores therein the difference.

The output tone value output from the output tone value determining unit 103 is output to the phase controller 110, and the phase controller 110 controls the phase so as to output the received output tone value, by bringing it toward a larger value, based on the magnitude correlation between the output image data values back and front in the horizontal scanning direction. This is a well-known technique, and not the essential matter in the present invention. Therefore, the explanation thereof is omitted.

Figures 6, 7:
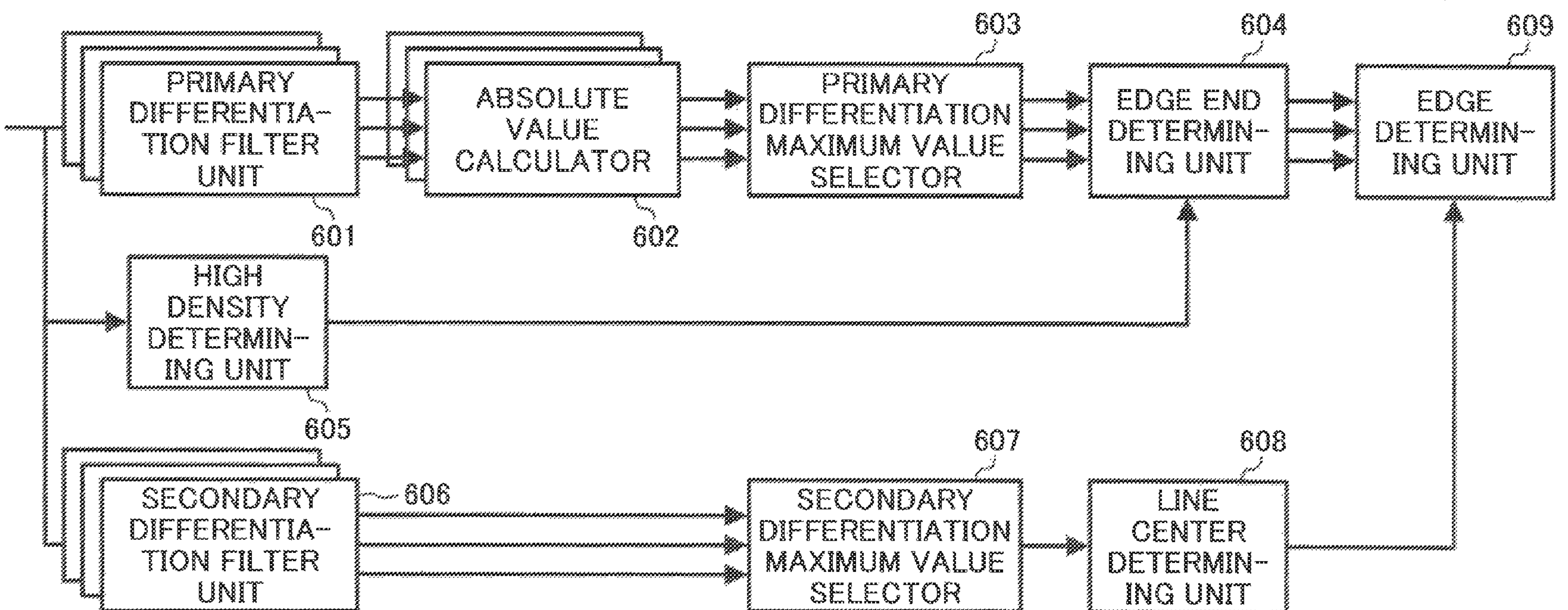
FIG. 6 is a schematic of an example of an error matrix in the first embodiment.
FIG. 7 is a schematic of another example of an error matrix in the first embodiment.

FIG. 6 is a schematic of an example of an error matrix used by the error adder 106 to calculate the sum of errors involved with the target pixel. How the input data corrector 102 calculates the corrected image data will be explained here. The error adder 106 uses the error matrix shown in FIG. 6 and the error calculated by the error calculator 104, to calculate the sum of errors involved with the target pixel. The error matrix is stored in the error adder 106, which is for defining the reflection ratio of an error occurring in a certain pixel, to calculate the sum of errors in the pixel. The involved sum of errors stands for the sum of errors added to the input image data, when calculating the corrected image data.

In FIG. 6, the mark x indicates the target pixel. For example, when the error value due to quantization of the pixel on immediately one line up from the target pixel is 32, since the value corresponding to the pixel in the error matrix is 4/32, the error value involved with the target pixel is a product of the error value due to the quantization and the value corresponding to the pixel in the error matrix, which is four. Thus, the error adder 106 reads out error values due to the quantization in 17 pixels, that is, seven pixels on two lines up, seven pixels on one line up, and three pixels on the same line with respect to one target pixel from the error buffer 105, calculates the product sum of the error value due to the quantization and the error matrix, to calculate the sum of errors involved with the target pixel, and outputs the calculated sum of errors to the input data corrector 102.

It is designed such that when all elements are added, the error matrix shown in FIG. 6 becomes 1. This is for using the generated error values in the peripheral pixels without excess and deficiency.

FIG. 7 is a schematic of another example of an error matrix that can be used in the first embodiment. The error adder 106 can calculate the error value by using the error matrix shown in FIG. 7. The error matrix shown in FIG. 7 is obtained by multiplying each value in the matrix shown in FIG. 6 by 32. For example, when the quantization error value in the pixel on one line up from the target pixel is 32, since the value corresponding to the pixel in the error matrix is 4, it is assumed that the error value in this pixel involved with the target pixel is 128, which is a product of 4 and 32.

Thus, the error adder 106 reads out error values in 17 pixels, that is, seven pixels on two lines up, seven pixels on one line up, and three pixels on the-same line with respect to one target pixel from the error buffer 105, and calculates the product sum of the error values and the error matrix, to calculate the sum of errors involved with the target pixel. By using such a method, the sum of errors involved with the target pixel can be calculated by high-speed shift operation and integer operation. After performing the above processing, the sum of errors is divided by 32. Therefore, it is seen that the substantial processing is not so much different from the processing shown in FIG. 6.

FIG. 8 is a detailed block diagram of the edge detector 107. FIG. 9 is a schematic diagram of an example of a primary differentiation filter, and FIG. 10 is a schematic diagram of an example of a secondary differentiation filter. The edge detector 107 includes a primary differentiation filter unit 601, an absolute value calculator 602, a primary differentiation maximum value selector 603, an edge end determining unit 604, a high density determining unit 605, a secondary differentiation filter unit 606, a secondary differentiation maximum value selector 607, a line center determining unit 608, and an edge determining unit 609.

The primary differentiation filter unit 601 performs primary differentiation filtering operation with respect to the input image data output from the image input unit 101 (FIG. 3). The primary differentiation filter unit 601 uses filters 701 to 704 shown in FIG. 9 to detect inclination in four directions, that is, horizontal, vertical, and diagonal directions, and performs product sum calculation with respect to the respective input image data, to obtain four types of primary differentiations, and outputs the obtained primary differentiations to the absolute value calculator 602.

The absolute value calculator 602 determines the absolute value of the primary differentiations output from the primary differentiation filter unit 601, respectively, and outputs the absolute value to the primary differentiation maximum value selector 603. The primary differentiation maximum value selector 603 outputs the largest value of the absolute values of the four types of primary differentiations output from the absolute value calculator 602 to the edge end determining unit 604, as the primary differentiation maximum value of the target pixel.

As shown in FIG. 8, the input image data output from the image input unit 101 (FIG. 3) is input to the primary differentiation filter unit 601 and the high density determining unit 605. The high density determining unit 605 determines whether the input image data of the target pixel is equal to or larger than a predetermined density threshold, and outputs the determination result to the edge end determining unit 604.

When the primary differentiation maximum value is equal to or larger than the predetermined density threshold, and the high density determination result is Yes, based on the primary differentiation maximum value received from the primary differentiation maximum value selector 603, and the high density determination result received from the high density determining unit 605, the edge end determining unit 604 determines that the target pixel is on the edge. In other cases, the edge end determining unit 604 determines that the target pixel is not on the edge. The edge end determining unit 604 then outputs the determined edge end determination result to the edge determining unit 609.

Furthermore, the input image data output from the image input unit 101 is input to the secondary differentiation filter unit 606. The secondary differentiation filter unit 606 performs secondary differentiation filtering operation with respect to the input image data. The secondary differentiation filter unit 606 performs product sum calculation with respect to the respective input image data, by using filters 801 to 804 that detect inclination in four directions, that is, horizontal, vertical, and diagonal directions, to obtain four types of secondary differentiations, and outputs the obtained secondary differentiations to the secondary differentiation maximum value selector 607.

The secondary differentiation maximum value selector 607 selects the largest value of the four types of secondary differentiations received from the secondary differentiation filter unit 606 as a secondary differentiation maximum value of the target pixel, and outputs it to the line center determining unit 608.

When the secondary differentiation maximum value is equal to or larger than a secondary differentiation threshold, based on the secondary differentiation maximum value received from the secondary differentiation maximum value selector 607, the line center determining unit 608 determines that the target pixel is in the middle of a line, and in other cases, determines that the target pixel is not in the middle of the line, and outputs the determination result to the edge determining unit 609.

When at least one of the edge determination result and the line center determination result is Yes, based on the edge determination result received from the edge end determining unit 604 and the line center determination result received from the line center determining unit 608, the edge determining unit 609 determines that the target pixel is on the edge, and in other cases, determines that the target pixel is not on the edge. The edge detector 107 outputs the edge determination result determined by the edge determining unit 609 in this manner as the edge detection result.

Figure 11A:
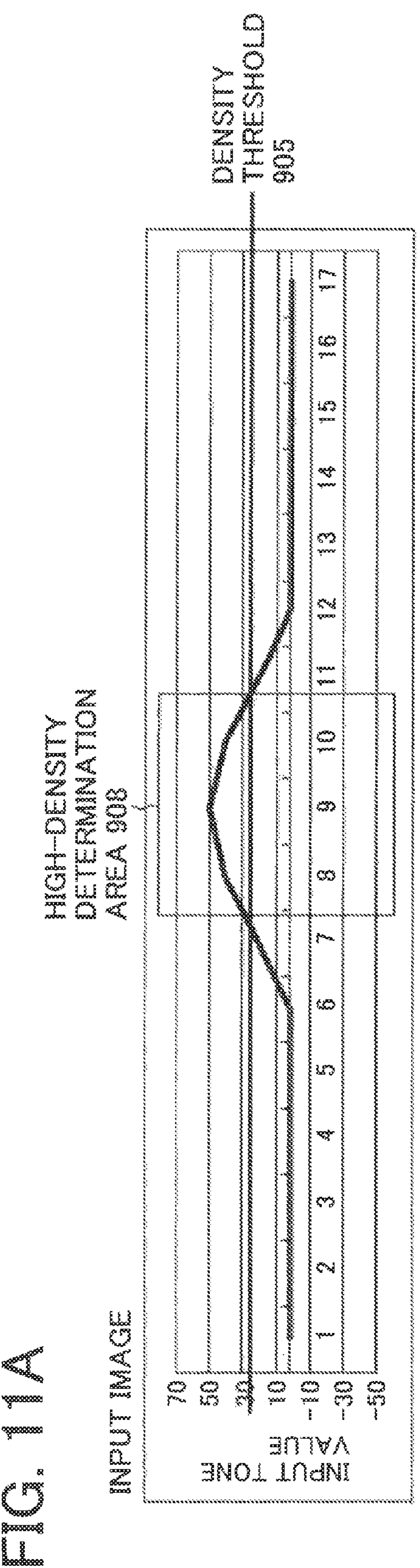
FIG. 11A is a graph to explain how the edge detector detects a high density determination area.
Figure 11B:
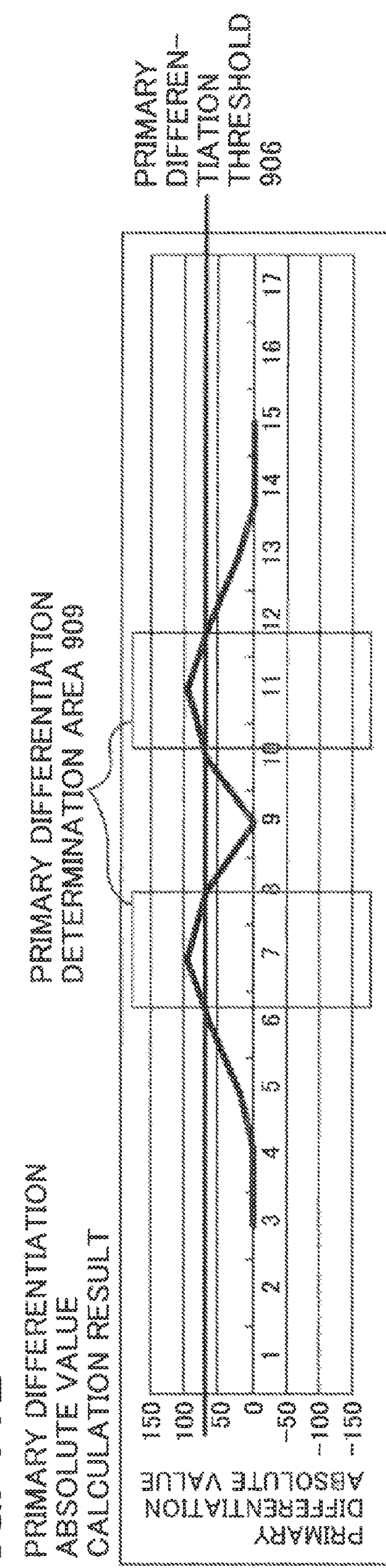
FIG. 11B is a graph to explain how the edge detector detects a primary differentiation determination area.
Figure 11C:
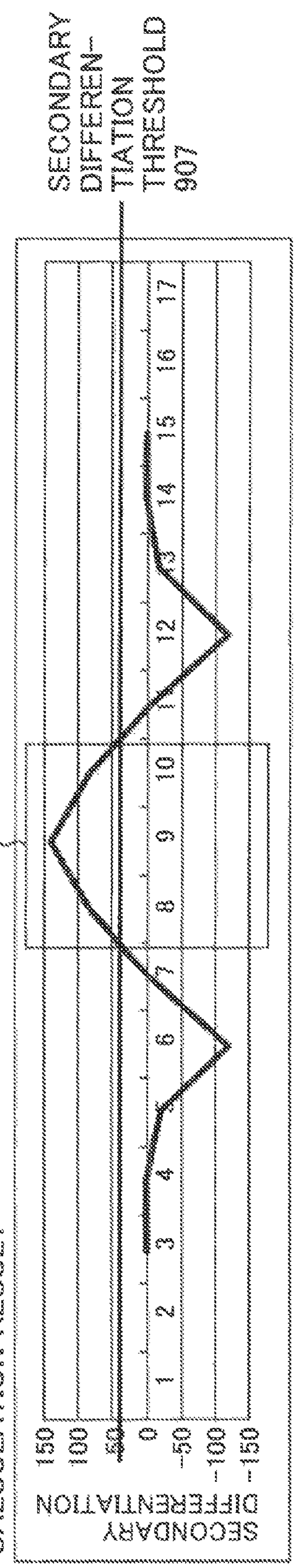
FIG. 11C is a graph to explain how the edge detector detects a secondary differentiation determination area.
Figure 11D:
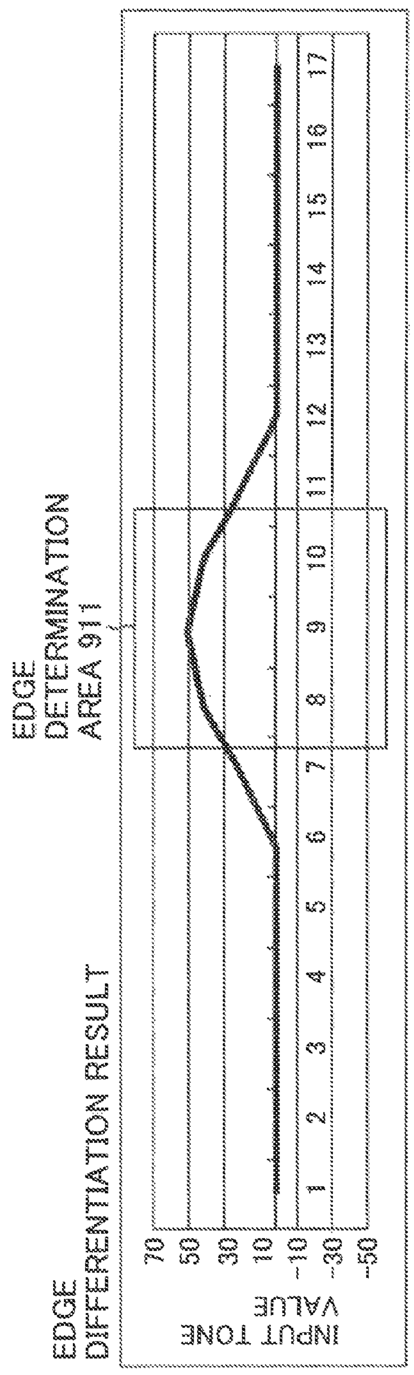
FIG. 11D is a graph to explain how the edge detector detects an edge determination area.

FIG. 11A is a graph to explain how the edge detector 107 detects a high density determination area. FIG. 11B is a graph to explain how the edge detector 107 detects a primary differentiation determination area. FIG. 11C is a graph to explain how the edge detector 107 detects a secondary differentiation determination area. FIG. 11D is a graph to explain how the edge detector 107 detects an edge determination area. In FIGS. 11A to 11D, a one-dimensional image is respectively shown for explanation. The one-dimensional image stands for image data in which a pixel value (density) is given to a one-dimensional coordinate. In the firth embodiment, it is assumed that the coordinate takes a discrete value. Since it is a one-dimensional image, the primary differentiation and the secondary differentiation are calculated by a one-way filter.

FIG. 11A depicts the tone distribution of the input image data. The Y axis indicates the tone value of the input image data, and the X axis indicates the coordinate value of the pixel. A pixel having a tone value equal to or higher than the density threshold 905 is determined to have a high density, and that pixel is determined to be in a high-density area 908. The pixel here stands for a unit constituting the input image data.

FIG. 11B depicts the calculation result of the primary differentiation absolute value, which is the result of obtaining the absolute value by subjecting the input image to the primary differentiation, wherein the Y axis indicates the absolute value of the primary differentiation. A pixel having an absolute value of primary differentiation equal to or higher than the primary differentiation threshold 906 is determined to be in a primary differentiation area 909.

FIG. 11C depicts the calculation result of the secondary differentiation, which is the result obtained by subjecting the input image to the secondary differentiation, wherein the Y axis indicates the secondary differentiation. A pixel having a secondary differentiation equal to or higher than the secondary differentiation threshold 907 is determined to be in a secondary differentiation area 910.

FIG. 11D depicts the edge detection result. The edge determining unit 609 determines an edge determination area 911 as an edge. The edge determining unit 609 determines an area satisfying the high-density area 908 and either the primary differentiation area 909 or the secondary differentiation area 910, as the edge determination area 911. According to such a determination criteria, an edge portion including fine lines and small points but excluding the background can be detected.

The procedure for designing the threshold matrix shown in FIG. 4 will be explained. At first, corrected image data at respective pixel positions in a steady state of an output dot pattern, which are desired to be output to the image forming apparatus, are calculated. The steady state stands for a state in which the same patterns are stably generated repetitively as a result of tone processing of a solid image, which is a certain input tone value. A threshold range, which becomes a given output dot pattern, is determined from the corrected image data at the respective pixel positions in the steady state. This procedure is performed with respect to various output dot patterns, to narrow the threshold range determined in the respective patterns.

Figure 12:
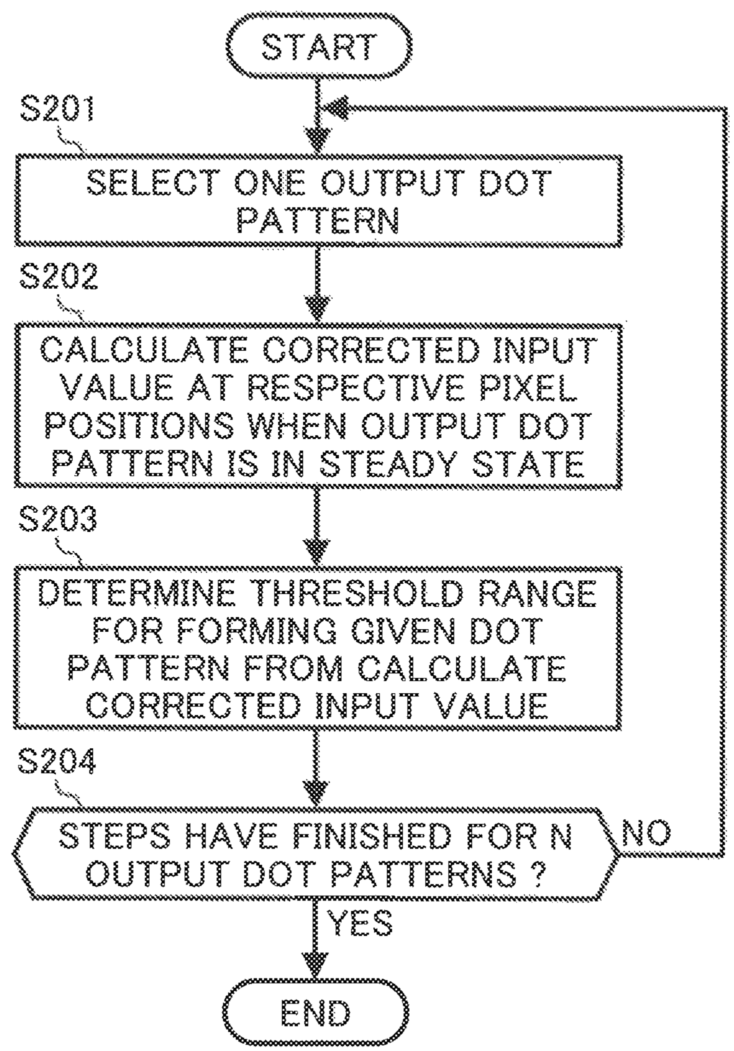
FIG. 12 is a flowchart of a process procedure for preparing the threshold matrix set shown in FIG. 4.

FIG. 12 is a flowchart of a process procedure for preparing the threshold matrix shown in FIG. 4. At first, a plurality of output dot patterns, which is desired to be output to the image forming apparatus, is prepared. It is assumed here that N output dot patterns are prepared. One output dot pattern is selected first from N output dot patterns (step S201), to calculate a corrected image data at respective pixel positions when the selected output dot pattern is in the steady state (step S202). A threshold range for forming the given dot pattern is determined from the calculated corrected image data (step S203). Determination whether steps S201 to S203 have finished is performed with respect to all N output dot patterns (step S204). When all steps have not finished yet (step S204, No), control returns to step S201, and when all steps have finished (step S204, Yes), the procedure is finished. A threshold is determined by narrowing the final threshold range based on the threshold range determined with respect to the respective output dot patterns. These steps will be explained below in more detail.

FIG. 13 is a schematic of an example of a set of output dot patterns. The calculation method of the corrected image data at the respective output dot patterns in the steady state will be explained, using the respective output dot patterns 1101 to 1125 shown in FIG. 13. It is assumed herein that the x direction in the respective matrices in FIG. 13 is the horizontal scanning direction, and the y direction is the vertical scanning direction. In other words, laser scanning is performed from left to right of the respective matrices, to perform image processing.

The respective output dot patterns in FIG. 13 are four-value output dot patterns, in which the output tone value of each pixel is any one of 0, 85, 170, and 255. For example, in the eleventh output dot pattern 1111 in the figure, a mean value of the output image data is:

$$(0\times 8+85\times 2+255\times 6)/16=106.25.$$

Therefore, when a solid image having a large tone value of 106.25 is input, repetition of the output dot pattern 1111 appears in the steady state. Calculation of the mean value here is performed in the following manner. That is, there are eight 0s, two 85s, and six 255s in the matrix, and a value obtained by adding these values is divided by 16, which is the number of matrices, to obtain the mean value.

FIG. 14 is a schematic to explain how to write a pixel position in the output dot pattern. The pixel position (x, y)=(0, 0) in the output dot pattern is expressed as p0, and a pixel position (x, y)=(1, 0) is expressed as p1.

When it is assumed that the output tone value at p0 is b0, an error value occurring at p0 is e0, a corrected image data at p0 is f0, and the input tone value is d, the following Equation (1) is established.

$$\begin{pmatrix} f_0 \\ f_1 \\ f_2 \\ f_3 \\ f_4 \\ f_5 \\ f_6 \\ f_7 \end{pmatrix} = \begin{pmatrix} d \\ d \\ d \\ d \\ d \\ d \\ d \\ d \end{pmatrix} + \frac{1}{32} \times \begin{pmatrix} 2 & 3 & 6 & 9 & 2 & 3 & 4 & 3 \\ 9 & 2 & 3 & 6 & 3 & 2 & 3 & 4 \\ 6 & 9 & 2 & 3 & 4 & 3 & 2 & 3 \\ 3 & 6 & 9 & 2 & 3 & 4 & 3 & 2 \\ 4 & 3 & 2 & 3 & 2 & 3 & 6 & 9 \\ 3 & 4 & 3 & 2 & 9 & 2 & 3 & 6 \\ 2 & 3 & 4 & 3 & 6 & 9 & 2 & 3 \\ 3 & 2 & 3 & 4 & 3 & 6 & 9 & 2 \end{pmatrix} \begin{pmatrix} e_0 \\ e_1 \\ e_2 \\ e_3 \\ e_4 \\ e_5 \\ e_6 \\ e_7 \end{pmatrix} \quad (1)$$

FIG. 15 is a schematic in which the output dot patterns are arranged. For example, the corrected image data f0 at p0 is obtained by adding the input tone value and a value obtained by weighting an error value from the meshed pixel positions in FIG. 15, and is expressed as:

$$f0=d+1/32\times(0\cdot e3+1\cdot e0+1\cdot e1+2\cdot e2+1\cdot e3+1\cdot e0+0\cdot e1+1\cdot e7+1\cdot e4+2\cdot e5+4\cdot e6+2\cdot e7+1\cdot e4+1\cdot e5+2\cdot e1+4\cdot e2+8\cdot e3)=d+1/32\times(2\cdot e0+3\cdot e1+6\cdot e2+9\cdot e3+2\cdot e4+3\cdot e5+4\cdot e6+3\cdot e7)$$

This can be confirmed in the first line of Equation (1).

Furthermore, since the error value e0 at p0 is a difference between the corrected image data and the output tone value, an equation of $$fn=en+bn\text{(where, } 0\leqq n\leqq 7) \quad (2)$$

is established based on fn−bn=en, which is substituted in Equation (1), leading to Equation (3):

$$\begin{pmatrix} e_0+b_0 \\ e_1+b_1 \\ e_2+b_2 \\ e_3+b_3 \\ e_4+b_4 \\ e_5+b_5 \\ e_6+b_6 \\ e_7+b_7 \end{pmatrix} = \begin{pmatrix} d \\ d \\ d \\ d \\ d \\ d \\ d \\ d \end{pmatrix} + \frac{1}{32} \times \begin{pmatrix} 2 & 3 & 6 & 9 & 2 & 3 & 4 & 3 \\ 9 & 2 & 3 & 6 & 3 & 2 & 3 & 4 \\ 6 & 9 & 2 & 3 & 4 & 3 & 2 & 3 \\ 3 & 6 & 9 & 2 & 3 & 4 & 3 & 2 \\ 4 & 3 & 2 & 3 & 2 & 3 & 6 & 9 \\ 3 & 4 & 3 & 2 & 9 & 2 & 3 & 6 \\ 2 & 3 & 4 & 3 & 6 & 9 & 2 & 3 \\ 3 & 2 & 3 & 4 & 3 & 6 & 9 & 2 \end{pmatrix} \begin{pmatrix} e_0 \\ e_1 \\ e_2 \\ e_3 \\ e_4 \\ e_5 \\ e_6 \\ e_7 \end{pmatrix} \quad (3)$$

From Equation (3), a unique solution cannot be obtained, since there are innumerable solutions, respectively, in the error value en and the corrected image data fn. To obtain a unique solution, it is necessary to add a conditional equation. A mean error value is provided as a condition, to reduce tone difference with respect to a gradation image. The relation between the mean error value and the tone difference with respect to the gradation image will be described later.

The mean error value is 0. This is equivalent to substitution of the following Equation (4), in which the sum total of error values is 0, by one of the lines in Equation (3).

$$0=e0+e1+e2+e3+e4+e5+e6+e7 \quad (4)$$

An example in which the uppermost line is substituted for Equation (4) is shown in Equation (5).

$$\begin{pmatrix} 0 \\ e_1+b_1 \\ e_2+b_2 \\ e_3+b_3 \\ e_4+b_4 \\ e_5+b_5 \\ e_6+b_6 \\ e_7+b_7 \end{pmatrix} = \begin{pmatrix} 0 \\ d \\ d \\ d \\ d \\ d \\ d \\ d \end{pmatrix} + \frac{1}{32} \times \begin{pmatrix} 1 & 1 & 1 & 1 & 1 & 1 & 1 & 1 \\ 9 & 2 & 3 & 6 & 3 & 2 & 3 & 4 \\ 6 & 9 & 2 & 3 & 4 & 3 & 2 & 3 \\ 3 & 6 & 9 & 2 & 3 & 4 & 3 & 2 \\ 4 & 3 & 2 & 3 & 2 & 3 & 6 & 9 \\ 3 & 4 & 3 & 2 & 9 & 2 & 3 & 6 \\ 2 & 3 & 4 & 3 & 6 & 9 & 2 & 3 \\ 3 & 2 & 3 & 4 & 3 & 6 & 9 & 2 \end{pmatrix} \begin{pmatrix} e_0 \\ e_1 \\ e_2 \\ e_3 \\ e_4 \\ e_5 \\ e_6 \\ e_7 \end{pmatrix} \quad (5)$$

Since d and bn provide an output dot pattern in the steady state, d and bn are both a known constant, and hence, the error value en can be obtained.

In the first embodiment, the uppermost line is substituted. This is because it is necessary to add a further condition, to obtain a unique solution, since there are innumerable solutions. One line of eight lines in Equation (3) is an equation having no meaning, that is, it is obtained from equations in other seven lines.

FIG. 16 is a schematic of a set of corrected image data corresponding to the set of output dot patterns in FIG. 13. The corrected image data 1701 to 1725 are calculated from Equation (1) or (2), based on the error value en. For example, when the output dot pattern 1111 in FIG. 13 is provided, a corrected image data indicated by 1711 in FIG. 16 is obtained.

To obtain the output dot pattern provided in FIG. 13, the threshold at p0 should generate an output tone value 0 with respect to corrected image data shown in 1701 to 1710 in FIG. 16, an output tone value 85 with respect to a corrected image data shown in 1711, and an output tone value 255 with respect to corrected image data shown in 1713 to 1725.

Therefore, a threshold A for determining whether to output the output tone value 85 at p0 should be equal to or larger than the maximum value 121.2 of the corrected image data in 1701 to 1710, but smaller than the minimum value 136.5 of the corrected image data in 1711 to 1725. Accordingly, a value 129 obtained by rounding off the decimal points at a median of values equal to or larger than 121.2 and smaller than 136.5, is designated as the threshold A at p0.

Likewise, a threshold B for determining whether to output the output tone value 170 is designated as 144, since it is necessary to be equal to or larger than the maximum value 136.5 of the corrected image data in 1701 to 1711, but smaller than the minimum value 151.8 of the corrected image data in 1712 to 1725.

Likewise, a threshold C for determining whether to output the output tone value 255 should be equal to or larger than the maximum value 151.8 of the corrected image data in 1701 to 1712, but smaller than the minimum value 167.0 of the corrected image data in 1713 to 1725, and hence 159 obtained by rounding off the decimal points at a median of 151.8 and 167.0 is designated as the threshold C. Thus, thresholds A to C can be obtained.

Figure 18A:
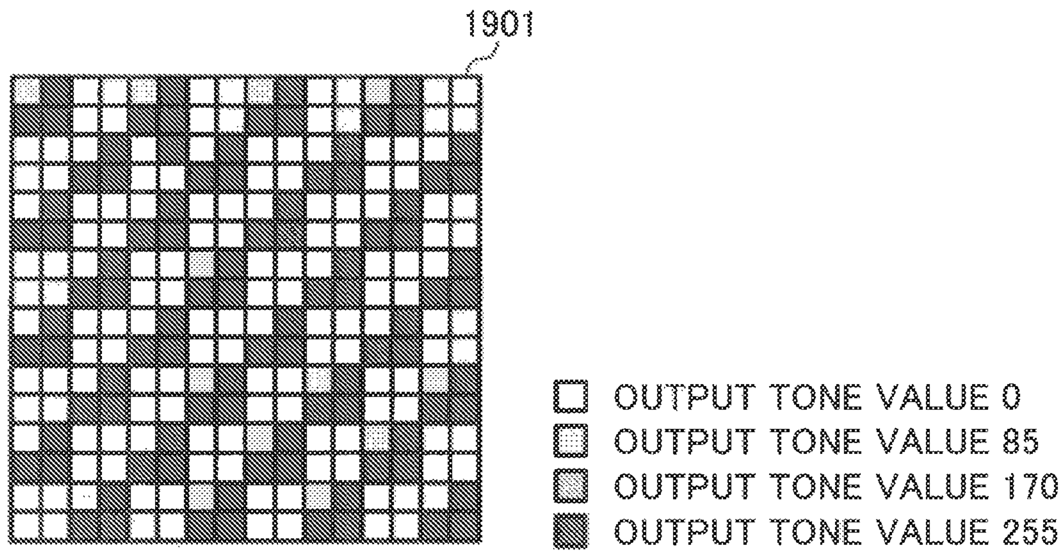
FIG. 18A is a schematic diagram of an output image cut out by using the threshold matrix in FIG. 4.
Figure 18B:
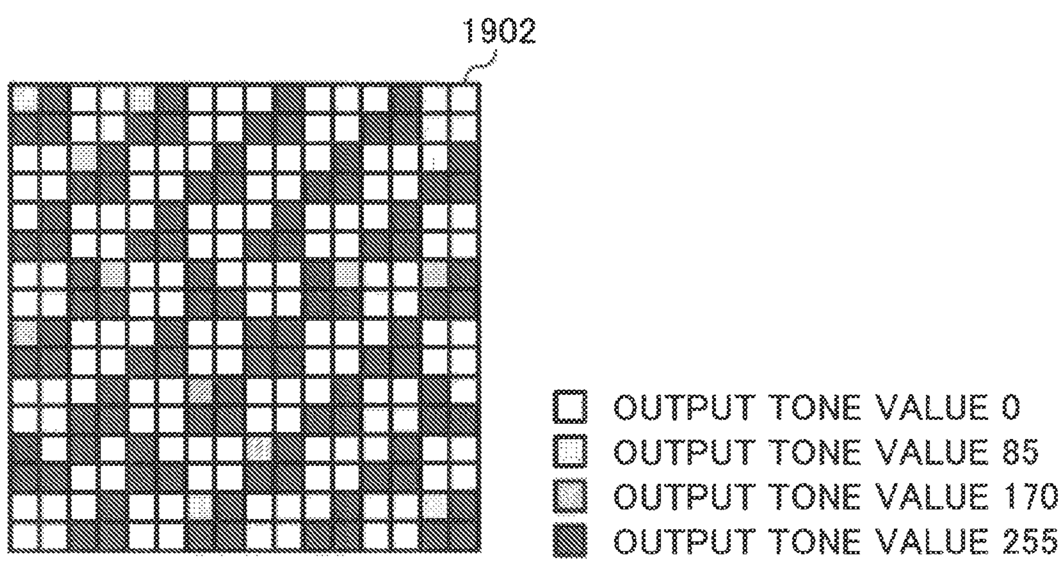
FIG. 18B is a schematic diagram of an output image cut out by using the threshold matrix shown in FIG. 17.

FIG. 17 is a schematic of an example of the threshold matrix, the value of which is increased equivalently in order of dot growth in FIG. 13. FIG. 18A is a schematic diagram of an output image cut out by using the threshold matrix in FIG. 4. FIG. 18B is a schematic diagram of an output image cut out by using the threshold matrix shown in FIG. 17. Both in the output images in FIGS. 18A and 18B, the error matrix in FIG. 6 is used.

In the output dot pattern 1110 in FIG. 13, the mean value of the output tone values is:

$$(0\times10+255\times6)\div16=95.625$$

and the mean value of the output dot pattern 1111 is 106.25 as described above. That is, the input tone value 106 is a value between the mean values of output tone values of 1110 and 1111 in FIG. 13.

The output image shown in FIG. 18A is similar to the dot pattern of 1110 and 1111 in FIG. 13, having a mean value of the output tone value close to the input tone value 106. It is seen that, while the dot patterns are arranged in each nucleus, the output image in 1902 has a difference in dot patterns in each nucleus.

Figure 19A:
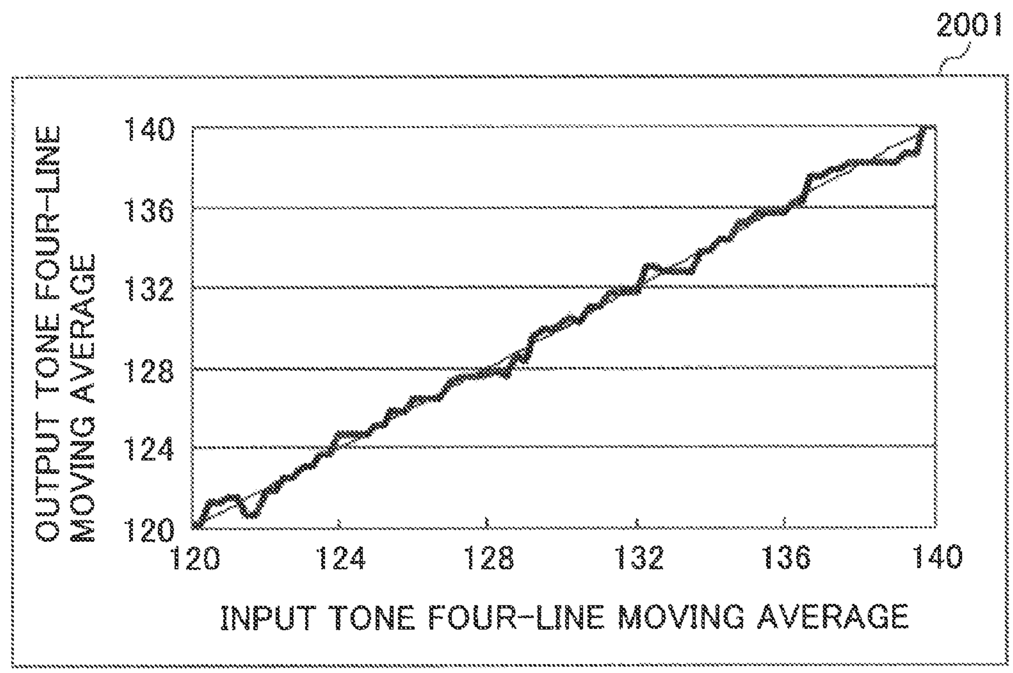
FIG. 19A is a graph of 128 dot-width and four-line output tone moving average of output images, when the tone processing according to the first embodiment is performed with respect to an input image in which the tone value is changed from 0 to 255 by a width of one tone per four lines.
Figure 19B:
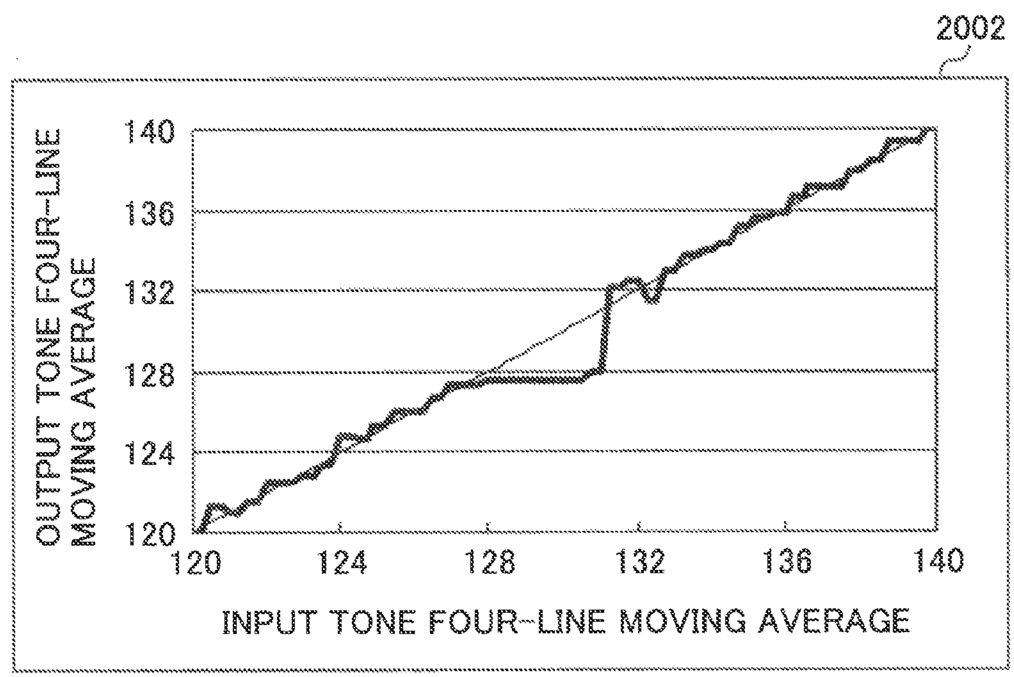
FIG. 19B is a graph of 128 dot-width and four-line output tone moving average of output images, when the tone processing is performed with respect to an input image in which the tone value is changed from 0 to 255 by a width of one tone per four lines, by using the threshold matrix shown in FIG. 17, in which the threshold is increased equivalently in order of dot growth in FIG. 13.

FIG. 19A is a graph of 128 dot-width and four-line output tone moving average of output images, when the tone processing according to the first embodiment is performed with respect to an input image in which the tone value is changed from 0 to 255 by a width of one tone per four lines. FIG. 19B is a graph of 128 dot-width and four-line output tone moving average of output images, when the tone processing is performed with respect to an input image in which the tone value is changed from 0 to 255 by a width of one tone per four lines, by using the threshold matrix shown in FIG. 17, in which the threshold is increased equivalently in order of dot growth in FIG. 13. Both in FIGS. 19A and 19B, the error matrix shown in FIG. 4 is used.

In the graph shown in FIG. 19B, the output tone 4-line moving average does not have a large change when the input tone 4-line moving average is from 128 to 130 (a flat portion), but suddenly changes (goes up) near 131. The tone difference occurs in a portion where such a sudden change occurs. On the other hand, in the graph shown in FIG. 19A when the tone processing method according to the first embodiment is employed, such a sudden change does not occur in the output tone value, and a tone difference is suppressed.

Figure 20A:
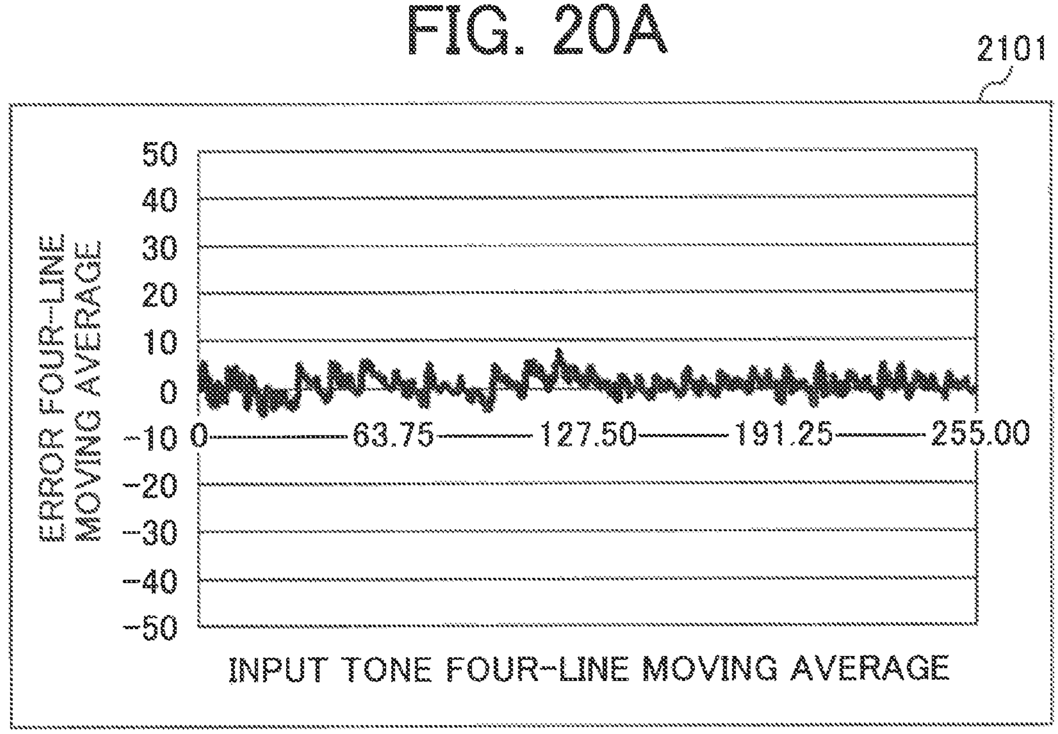
FIG. 20A is a graph of 128 dot-width and four-line error moving average of output images, when the tone processing according to the first embodiment is performed with respect to an input image in which the tone value is changed from 0 to 255 by a width of one tone per four lines.
Figure 20B:
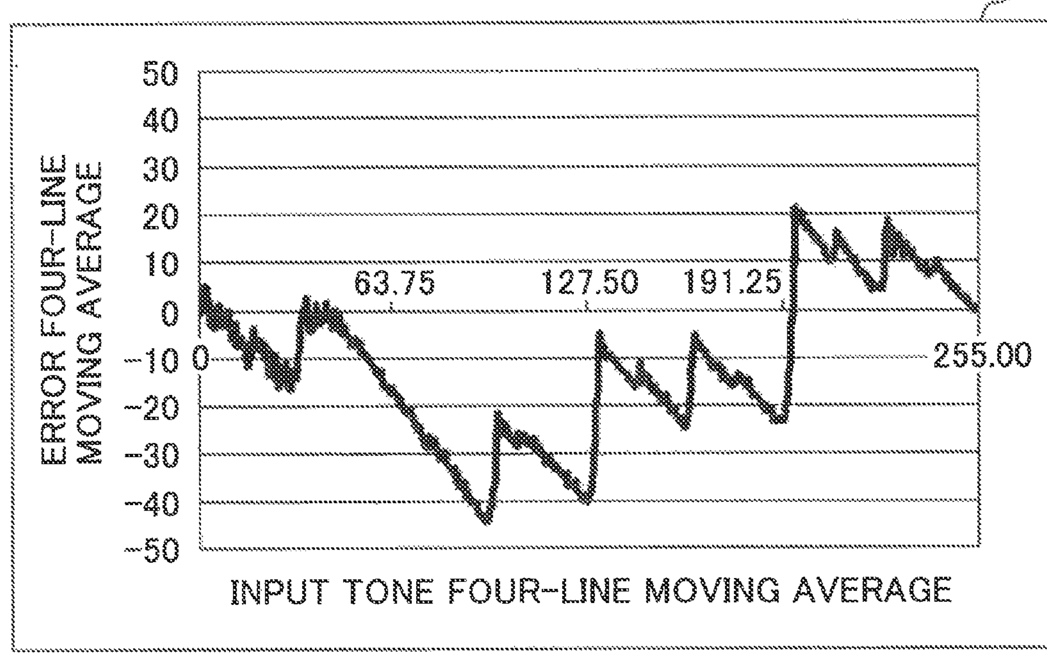
FIG. 20B is a graph of 128 dot-width and four-line error moving average of output images, when the tone processing is performed with respect to an input image in which the tone value is changed from 0 to 255 by a width of one tone per four lines, by using the threshold matrix shown in FIG. 17, in which the threshold is increased equivalently in order of dot growth in FIG. 13.

FIG. 20A is a graph of 128 dot-width and four-line error moving average of output images, when the tone processing according to the first embodiment is performed with respect to an input image in which the tone value is changed from 0 to 255 by a width of one tone per four lines. FIG. 20B is a graph of 128 dot-width and four-line error moving average of output images, when the tone processing is performed with respect to an input image in which the tone value is changed from 0 to 255 by a width of one tone per four lines, by using the threshold matrix shown in FIG. 17, in which the threshold is increased equivalently in order of dot growth in FIG. 13.

In both FIGS. 20A and 20B, the error matrix shown in FIG. 4 is used. These figures depict 128 dot-width and four-line error moving average of output images, when the tone processing is performed with respect to an input image in which the tone value is changed from 0 to 255 by a width of one tone per four lines. Both in the processing shown in FIGS. 20A and 20B, the error matrix shown in FIG. 4 is used.

In the graph shown in FIG. 20B, the error four-line moving average suddenly changes near the input tone four-line moving average 131. This approximately agrees with the position where the output tone four-line moving average shown in FIG. 19B largely changes. Thus, the tone difference occurs at a position where a sudden change occurs in the mean error value. On the other hand, in the graph shown in FIG. 20A, such a sudden change in the mean error value does not occur, and hence, a tone difference is suppressed.

The first embodiment relates to case in which the threshold is changed over based on the edge detection result. However, the present invention is not limited to this configuration, and for example, the configuration can include a threshold processor that performs different threshold processing, such that when the target pixel is on the edge, the threshold processor performs fixed threshold processing, and in other cases, performs dither threshold processing, to change over the processor based on the edge detection result.

In the first embodiment, the input image data used in the edge detector is of an image having subjected to correction processing, smoothing processing, edge reinforcement, processing, and the like, but the configuration is not limited thereto, and the data before correction can be used in the edge detector.

Furthermore, the image data in the middle of correction can be used, such that the edge detector detects an edge with respect to the image data that has been subjected to the correction processing by an image reader such as a scanner, smoothing processing, edge reinforcement, processing, and the like, but not subjected to density-correction processing by the image forming apparatus such as a copying machine, a FAX, and a printer.

In the first embodiment, the threshold used in the output tone value determining unit 103 based on the edge detection result is changed over between the fixed threshold and the dither threshold, but the present invention is not limited to this configuration. For example, when the target pixel is on the edge, the dither threshold can be used, and in other cases, a dither threshold having a different characteristic can be used. The dither threshold having a different characteristic includes a dither threshold having a different number of lines, or a dither threshold designed based on a different design.

Furthermore, instead of using two types of thresholds according to whether the target pixel is on the edge, three or more types of thresholds can be employed.

In the first embodiment, an output dot pattern on a dot screen is provided, but the present invention is not limited thereto, and for example, a single line screen can be used.

In the first embodiment, the number of output tones is 4, however, the present invention is not limited thereto. For example, the configuration can be such that an image processing method having the number of output tones of 2, 3, or 16 is used, to design the threshold in the same manner, and apply the tone processing.

For example, when the number of output tones is 2, the threshold needs only to be determined based on corrected image data obtained with respect to only 1101, 1104, 1107, 1110, 1113, 1116, 1119, 1122, and 1125 in FIG. 13.

Furthermore, in the first embodiment, processing according to the least mean error method is used, however, the present invention is not limited thereto, and the error diffusion method, which is the processing substantially equivalent thereto, can be used.

Thus, based on the tone processing according to the first embodiment, an output image in order of the desired dot growth can be obtained, taking the generated error into consideration, in the error diffusion processing using a threshold corresponding to the pixel position at the time of image processing, or the least mean error processing using a threshold corresponding to the pixel position, with respect to the input image data. Accordingly, image processing for forming a high quality image excellent in graininess and stability can be performed. Furthermore, in the error diffusion processing or the least mean error processing, since a threshold with a mean error value being suppressed is used, image processing can be performed, with the tone difference being suppressed, at the time of inputting a gradation image. Accordingly, high quality image processing can be performed.

Figure 21A:
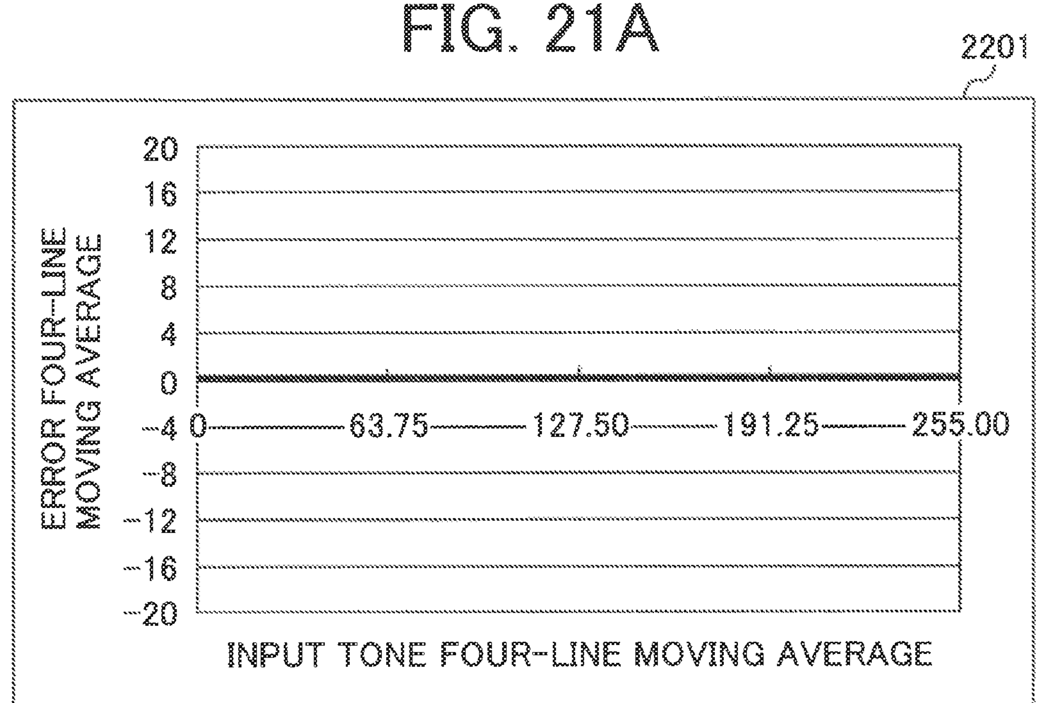
FIG. 21A is a graph of an error four-line moving average characteristic with respect to an input tone four-line moving average in a tone processor according to a second embodiment of the present invention.
Figure 21B:
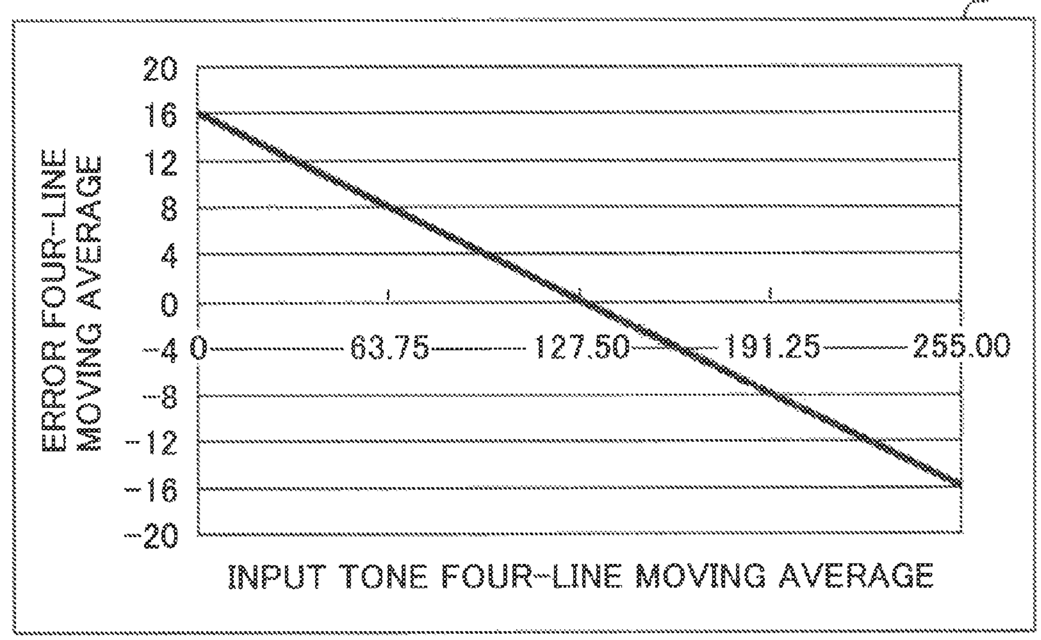
FIG. 21B is a graph of an error four-line moving average characteristic with respect to an input tone four-line moving average in another tone processor according to the second embodiment.

FIG. 21A depicts an error four-line moving average characteristic with respect to an input tone four-line moving average in the tone processor according to a second embodiment of the present invention. FIG. 21B depicts an error four-line moving average characteristic with respect to an input tone four-line moving average in another tone processor according to the second embodiment.

The difference between the tone processors according to the first embodiment and the second embodiment will be explained by using FIG. 21A.

As explained in the first embodiment, a tone difference occurs at a position where the mean error value suddenly changes. That is, when the mean error value gradually changes with respect to the mean tone value of the input image data, a tone difference does not occur. Therefore, the threshold is designed by using Equation (6) having the characteristic 2202 in FIG. 21B, instead of Equation (4) having the characteristic 2201 in FIG. 21A.

$$e(d)=1/8\times(e0+e1+e2+e3+e4+e5+e6+e7) \quad (6)$$

Equation (6) has a characteristic such that the mean error value decreases as the input tone value d increases.

FIG. 22 is a schematic of an example of a set of threshold matrices used in the second embodiment. A threshold matrix A2301, a threshold matrix B2302, and a threshold matrix C2303 is, respectively, a threshold for determining whether to output dots corresponding to the output tone value 85, dots corresponding to the output tone value 170, and dots corresponding to the output tone value 255. The threshold matrix shown in FIG. 22 has a smaller difference between the minimum value and the maximum value of the dither threshold, that is, smaller amplitude, than the threshold matrix in FIG. 4.

A reduction in the amplitude of the dither threshold serves to suppress a sudden change by reducing a difference in the threshold at a changeover portion, when the dither threshold and the fixed threshold are changed over based on the edge determination result.

An example in which the mean error value is decreased as the input tone value d increases, to reduce the amplitude is shown, however, on the contrary, the mean error value can be increased as the input tone value d increases.

This is because if the amplitude of the dither threshold is small, the sharpness is generally improved, and if the amplitude is large, the graininess is improved. When the amplitude is small, the characteristic of the least mean error processing for reproducing the original document with fidelity works strongly, and when the amplitude is large, the characteristic of the dither processing for obtaining an output according to the pattern works strongly.

Figure 23A:
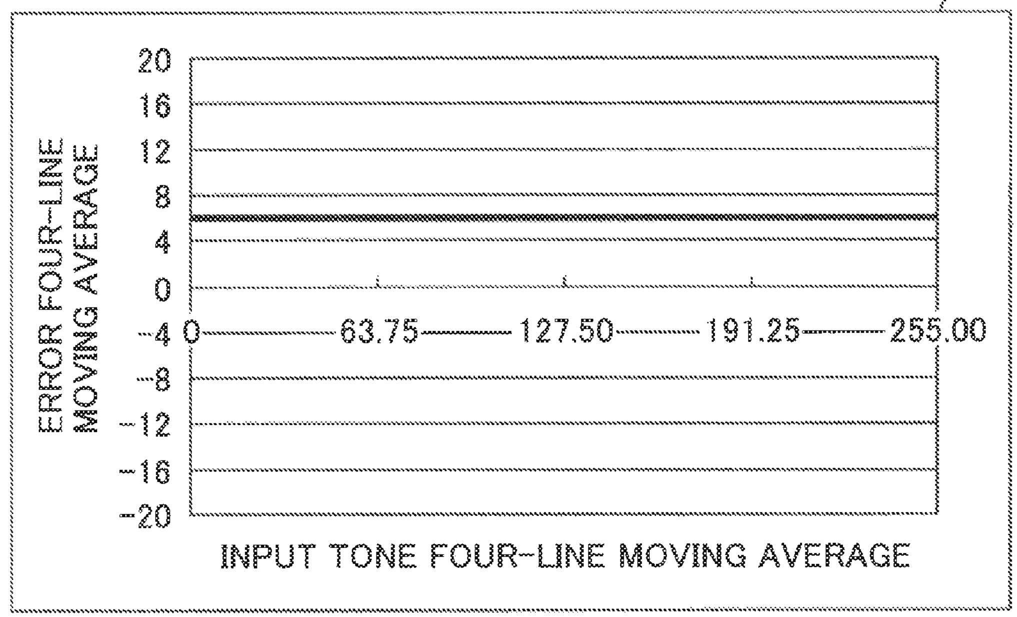
FIG. 23A is a graph of the error four-line moving average characteristic with respect to the input tone four-line moving average in a tone processor that is a variant of the tone processor according to the second embodiment.
Figure 23B:
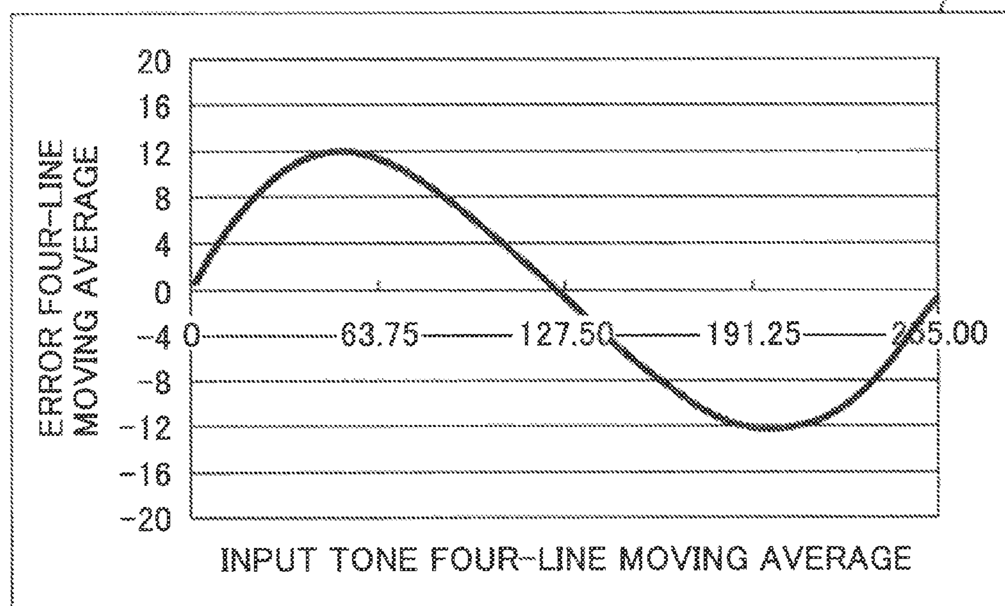
FIG. 23B is a graph of the error four-line moving average characteristic with respect to the input tone four-line moving average in another tone processor according to the second embodiment.

FIG. 23A is a graph of the error four-line moving average characteristic with respect to the input tone four-line moving average in a tone processor that is a variant of the tone processor according to the second embodiment. FIG. 23B is a graph of the error four-line moving average characteristic with respect to the input tone four-line moving average in another tone processor according to the second embodiment.

In the tone processing according to the second embodiment, as shown by the characteristic 2202 in FIG. 21B, an example in which the mean error value has a certain inclination with respect to the input tone value is shown, however, the present invention is not limited thereto. For example, the mean error value can be constant at a value, which is not zero, like the characteristic 2401 in FIG. 23A, or the error inclination can be changed so as to be close to a sine curve like the characteristic 2402 in FIG. 23B. The important point is that the mean error value does not suddenly change with a change in the input tone value, to suppress the tone difference.

Thus, the occurrence of the tone difference is suppressed by changing the mean error value gradually with respect to the mean tone value of the input image data. Furthermore, an output image in order of the desired dot growth can be obtained, taking the generated error into consideration, in the error diffusion processing using a threshold corresponding to the pixel position at the time of image processing, or the least mean error processing using a threshold corresponding to the pixel position, with respect to the input image data. Accordingly, image processing for forming a high quality image can be performed. Furthermore, in the error diffusion processing or the least mean error processing, since image processing can be performed, with the tone difference being suppressed, image processing for forming a high quality image can be performed.

The difference between a tone processing according to a third embodiment of the present invention and the same according to the first embodiment will be explained with reference to FIG. 13. The difference is that, in the tone processing in the first embodiment, the output dot pattern including isolated dot points surrounded by low-density elements is excluded, to create a threshold matrix.

The output dot patterns 1102 and 1103 in FIG. 13 are such that when the tone value at the pixel position corresponding to (x, y)=(1, 1), (3, 3) is 85 or 170, the adjacent tone values become zero. That is, there is a high possibility that dots at the pixel position corresponding to (x, y)=(1, 1), (3, 3) appear isolated, and in this case, stable dot reproduction becomes difficult.

The output dot patterns 1108 and 1109 in FIG. 13 are such that when the tone value at the pixel position corresponding to (x, y)=(1, 0), (3, 2) is 85 or 170, the tone values at pixel positions other than pixels tangent to the vertical scanning direction or tangent slantwise become zero. That is, stable dot reproduction becomes difficult, even for dots at pixel positions corresponding to (x, y)=(1, 0) and (3, 2). However, in this case, there is a high possibility that pixels corresponding to (x, y)=(1, 1) and (3, 3) tangent to the vertical scanning direction, and pixels corresponding to (x, y)=(0, 1) and (2, 3) tangent slantwise are dotted. Therefore, stable dot reproduction can be expected as compared with the output dot patterns 1102 and 1103, however, basically, it is still unstable reproduction.

Since generation of dots having a tone value of 85 and 170 at the pixel positions corresponding to (x, y)=(1, 0) and (3, 2), and generation of dots having a tone value of 85 at the pixel positions corresponding to (x, y)=(1, 0) and (3, 2) lead to an unstable output image, these types of output dot patterns 1102, 1103, 1108, and 1109 are excluded from the condition, to design the threshold.

By controlling the phase so as to output the output tone value, bringing it toward a larger value based on the magnitude correlation of the output tone values back and front in the horizontal scanning direction, the pixel positions corresponding to (x, y)=(0, 1) and (2, 3) in the output dot pattern 1105 in FIG. 13 are irradiated with laser beams, continuous with the pixels of (x, y)=(1, 1) and (1, 3) tangent to the horizontal scanning direction, and hence relatively stable dot reproduction can be expected. Therefore, the threshold is designed by including this pattern in the condition.

FIG. 24 is an explanatory diagram of an area in which a coloring material is distributed when the dot pattern is output. The coloring material can be distributed in a wider range than the area originally occupied by the respective pixels, to obtain such a state that there is no area that is not coated with the coloring material (toner) completely at the time of actual dot gain, or when all pixels are actually dotted in the maximum size. Under such a condition, the area in which the coloring material is distributed at the time of outputting the dot patterns 1122 to 1125 in FIG. 13 is shown sequentially in the coloring material distributions 2601 to 2604 in FIG. 24.

In such a case, the area of a blank present at the pixel positions corresponding to (x, y)=(0, 2) and (2, 0) is likely to change due to a deviation of the area where the coloring material is present based on a deviation of the irradiation position of laser beams, and hence, the tone is likely to degrade.

Likewise, in the output dot patterns 1120 and 1121 in FIG. 13, when the tone value at the pixel positions corresponding to (x, y)=(0, 3) and (2, 1) is 85 or 170, the tone values at pixel positions other than the pixels tangent to the vertical scanning direction are as large as 255. That is, dots at pixel positions corresponding to (x, y)=(0, 3) and (2, 1) cannot be reproduced stably. However, in the latter case, there is a low possibility that pixels corresponding to (x, y)=(0, 2) and (2, 0) tangent to the vertical scanning direction are dotted, and hence, more stable dot reproduction than in the former case can be expected, however, basically, it is still unstable reproduction.

Since generation of dots having a tone value of 85 and 170 at pixel positions corresponding to (x, y)=(0, 2) and (2, 0), and generation of dots having a tone value of 170 at the pixel positions corresponding to (x, y)=(0, 3) and (2, 1) lead to an unstable output image, these output dot patterns are excluded from the condition, to design the threshold.

An error value and a corrected image data are respectively obtained with respect to the respective output dot patterns, excluding the output dot patterns 1102, 1103, 1108, 1121, 1123, and 1124 of the output dot patterns 1101 to 1125 shown in FIG. 13, to determine the threshold.

FIG. 25 is a schematic diagram of an example of the set of output dot patterns used by a tone processor according to a third embodiment of the present invention. In FIG. 25, the corrected image data is shown. For example, when an output dot pattern indicated by 1111 in FIG. 13 is provided, the corrected image data indicated by the output dot pattern 2711 in FIG. 25 is obtained.

To obtain the output dot patterns in FIG. 13, for example at p1, the threshold should generate an output tone value 0 with respect to the corrected image data indicated by the output dot patterns 2701 to 2707 in FIG. 25, an output tone value 170 with respect to the corrected image data indicated by the output dot pattern 2709, and an output tone value 255 with respect to the corrected image data indicated by the output dot patterns 2710 to 2725.

Therefore, the threshold A for determining whether to output the output tone value 85 at p1 should be equal to or larger than the maximum value 92.8 of the corrected image data of the output dot patterns 2701 to 2710, however, smaller than the minimum value 123.3 of the corrected image data of the output dot patterns 2711 to 2725. Accordingly, a value 109 obtained by rounding off the mean value to an integer, of numerical values equal to or larger than 92.8 and smaller than 123.3, is designated as the threshold A at p0.

Likewise, since it is necessary that the threshold B for determining whether to output the output tone value 170 is present in the same range, 109 is designated as the threshold B. The threshold C for determining whether to output the output tone value 255 should be equal to or larger than the maximum value 123.3 of the corrected image data of the output dot patterns 2701 to 2709, however, smaller than the minimum value 134.6 of the corrected image data of the output dot patterns 2710 to 2725, and hence, 129 is designated as the threshold C.

FIG. 26 is a schematic of an example of a threshold matrix set used in the third embodiment. The threshold matrix shown in FIG. 26 can be obtained in the same manner as explained above.

The output image in order of the desired dot growth can be obtained by the image processor according to the third embodiment. Furthermore, a high-quality output image excellent in graininess and stability with regard to image formation on a recording medium can be obtained.

Furthermore, by setting the mean error value to a predetermined range, a high-quality output image can be obtained, with the tone difference being suppressed, when a gradation image is input.

An image forming apparatus according to a fourth embodiment of the present invention has the same configuration as the image forming apparatus 1 shown in FIG. 1. However, the image forming apparatus according to a fourth embodiment can incorporate the image processor according to the second embodiment or the third embodiment.

Accordingly, an output image in order of the desired dot growth can be obtained, and a high-quality output image excellent in graininess and stability with regard to image formation on a recording medium can be obtained.

Furthermore, by setting the mean error value to a predetermined range, a high-quality output image can be obtained, with the tone difference being suppressed, when a gradation image is input.

Figure 27:
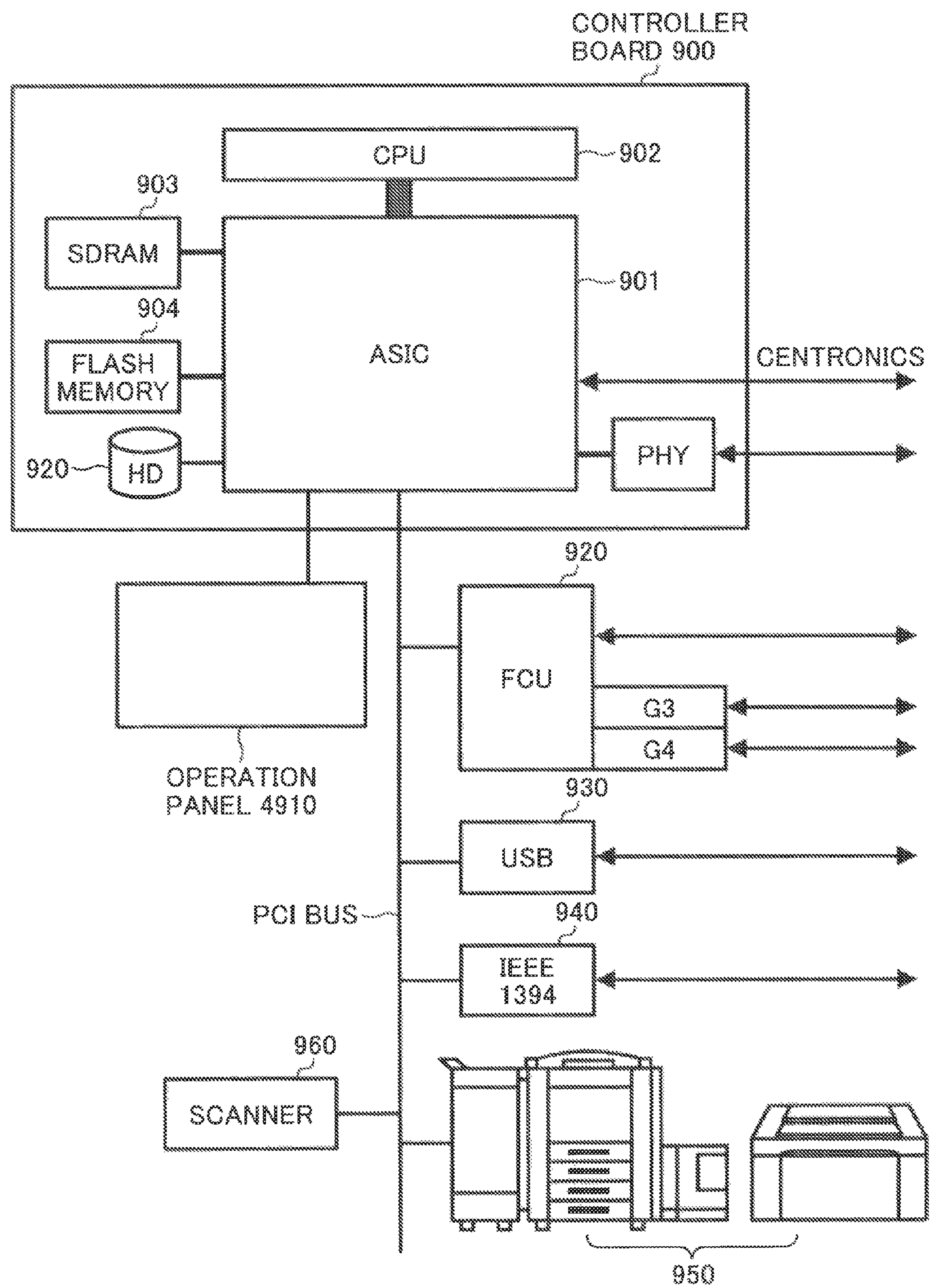
FIG. 27 is a schematic view of hardware configuration of an image forming apparatus according to a fourth embodiment of the present invention.

FIG. 27 is a schematic view of hardware configuration of an image forming apparatus according to the fourth embodiment. The image forming apparatus according to the fourth embodiment includes a controller board 900 on which a CPU 902, a synchronous dynamic random access memory (SDRAM) 903, a flash memory 904, and a hard disk (HD) 905 are connected to an application specific integrated circuit (ASIC) 901, an operation panel 4910, a fax control unit (FCU) 920, a universal serial bus (USB) 930, the Institute of Electrical and Electronics Engineers (IEEE) 1394 940, a printer 950, and a scanner 960.

The operation panel 4910 is directly connected to the ASIC 901, and the FCU 920, the USB 930, the IEEE1394 940, the printer 950, and the scanner 960 are connected to the ASIC 901 via a protocol control information (PCI) bus.

The HD 905 stores an image processing program for making the CPU in the image processor included in the image forming apparatus execute the respective procedures (steps) or execute functions of respective units.

The image processing program executed by the image processor, which is the characteristic portion of the image forming apparatus, can be recorded and provided on a computer readable recording medium such as a compact disc read only memory (CD-ROM), a flexible disk (FD), a CD recordable (CD-R), and a digital versatile disk (DVD). In this case, the CPU 902 reads the image processing program from the recording medium and loads the program on the main memory, so that the image processor executes the respective steps or the functions of respective units.

The image processing program executed by the image processor in the fourth embodiment has a module configuration including the respective units (the shading correction unit, the tone correcting unit, the color/monochrome converter, the edge detector included in the tone processor, the input data corrector, the threshold selector, the output tone value determining unit, the error calculator, the error adder, and the phase controller). In the actual hardware, since the CPU (processor) reads respective programs from the ROM and executes the programs, the respective units are loaded on the main memory, to form the respective units on the main memory.

The image processing program can be stored on a computer connected to a network such as the Internet, and provided by downloading the program via the network. Alternatively, the image processing program can be provided or distributed via the network such as the Internet.

Figure 28:
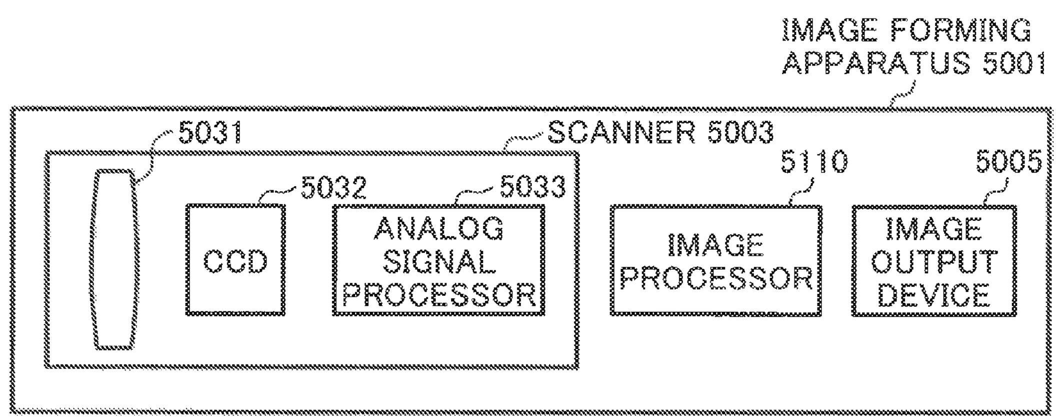
FIG. 28 is a block diagram of an image forming apparatus having an image processor according to a fifth embodiment of the present invention.

FIG. 28 is a block diagram of an image forming apparatus having an image processor according to a fifth embodiment of the present invention. An image forming apparatus 5001 includes a scanner 5003, an image processor 5110, and an image output device 5005. The image data read by the scanner 5003 is image-processed by the image processor 5110 and output to the image output device 5005. The image output device 5005 outputs an image according to the image-processed image data.

The scanner 5003 is configured to read a document image. The scanner 5003 includes an optical imaging lens 5031 that irradiates light onto the document from a light source and converges the irradiated light, a photoelectric transducer (CCD sensor) 5032 that converts light input via the optical imaging lens 5031 to an electric signal, and an analog signal processor 5033 that processes a color signal output from the photoelectric transducer 5032.

The image data of the document imaged on the photoelectric transducer via the optical imaging lens 5031 is converted to an RGB analog electric signal by the photoelectric transducer (CCD) 5032. The RGB analog electric signal converted by the photoelectric transducer 5032 is sampled and held for each color of RGB by the analog signal processor 5033, and is subjected to analog-to-digital (A/D) conversion after dark level correction and the like are performed. The converted full-color digital image data is input to the image processor 5110.

The image processor 5110 according to the fifth embodiment is explained as the one that inputs image data obtained by the scanner 5003 and processes the image data, however, the apparatus that obtains the image data is not limited to the scanner 5003, and a communication apparatus having a communication function can receive data transmitted via the network and process the image data. That is, input of the image data can be any form, and is not limited to the one via the scanner 5003.

The image output device 5005 receives image data subjected to image processing and output by the image processor 5110, and forms an image and outputs the image, by controlling the recording time in one pixel or controlling the recording power of one pixel. Image formation can be performed by any means, such as by recording an image on a recording medium, or projecting an image by a projector. The scanner 5003, the image processor 5110, and the image output device 5005 are controlled by a control program executed by a CPU (not shown).

Figure 29:
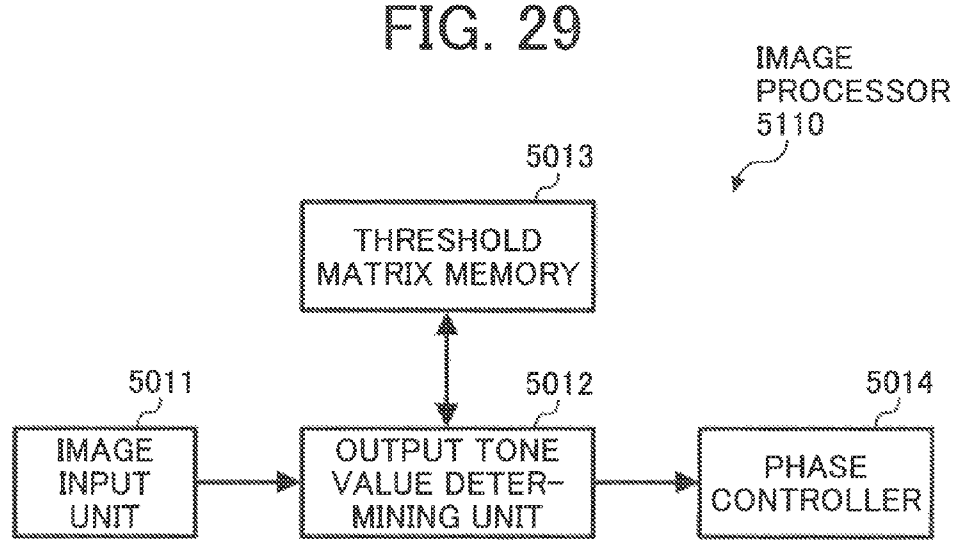
FIG. 29 is a detailed block diagram of the image processor shown in FIG. 28.

FIG. 29 is a detailed block diagram of the image processor 5110. The image processor 5110 includes an image input unit 5011, an output tone value determining unit 5012, a threshold matrix memory 5013, and a phase controller 5014.

The image input unit 5011 includes a shading correction unit, a toner correcting unit, and a color/monochrome converter (not shown) in the same manner as in the first embodiment, and performs respective processing and outputs the processed image to the output tone value determining unit 5012. That is, the image input unit 5011 performs shading correction with respect to the input RGB image data, converts a luminance signal (RGB) to density data (CMY) to generate image data of cyan (C), magenta (M), and yellow (Y). Furthermore, the image input unit 5011 obtains monochrome (black and white) image data from the color image data, with regard to the density-converted data. Thus, the image input unit 5011 performs density correction processing and frequency correction processing with respect to image data read by the scanner, for example, in a color copying machine, and inputs images converted to each of CMYK versions, and transmits the input tone value for each pixel to the post processing sequentially.

Figure 32:
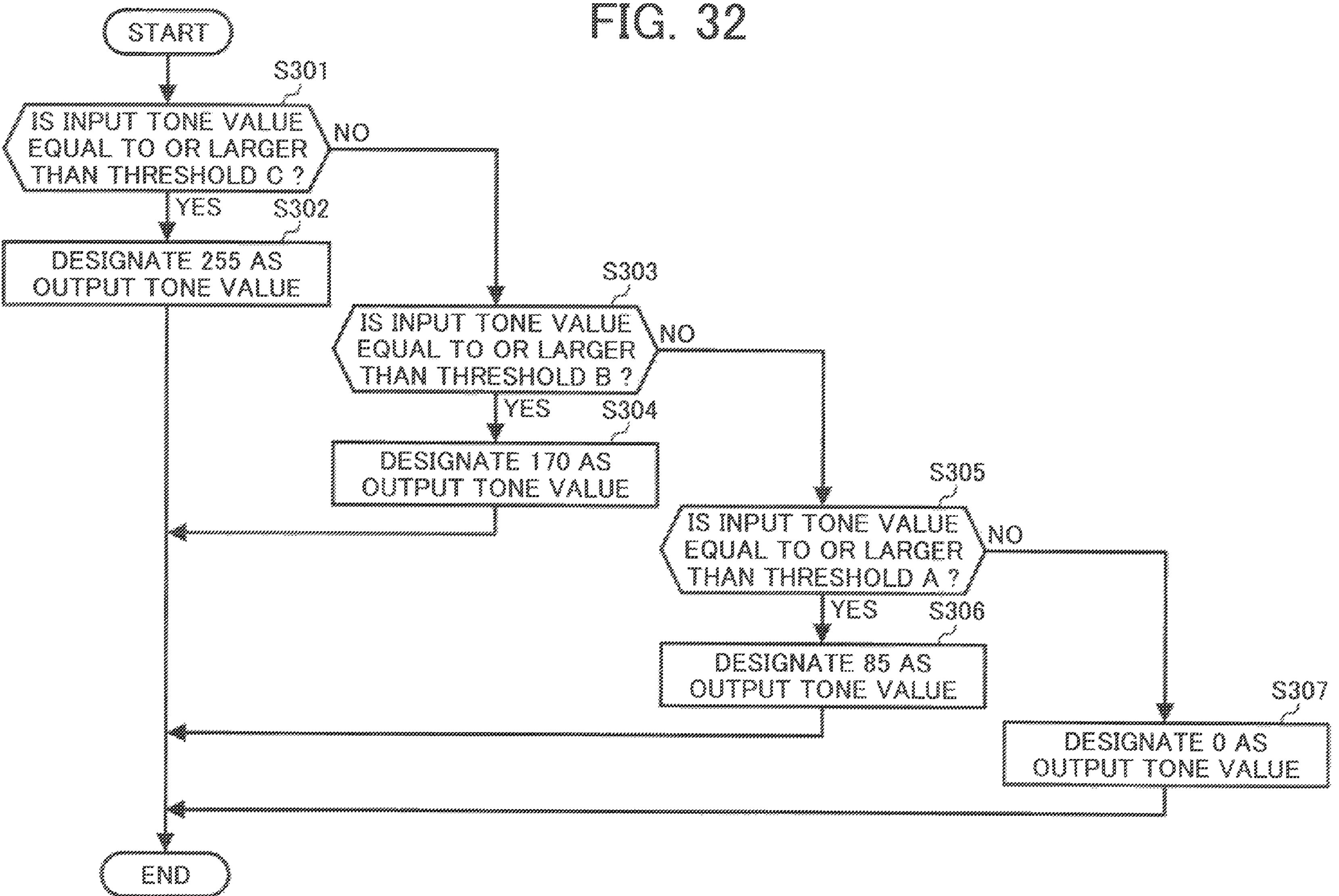
FIG. 32 is a flowchart of a process procedure performed by the output tone value determining unit shown in FIG. 29.

FIG. 30 is a schematic of an example of a threshold matrix set stored in the threshold matrix memory 5013. FIG. 31 is an explanatory diagram of the sequence, in which dots are formed on the pixel position according to the threshold matrix shown in FIG. 30. FIG. 32 is a flowchart of a process procedure performed by the output tone value determining unit 5012 with respect to the image data according to the threshold matrix.

The output tone value determining unit 5012 determines the output tone value and outputs it by a tone processing procedure shown in FIG. 32, based on the magnitude correlation between the input tone value received from the image input unit 5011 and the threshold received from the threshold matrix memory 5013.

The input tone value and the output tone value are, respectively, integers from 0 to 255 inclusive. It is assumed that 0 indicates the lowest density, and 255 indicates the highest density.

The output tone value output from the output tone value determining unit 5012 is phase-controlled by the phase controller 5014, when the phase controller 5014 is included, such that the output tone value is brought toward a larger value and output based on the magnitude correlation of the output tone values back and front in the horizontal scanning direction. However, the phase controller 5014 cannot be included.

The threshold matrix data shown in FIG. 30 is stored in the threshold matrix memory 5013 formed of a ROM or the like. The output tone value determining unit 5012 performs threshold processing with respect to the image data input by using the threshold matrix stored in the threshold matrix memory 5013, to obtain the output tone value.

The position corresponding to the target pixel on the threshold matrix is determined based on the position of the target pixel in the threshold matrix, when the pixels are repetitively laid in a tiled shape in the size of the output image. For example, when the target pixel position is (x, y)=(a, a) corresponding to the upper left of the threshold matrix shown in FIG. 31, the thresholds A, B, and C are respectively 104, 112, and 120 (FIG. 30).

The output tone value determining unit 5012 determines whether the input tone value is equal to or larger than the threshold C (step S301), and when it is determined that the input tone value is equal to or larger than the threshold C (step S301, Yes), outputs a tone value 255 (step S302). When the output tone value determining unit 5012 determines that the input tone value is smaller than the threshold C (step S301, No), the output tone value determining unit 5012 then determines whether the input tone value is equal to or larger than the threshold B (step S303). When the output tone value determining unit 5012 determines that the input tone value is equal to or larger than the threshold B (step S303, Yes), the output tone value determining unit 5012 outputs 170 (step S304), and when determining that the input tone value is smaller than the threshold B (step S303, No), the output tone value determining unit 5012 determines whether the input tone value is equal to or larger than the threshold A (step S305). When determining that the input tone value is equal to or larger than the threshold A (step S305, Yes), the output tone value determining unit 5012 outputs 85 (step S306), and when determining that the input tone value is smaller than the threshold A (step S305, No), the output tone value determining unit 5012 outputs 0 (step S307).

Thus, by determining the output tone value by using the threshold matrix shown in FIG. 30, halftone dot type dot growth becomes possible in the order shown in FIG. 31. It is assumed that the right and left direction of the matrix in FIG. 30 is the horizontal scanning direction, and the vertical direction is the vertical scanning direction. That is, a laser is scanned from left to right to form an output image.

When positions corresponding to (x, y)=(b, b), (d, d), at which matrix elements indicating the sequence of dot formation in FIG. 31 are indicated by 1, are studied, dotting is likely to occur prior to the neighboring pixels. Therefore, when it is tried to form small dots at pixel positions of elements 1 indicating the sequence, the dots are likely to be isolated, thereby making the output image unstable.

Furthermore, at positions corresponding to (x, y)=(b, a), (d, c), at which matrix elements indicating the sequence of dot formation is indicated by 3 in FIG. 31, dotting likely occurs prior to the right and left pixels. Therefore, when it is tried to form small dots at this pixel position, the output image is likely to be unstable, as well. However, in the case of the pixel positions at which the element is indicated by 3, since there is the possibility that dotting occurs ahead of this pixel, from the sequence of dot formation at positions corresponding to (x, y)=(b, b), (d, d) or (x, y)=(a, b), (c, d) neighboring in the vertical scanning direction, more stable dot reproduction can be expected than in the case of the pixel position corresponding to the sequence 1.

Figure 33:
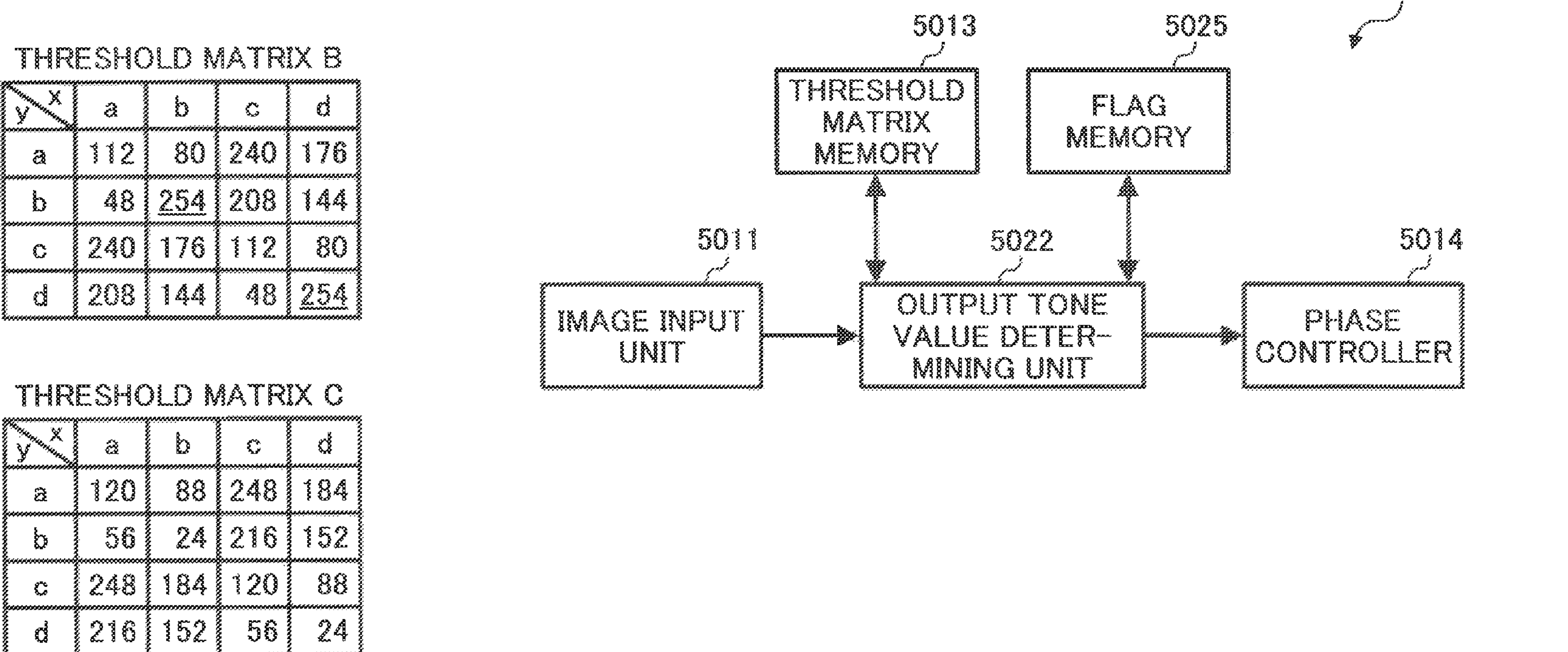
FIG. 33 is a schematic of an example of a threshold matrix set obtained by removing a predetermined tone value at a predetermined pixel position.

FIG. 33 is a schematic of an example of a threshold matrix set obtained by removing a predetermined tone value at a predetermined pixel position. In the threshold matrices B and C shown in FIG. 33, since the threshold is set very high, 85 and 170 are not output however only either 0 or 255 is output as the output tone value, at positions corresponding to (x, y)=(b, b), (d, d) due to the characteristic of dot formation, and hence, only a tone value of either 0 or 255 is used.

In the threshold matrix shown in FIG. 33, the thresholds A and B at positions corresponding to (x, y)=(b, b), (d, d) are set equal to or larger than the threshold C. Thus, by setting the thresholds A, B, and C in this manner, the thresholds at positions corresponding to (x, y)=(b, b), (d, d) are such that C is 24, B is 254, and A is 255. Therefore, for example, when the input tone value is 30, the threshold is determined (step S301), and 255 is output (step S302). However, when the input tone value is 20, it is determined that the input tone value is smaller than the threshold C (step S301, No), and the magnitude correlation with the threshold B is determined (step S303). When it is determined that the input tone value is smaller than the threshold B (step S303, No), since it is smaller than the threshold A (step S305, No), 0 is output (step S307).

Thus, since the output tone value determining unit 5012 uses such a threshold matrix, the operation of outputting 0 or 255 is enabled, at the pixel positions corresponding to (x, y)=(b, b), (d, d), without outputting the tone values 170 and 85, which are the set intermediate density.

Because the image processor according to the fifth embodiment uses the threshold set so as to output a predetermined tone value or output a tone value by excluding a tone value in a predetermined range, at a predetermined pixel position, occurrence of isolated noises can be prevented, thereby enabling image processing for forming a stable image.

FIG. 34A is a block diagram of an image processor 5120 according to a sixth embodiment according to the present invention. The image processor 5120 is different from the image processor of the fifth embodiment in that the image processor 5120 has a flag memory 5025 for raising a flag indicating whether to output an output tone value at respective pixel positions, so that an output tone value determining unit 5022 reads the flag in the flag memory 5025 to output the output tone value, by excluding a predetermined output tone value at a predetermined pixel position, while referring to the threshold matrix shown in FIG. 30.

The flag memory 5025 stores therein information indicating whether to use a predetermined tone value at respective pixel positions, corresponding to the respective pixel positions in the threshold matrix. A flag indicating that a predetermined tone value is not used at a certain pixel position is designated as 1, and a flag indicating that the predetermined tone value is used is designated as 0. The output tone value determining unit 5022 reads a selected flag corresponding to the pixel position to be threshold-processed from the flag memory 5025.

In this case, for example, if it is set by a flag indicated in the flag memory 5025 such that a flag is raised so that the tone values 85 and 170 are not output at a predetermined pixel position, 0 or 255 is output at the predetermined pixel position by excluding the tone values 85 and 170, which indicate the halftone. Thus, since the output tone value is output by excluding a predetermined tone value at a predetermined position, isolated noises can be removed, and image processing for forming a stable image can be performed.

FIG. 34B is a flowchart of a process procedure performed by the output tone value determining unit 5022 to output an output tone value. The output tone value determining unit 5022 determines whether the input tone value is equal to or larger than the threshold C (step S401), and if the input tone value is equal to or larger than the threshold C (step S401, Yes), the output tone value determining unit 5022 outputs the tone value 255 (step S402).

If the input tone value is smaller than the threshold C (step S401, No), the output tone value determining unit 5022 determines whether the input tone value is equal to or larger than the threshold B, and the flag in the flag memory 5025 is 1 at the pixel position (step S403). If the flag is 1, it means that 170 is not to be used as the output tone value. When the input tone value is equal to or larger than the threshold B, and the flag is 0 (step S403, Yes), the output tone value determining unit 5022 outputs 170 as the output tone value (step S404). In other cases, for example, when the input tone value is smaller than 170, or when the flag is 1 (step S403, No), control proceeds to the next determination step.

The output tone value determining unit 5022 determines whether the input tone value is equal to or larger than the threshold A, and the flag in the flag memory 5025 is 0 at the pixel position (step S405). When the input tone value is equal to or larger than the threshold A, and the flag is 0, the output tone value determining unit 5022 outputs a tone value 85 (step S406). When the input tone value is smaller than threshold A, or even if the input tone value is equal to or larger than the threshold A, however, the flag is 1 (step S405, No), the output tone value determining unit 5022 determines the output tone value as 0 (step S407).

Thus, by setting the flag in the flag memory 5025, the output tone value determining unit 5022 outputs an output tone value by excluding a tone value in a predetermined range at a predetermined pixel position, based on the operation of reading the flag in the flag memory 5025. Therefore, occurrence of isolated noises can be prevented, and image processing for forming a stable image can be performed.

In one example of the output tone value determination according to the sixth embodiment, the output of the tone value 85 can be excluded by using only 0, 170, or 255, without using 85 as the output tone value, at pixel positions (x, y)=(b, a) and (d, c) in FIG. 31, depending on the setting of the flag in the flag memory 5025.

Furthermore, in the sixth embodiment, an example in which any one of the four values of 0, 85, 170, and 255 is selected and output as the output tone value has been explained, however, the present invention is not limited thereto, and for example, ternary, octal, or hexadecimal output tone values can be used. Furthermore, any one of uneven values such as 0, 128, 192, and 255 can be selected and output as the output tone value.

Thus, since the image processor in the sixth embodiment checks the flag and outputs a tone value by excluding a predetermined tone value at a predetermined pixel position, occurrence of isolated noises can be prevented, and image processing for forming a stable image can be performed.

Figures 35, 36:
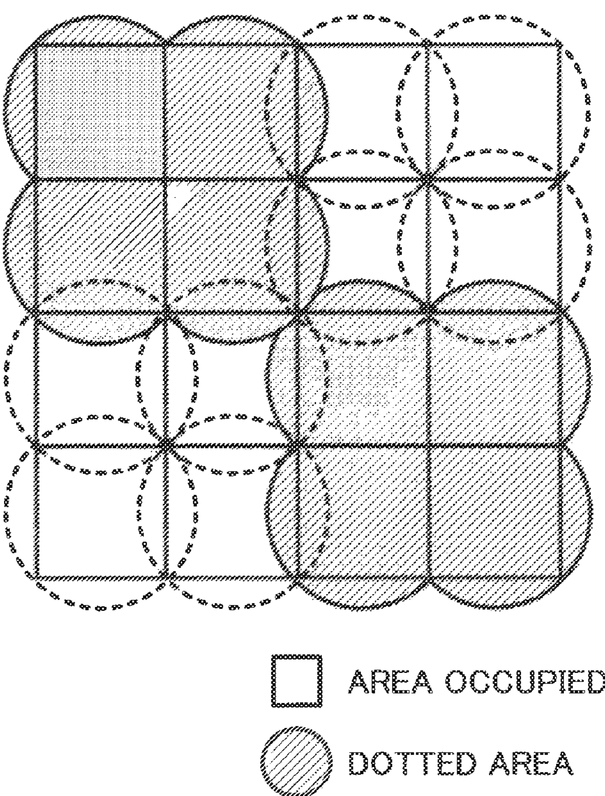
FIG. 35 is a schematic of an example of a threshold matrix set in the sixth embodiment.
FIG. 36 is a schematic diagram to explain dot formation in the sixth embodiment.

FIG. 35 is a schematic of an example of a threshold matrix set used in the sixth embodiment. In the threshold matrix according to the first embodiment, the input tone value has a higher density than that of the sixth embodiment, and hence, the image in the high-density portion can be stabilized.

FIG. 36 is a schematic diagram to explain dot formation in the sixth embodiment. For example, the output as shown in FIG. 36 is obtained when wider dotting than the area originally occupied by the respective pixels is performed, to obtain such a state that there is no area that is not coated with the coloring material completely when all pixels are dotted in the maximum size, or due to the dot gain.

In such a case, when dotting is performed in the sequence shown in FIG. 31, it becomes difficult to dot with a slight blank remained at positions corresponding to the pixel positions (x, y)=(a, c), (c, a) indicated by the generated pixel sequence 8, and pixels positions (x, y)=(a, d), (c, b) indicated by 7. Furthermore, there is hardly a difference in the output density between dotting in a large size and dotting in a small size, thereby degrading the tone.

Particularly, at the positions corresponding to the pixel positions (x, y)=(a, c), (c, a) indicated by 8, there is higher possibility that dotting occurs peripherally than at the positions corresponding to the pixel positions (x, y)=(a, d), (c, b) indicated by 7, thereby degrading the tone.

To suppress degradation in the tone, at the positions indicated by 8 in FIG. 31, such a threshold matrix is set and used that only 0 or 255 is output as a tone value, without using 85 and 170 as the output tone value.

For example, as shown in FIG. 35, a threshold matrix in which the input tone value is smaller than the threshold B and smaller than the threshold A at positions corresponding to (x, y)=(a, c), (c, a) is used. By using the threshold matrices A, B, and C shown in FIG. 35, a threshold set so as to select substantially only the threshold C, and output only 0 or 255 as the tone value is used. According to this configuration, only 0 or 255 can be output as the tone value, and even when the input tone value indicates a high density, degradation in the tone can be suppressed.

By setting a flag at respective pixel positions in the flag memory 5015, the tone can be output by excluding the halftone density.

In the threshold processing by the output tone value determining unit 5022 explained in the sixth embodiment, by setting the selection flag in the flag memory 5025 corresponding to a predetermined pixel position to 1, and setting such that output by the threshold processing is suspended at the position, the operation of outputting the tone by excluding the halftone density can be realized.

For example, at step S403 shown in FIG. 34B, when the input tone value is equal to or larger than the threshold B and when the flag in the flag memory 5025 corresponding to the output tone value 170 at the pixel position is 1, 170 is not used as the output tone value. Furthermore, when the flag in the flag memory 5025 corresponding to the output tone value 85 at the pixel position is 1, output of the tone value 85 is suspended at the pixel position.

Thus, according to the setting of the flag in the flag memory 5025, the output tone value determining unit 5022 outputs a tone value by excluding a tone value in a predetermined range at a predetermined pixel position, by reading the flag in the flag memory 5025. Accordingly, occurrence of isolated noises can be prevented, and image processing for forming a stable image can be performed. Even when the input tone value indicates a high density, degradation in the tone can be suppressed.

Thus, only 0 or 255 can be output as the tone value, and even when the input tone value indicates a high density, degradation in the tone can be suppressed.

Furthermore, at the position indicated by the sequence 7 in FIG. 31, only one of 0, 8, and 255 can be used instead of using 170 as the output tone value.

According to such an operation, when the input tone value indicates a high density at a predetermined pixel position, output can be performed by excluding a tone value indicating intermediate and high densities, for example, the tone value 170, and as a result, occurrence of isolated noises can be prevented, and image processing for forming a stable image can be performed.

Figure 37:
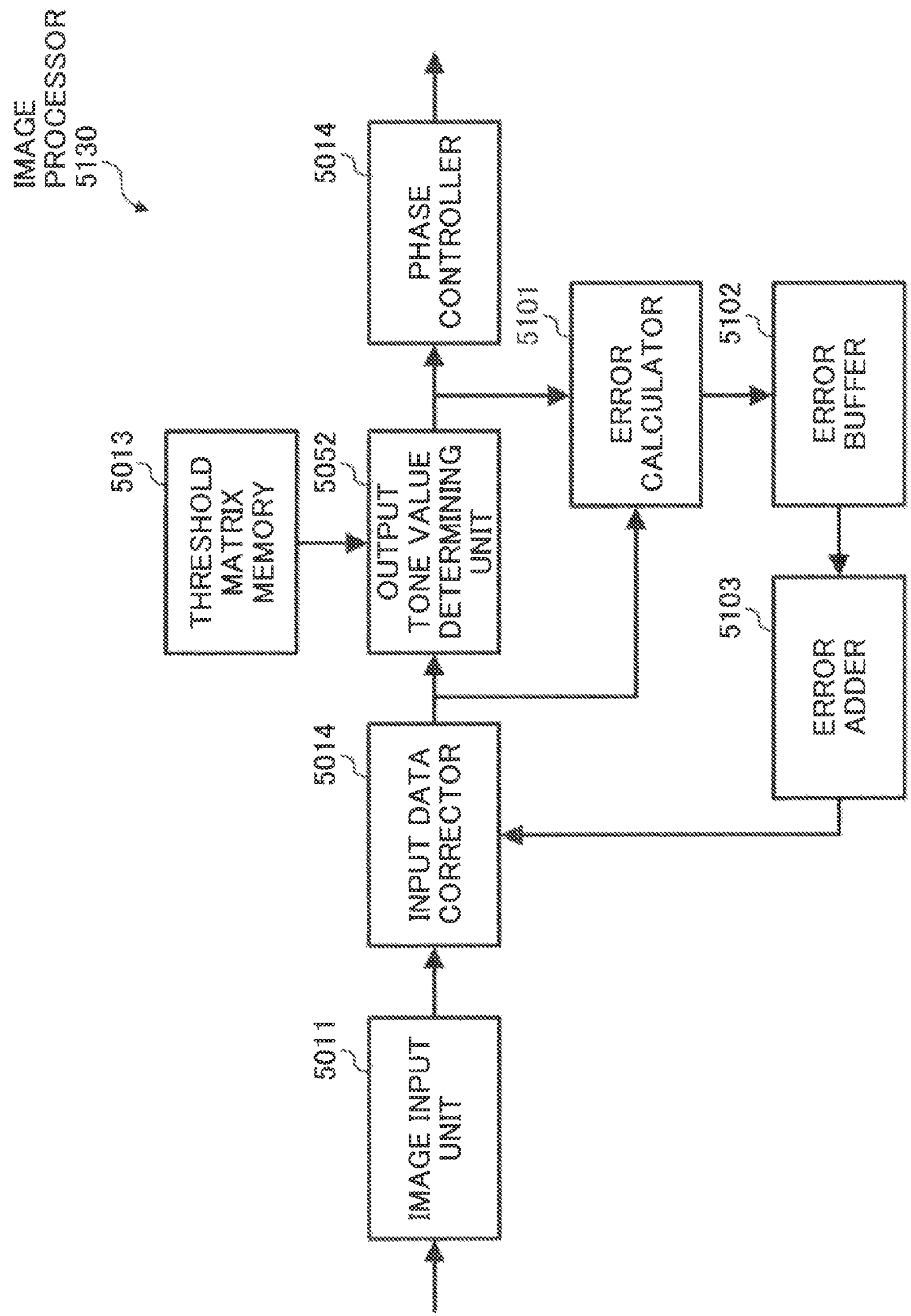
FIG. 37 is a block diagram of an image processor according to a seventh embodiment of the present invention.

FIG. 37 is a block diagram of an image processor 5130 according to a seventh embodiment of the present invention. The image processor 5130 is different from the image processor in the fifth embodiment in that the image processor 5130 includes an error calculator 5101, an error buffer 5102, an error adder 5103, and an input data corrector 5104. The operation of the image input unit 5011 is the same as that explained in relation to the fifth embodiment, and hence, the explanation thereof is omitted.

The input data corrector 5104 calculates a corrected image data, which is the sum of the pixel data in the target pixel in the image data output from the image input unit 5011 and the sum of errors in the peripheral pixels of the target pixel calculated by the error adder 5103, and outputs the corrected image data to an output tone value determining unit 5052.

The output tone value determining unit 5052 compares the magnitude correlation between the threshold matrix corresponding to the target pixel stored in the threshold matrix memory 5013 and the corrected image data calculated by the input data corrector 5104, to determine the output tone value, that is, performs threshold processing. The output tone value determined by the output tone value determining unit 5052 is output to the image output device 5005. When the image processor 5130 includes the phase controller 5014, after the output tone value is phase-controlled by the phase controller 5014, it is output to the image output device 5005 as output image data.

The error calculator 5101 calculates the difference between the corrected image data calculated by the input data corrector 5104 and the output tone value determined by the output tone value determining unit 5052 as an error value. The error buffer 5102 stores the error value calculated by the error calculator 5101.

The error adder 5103 calculates the sum of errors involved with the target pixel, by using the error matrix. The sum of errors involved with the target pixel stands for the sum of errors added to the input image data at the time of calculating the corrected image data. The error adder 5103 reads the error value calculated by the error calculator 5101 and stored in the error buffer 5102, performs product sum calculation of the error value and the error matrix, to calculate the sum of errors involved with the target pixel, and outputs the calculated sum of errors to the input data corrector 5104.

Since the procedure for determining the tone value based on the threshold in the seventh embodiment is the same as that in the fifth embodiment, the explanation thereof is omitted. The output tone value determining unit 5052 compares the magnitude correlation between the corrected image data calculated by the input data corrector 5104 and the threshold matrix stored in the threshold matrix memory 5013, to determine the output tone-value.

When the threshold matrix shown in FIG. 30 is used, for example, when the target pixel position is (x, y)=(a, a), which corresponds to the upper left in the threshold matrix shown in FIG. 30, the thresholds A, B, and C are respectively 104, 112, and 120. The output tone value is determined to be 255 when the corrected input tone value is equal to or larger than the threshold C, 170 when the corrected input tone value is smaller than the threshold C and equal to or larger than the threshold B, 85 when the corrected input tone value is smaller than the thresholds B and C and equal to or larger than the threshold A, and 0 in other cases.

The error calculator 5101 stores a value obtained by subtracting the output tone value from the corrected image data as an error in the error buffer 5102. The output tone value is determined in this manner.

Figure 38:
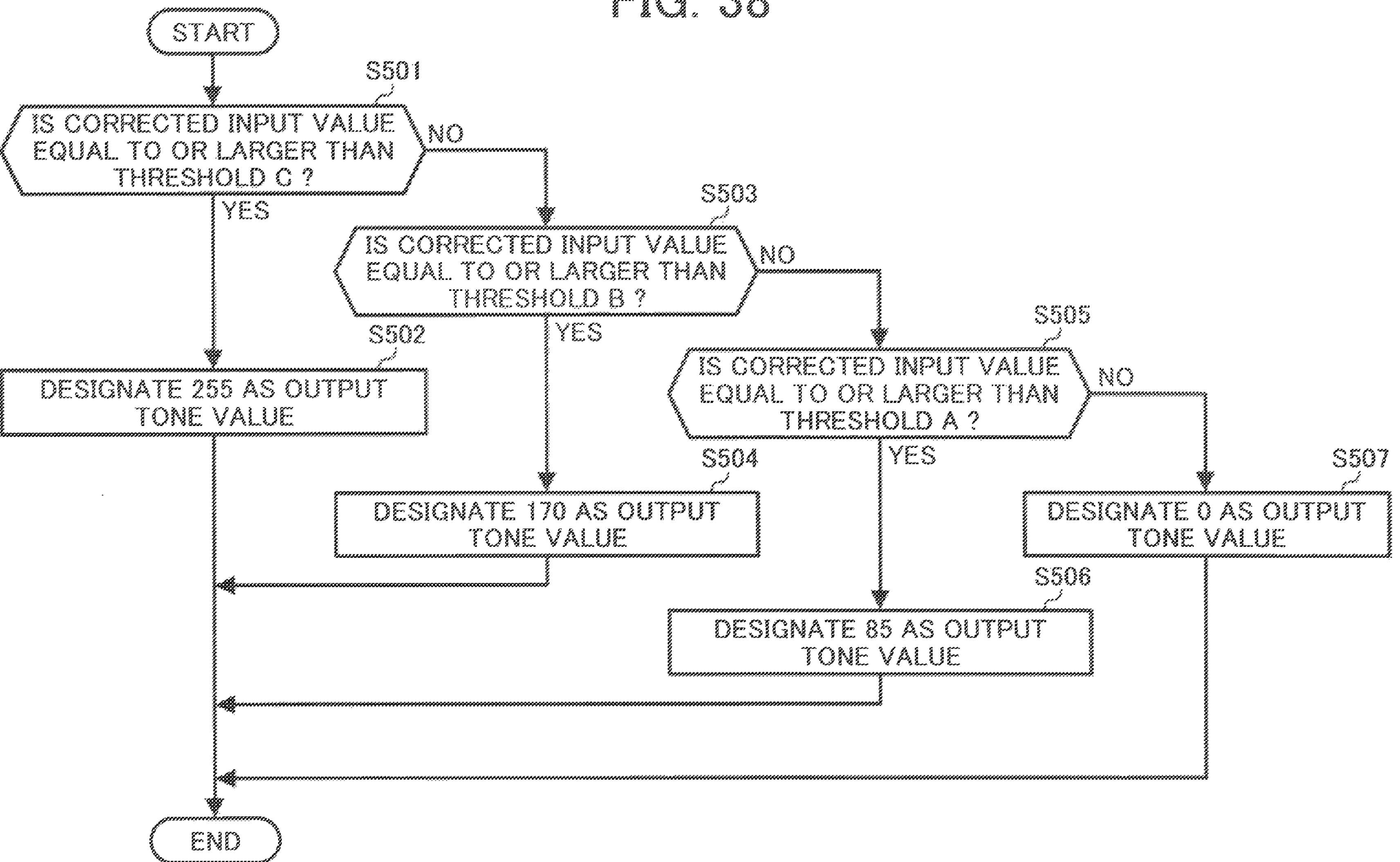
FIG. 38 is a flowchart of a process procedure performed by an output tone value determining unit shown in FIG. 37.

FIG. 38 is a flowchart of a process procedure performed by the output tone value determining unit 5052 to determine the output tone value based on the threshold.

The output tone value determining unit 5052 determines whether the corrected image data is equal to or larger than the threshold C (step S501), and when the corrected image data is equal to or larger than the threshold C (step S501, Yes), outputs the tone value 255 (step S502). When determining that the corrected image data is smaller than the threshold C (step S501, No), the output tone value determining unit 5052 determines whether the corrected image data is equal to or larger than the threshold B (step S503), and when the corrected image data is equal to or larger than the threshold B (step S503, Yes), outputs 170 (step S504). When determining that the corrected image data is smaller than the threshold B, the output tone value determining unit 5052 determines whether the corrected image data is equal to or larger than the threshold A (step S505). When determining that the corrected image data is equal to or larger than the threshold A (step S505, Yes), the output tone value determining unit 5052 outputs 85 (step S506), and when determining that the corrected image data is smaller than the threshold A (step S505, No), outputs 0 (step S507).

In this manner, by determining the output tone value with respect to the corrected image data by using the threshold matrix shown in FIG. 30, halftone dot type dot growth becomes possible in the order shown in FIG. 31.

Figures 39, 40, 41A:
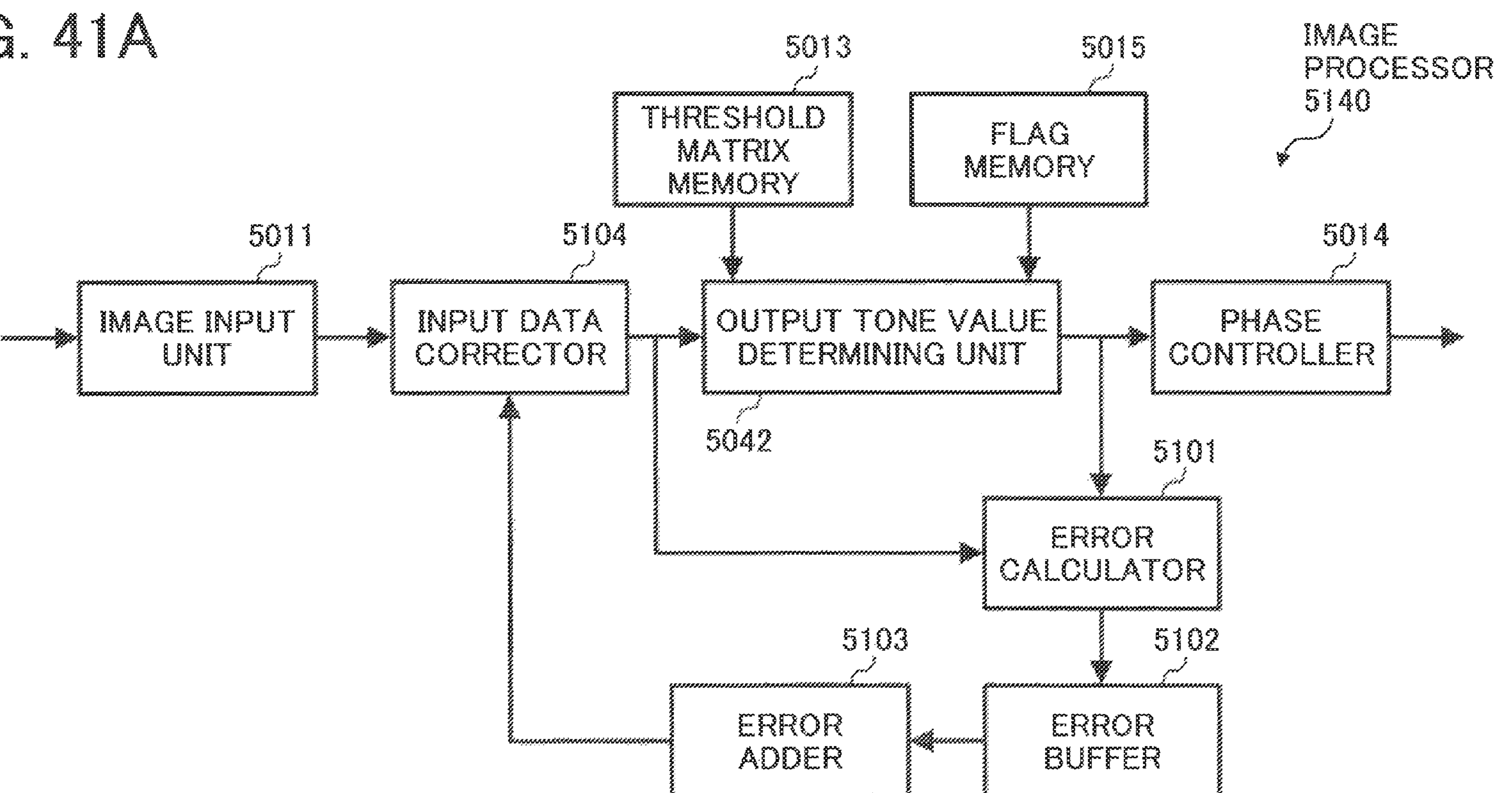
FIG. 39 is a schematic of an example of an error matrix in the seventh embodiment.
FIG. 40 is a schematic of another example of an error matrix in the seventh embodiment.
FIG. 41A is a block diagram of an image processor that is a variant of the image processor shown in FIG. 37.

FIG. 39 is a schematic of an example of an error matrix used for calculating the sum of errors involved with the target pixel by the error adder 5103. In FIG. 39, the portion indicated by a mark x is the target pixel. For example, when a quantization error in the pixel on one line up from the target pixel is 32, the value corresponding to the pixel in the error matrix is 4/32, and hence, an error in the pixel involved with the target pixel becomes 4, which is the product of 32 and 4/32. In this manner, the error adder 5103 reads out quantization errors in 17 pixels, that is, seven pixels on two lines up, seven pixels one line up, and three pixels on the same line with respect to one target pixel from the error buffer 5102, calculates the product sum of the quantization errors and the error matrix, to calculate the sum of errors involved with the target pixel, and outputs the calculated sum of errors to the input data corrector 5104.

It is designed such that when all elements are added, the error matrix shown in FIG. 39 becomes 1. This is for using the generated errors in the peripheral pixels without excess and deficiency.

FIG. 40 is a schematic of another example of an error matrix that can be used in the seventh embodiment. The error matrix shown in FIG. 40 can be used to calculate an error. The error matrix shown in FIG. 40 is obtained by multiplying each value in the matrix shown in FIG. 39 by 32. For example, when the quantization error in the pixel one line up from the target pixel is 32, since the value corresponding to the pixel in the error matrix is 4, it is assumed that the error in this pixel involved with the target pixel is 128, which is a product of 4 and 32. Thus, the error adder 5103 reads out error values in 17 pixels, that is, seven pixels on two lines up, seven pixels on one line up, and three pixels on the same line with respect to one target pixel from the error buffer 5102, and calculates the product sum of the error values and the error matrix, to calculate the sum of errors involved with the target pixel. By using such a method, the sum of errors involved with the target pixel can be calculated by high-speed integer operation. Thereafter, the sum of errors is divided by 32, since each value in the error matrix has been multiplied by 32.

At the positions corresponding to (x, y)=(b, b), (d, d) indicated by 1 in FIG. 31, dotting likely occurs prior to the neighboring pixels. When it is tried to form small dots at this position, the dot is isolated, thereby making an output image unstable.

Furthermore, at positions corresponding to (x, y)=(b, a), (d, c), dotting likely occurs prior to the right and left pixels. Therefore, when it is tried to form a small dot at this pixel position, the output image is likely to be unstable, as well. However, there is the high possibility that dotting occurs at positions corresponding to (x, y)=(b, b), (d, d) or (x, y)=(a, b), (c, d) neighboring in the vertical scanning direction, and hence, more stable dot reproduction can be expected than the former case.

Therefore, at positions corresponding to (x, y)=(b, b), (d, d), only either one of 0 and 255 is used without using 8 or 170 as the output tone value. The method therefor includes a method of using a threshold matrix, in which the threshold A and the threshold B at the positions corresponding to (x, y)=(b, b), (d, d) are equal to or larger than the threshold C, for example, as shown in FIG. 33.

FIG. 41A is a functional block diagram of an image processor 5140 that is a variant of the image processor 5130 shown in FIG. 37. The image processor 5140 includes, in the same manner as in the sixth embodiment, the flag memory 5015 that stores a flag indicating whether to output a predetermined tone value for each pixel position, and an output tone value determining unit 5042 that outputs a tone value by excluding a predetermined tone value at a predetermined pixel position with respect to the corrected image data, by using the data in the flag memory and the threshold matrix shown in FIG. 30.

FIG. 41B is a flowchart of a process procedure performed by the output tone value determining unit 5042 to perform threshold processing with respect to a corrected image data to output an output tone value. Since the procedure is similar to that explained in the sixth embodiment, the explanation is simplified here. When the corrected input tone value is equal to or larger than the threshold C (step S601, Yes), the output tone value determining unit 5042 outputs 255 (step S602). In other cases (step S601, No), when the corrected input tone value is equal to or larger than the threshold B and the flag indicates that the output tone value 170 is to be used at the pixel position (step S603, Yes), the output tone value determining unit 5042 outputs 170 (step S604). In other cases (step S603, No), when the corrected input tone value is equal to or larger than the threshold A and the output tone value 85 is to be used at the pixel position (step S605, Yes), the output tone value determining unit 5042 outputs 85 (step S606). In other cases, the output tone value determining unit 5042 outputs 0 (step S607).

Furthermore, at positions corresponding to (x, y)=(b, a), (d, c), 85 is not used as the output tone value, and only either one of 0, 170, and 255 is used.

Since it is set such that a tone value is output by excluding a predetermined tone value at a predetermined pixel position, also with respect to the output tone value processed by comparing the corrected image data corrected by adding an error between the corrected image data and the output tone value with the threshold, isolated noises can be removed to stabilize the image, and image processing for outputting a high-quality image excellent in the tone stability can be performed.

Thus, by using the image processing method according to the present invention, the stability of the image is improved, and a high-quality output image excellent in the tone stability can be obtained.

An image forming apparatus according to an eighth embodiment of the present invention has the same configuration as that of the image forming apparatus 5001 (FIG. 28). In other words, the image forming apparatus according to the eighth embodiment includes the scanner 5003, the image processor 5110, and the image output device 5005. However, the image forming apparatus according to the eighth embodiment includes the image processor according to the third embodiment or the sixth embodiment.

In other words, in the image forming apparatus according to the eighth embodiment, a tone value is output by excluding a predetermined tone value at a predetermined pixel position, while comparing the image input value or the corrected image data with the threshold. As a result, because isolated noises can be removed and a stabilized image can be obtained, a high-quality image excellent in the tone stability can be output. Accordingly, a high-quality image having excellent graininess and stability can be formed in the image formation on a recording medium.

Figure 42:
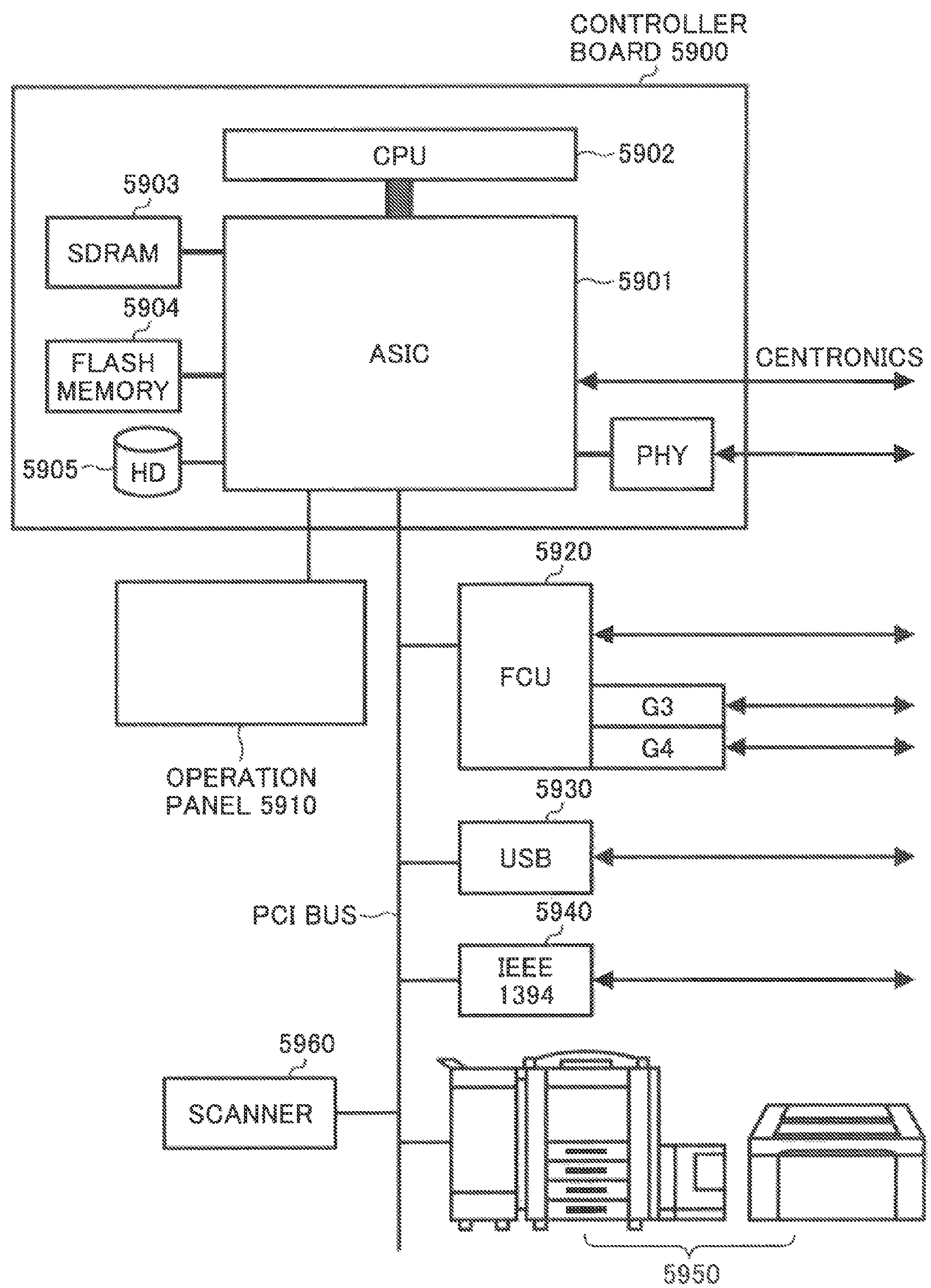
FIG. 42 is a schematic view of hardware configuration of an image forming apparatus according to an eighth embodiment.

FIG. 42 is a schematic view of hardware configuration of an image forming apparatus according to the eighth embodiment. As shown in FIG. 42, the image forming apparatus according to the eighth embodiment includes a controller board 5900 on which a CPU 5902, an SDRAM 5903, a flash memory 5904, and an HD 5905 are connected to an ASIC 5901, an operation panel 5910, a FCU 5920, a USB 5930, the IEEE1394 5940, a printer 5950, and a scanner 5960.

The operation panel 5910 is directly connected to the ASIC 5901, and the FCU 5920, the USB 5930, the IEEE1394 5940, the printer 5950, and the scanner 5960 are connected to the ASIC 5901 via a PCI bus.

The HD 5905 stores an image processing program for making the CPU in the image processor included in the image forming apparatus execute the respective procedures (steps) or execute functions of respective units.

The image processing program executed by the image processor, which is the characteristic portion of the image forming apparatus, can be recorded and provided on a computer readable recording medium such as a CD-ROM, an FD, a CD-R, and a DVD. In this case, the CPU 902 reads the image processing program from the recording medium and loads the program on the main memory, so that the image processor executes the respective steps or the functions of respective units.

The image processing program executed by the image processor in the eighth embodiment has a module configuration including the respective units (the image input unit, the output tone value determining unit, the phase controller, the input data corrector, the threshold matrix memory, the flag memory, the error calculator, the error buffer, and the error adder). In the actual hardware, since the CPU (processor) reads respective programs from the ROM and executes the programs, the respective units are loaded on the main memory, to form the respective units on the main memory.

The image processing program can be stored on a computer connected to a network such as the Internet, and provided by downloading the program via the network. Alternatively, the image processing program can be provided or distributed via the network such as the Internet.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor, comprising:

an input data corrector that corrects image data of a target pixel by giving a weight to error values in the neighborhood of the target pixel and adding weighted error values to a tone value of the target pixel;

an output tone value determining unit that determines an output tone data of the target pixel based on corrected image data, and based on a threshold corresponding to a position of the target pixel; and an error value calculator that calculates a difference between the output tone data and the corrected image data as an error value, wherein the output tone value determining unit sets the threshold corresponding to the position of the target pixel to be within a numerical threshold range determined by a process that includes obtaining corrected image data when an output dot pattern output as an output tone value is in a steady state, and determining the numerical threshold range from the obtained corrected image data, wherein, in the steady state, a same output dot pattern is stably generated repeatedly as a result of repeated tone processing of a solid image having a certain input tone value, wherein the process of obtaining corrected image data is repeated for a plurality of different output dot patterns.

2. The image processor according to claim 1, wherein the output tone value determining unit sets the threshold from the numerical threshold range without excluding any of the plurality of output dot patterns.

3. The image processor according to claim 2, wherein the output tone value determining unit sets the threshold from a neighborhood of a median, including the median, in the numerical threshold range as a predetermined threshold.

4. The image processor according to claim 1, wherein the output tone value determining unit sets the threshold from the numerical threshold range, when a mean error value is specified respectively with respect to the plurality of output dot patterns.

5. The image processor according to claim 1, wherein the output tone value determining unit sets the threshold by excluding an output dot pattern having a small mean output tone value in neighborhood of a pixel having the output tone value in a predetermined range, from the plurality of output dot patterns, when the setting is such that as the pixel value becomes larger, the density becomes higher.

6. The image processor according to claim 5, wherein the output tone value determining unit set the threshold from the range of small output tone values, excluding the lowest density from the predetermined range.

7. The image processor according to claim 5, wherein the output tone value determining unit sets the threshold by changing the predetermined range corresponding to the output tone value in the neighborhood.

8. The image processor according to claim 5, wherein the output tone value determining unit sets the threshold by assuming that neighboring pixels are adjacent to the target pixel.

9. The image processor according to claim 5, wherein the output tone value determining unit sets the threshold by assuming that neighboring pixels are neighboring pixels of the target pixel in the horizontal scanning direction.

10. The image processor according to claim 5, wherein the output tone value determining unit includes a phase controller that controls a phase of the pixels.

11. The image processor according to claim 10, wherein the phase controller determines a phase of the target pixel based on values of pixels that are adjacent to the target pixel in the horizontal scanning direction.

12. The image processor according to claim 1, wherein the output tone value determining unit sets the threshold by excluding an output dot pattern in which there is no pixel having a large output tone value in neighborhood of a pixel having the output tone value in a predetermined range, from the plurality of output dot patterns, when the setting is such that as the pixel value becomes larger, the density becomes higher.

13. The image processor according to claim 1, wherein the output tone value determining unit sets the threshold by excluding an output dot pattern having a large mean output tone value in neighborhood of a pixel having the output tone value in a predetermined range, from the plurality of output dot patterns.

14. The image processor according to claim 13, wherein the output tone value determining unit sets the threshold from the range of large output tone values, excluding the highest density from the predetermined range.

15. The image processor according to claim 1, wherein the output tone value determining unit sets the threshold by excluding an output dot pattern in which there is no pixel having a small output tone value in neighborhood of a pixel having the output tone value in a predetermined range, from the plurality of output dot patterns.

16. The image processor of claim 1, wherein the output tone determining unit is configured to determine a plurality of thresholds corresponding to the position of the target pixel, the thresholds being chosen from a corresponding plurality of numerical threshold ranges determined by the process that includes obtaining corrected image data for the plurality of different output dot patterns.

17. A method of image processing, comprising:

correcting image data of a target pixel by giving a weight to error values in the neighborhood of the target pixel and adding weighted error values to a tone value of the target pixel;

determining an output tone data of the target pixel based on corrected image data, and a threshold corresponding to a position of the target pixel; and calculating a difference between the output tone data and the corrected image data as an error value, wherein the determining includes setting the threshold corresponding to the position of the target pixel to be within a numerical threshold range determined by a process that includes obtaining corrected image data when an output dot pattern output as an output tone value is in a steady state, and determining the numerical threshold range from the obtained corrected image data, wherein, in the steady state, a same output dot pattern is stably generated repeatedly as a result of repeated tone processing of a solid image having a certain input tone value, wherein the process of obtaining correcting image data is repeated for a plurality of different output dot patterns.

18. The method according to claim 17, wherein the determining includes setting the threshold from neighborhood of a median, including the median, in the obtained numerical threshold range.

19. The method according to claim 17, wherein the determining includes setting the numerical threshold from the threshold range, when a mean error value is specified respectively with respect to the plurality of output dot patterns.

20. The method according to claim 17, wherein the determining includes setting the threshold by excluding an output dot pattern having a small mean output tone value in neighborhood of a pixel having the output tone value in a predetermined range, from the plurality of output dot patterns, when the setting is such that as the pixel value becomes larger, the density becomes higher.

21. The method according to claim 20, wherein the determining includes setting the threshold from the range of small output tone values, excluding the lowest density from the predetermined range.

22. The method according to claim 20, wherein the determining includes setting the threshold by changing the predetermined range corresponding to the output tone value in the neighborhood.

23. The method according to claim 20, wherein the determining includes setting the threshold by assuming that neighboring pixels are adjacent to the target pixel.

24. The method according to claim 20, wherein the determining includes setting the threshold by assuming that neighboring pixels are neighboring pixels of the target pixel in the horizontal scanning direction.

25. The method according to claim 17, wherein the determining includes setting the threshold by excluding an output dot pattern in which there is no pixel having a large output tone value in neighborhood of a pixel having the output tone value in a predetermined range, from the plurality of output dot patterns, when the setting is such that as the pixel value becomes larger, the density becomes higher.

26. The method according to claim 17, wherein the determining includes setting the threshold by excluding an output dot pattern having a large mean output tone value in neighborhood of a pixel having the output tone value in a predetermined range, from the plurality of output dot patterns.

27. The method according to claim 26, wherein the determining includes setting the threshold from the range of large output tone values, excluding the highest density from the predetermined range.

28. The method according to claim 17, wherein the determining includes setting the threshold by excluding an output dot pattern in which there is no pixel having a small output tone value in neighborhood of a pixel having the output tone value in a predetermined range, from the plurality of output dot patterns.

29. The method according to claim 17, wherein the determining includes controlling a phase of the pixels.

30. The method according to claim 17, wherein the controlling includes determining a phase of the target pixel based on values of pixels that are adjacent to the target pixel in the horizontal scanning direction.

* * * * *